(12) United States Patent
Zhang et al.

(10) Patent No.: US 10,547,563 B2
(45) Date of Patent: Jan. 28, 2020

(54) EFFICIENT MESSAGE FORWARDING FOR DISTRIBUTED RESOURCE ORCHESTRATION

(71) Applicant: Fujitsu Limited, Kawasaki-shi, Kanagawa (JP)

(72) Inventors: Qiong Zhang, Plano, TX (US); Xi Wang, Murphy, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 15/783,015

(22) Filed: Oct. 13, 2017

(65) Prior Publication Data

US 2018/0227244 A1    Aug. 9, 2018

Related U.S. Application Data

(63) Continuation-in-part of application No. 15/424,398, filed on Feb. 3, 2017, now Pat. No. 10,230,661.

(51) Int. Cl.
*G06F 15/173* (2006.01)
*H04L 12/915* (2013.01)
(Continued)

(52) U.S. Cl.
CPC ........ *H04L 47/785* (2013.01); *H04L 41/0893* (2013.01); *H04L 41/12* (2013.01); *H04L 47/827* (2013.01)

(58) Field of Classification Search
None
See application file for complete search history.

(56) References Cited

U.S. PATENT DOCUMENTS 8,861,340 B1 * 10/2014 Atlas ................. H04L 45/28
370/225
9,100,328 B1 * 8/2015 Atlas ................. H04L 45/28
(Continued)

OTHER PUBLICATIONS

Andreev, Konstantin, et al. "Balanced graph partitioning." Proceedings of the sixteenth annual ACM symposium on Parallelism in algorithms and architectures, 2004; 12 pages.
(Continued)

*Primary Examiner* — Phyllis A Book
(74) *Attorney, Agent, or Firm* — Baker Botts L.L.P.

(57) ABSTRACT

Systems and methods for identifying a mapping solution for a virtual network request are disclosed. A resource orchestrator may receive a virtual network request specifying resources required on physical nodes in a network and generate a mapping solution for the request. Generating the mapping solution may include identifying vertices at which a first resource is available, mapping each identified vertex to the first resource in a respective candidate chaining solution, determining, for each identified vertex, a number of messages including the candidate chaining solution to be forwarded to respective neighbor vertices, and forwarding the determined number of messages to the respective neighbor vertices. Determining the number of messages to be forwarded may include applying a message forwarding policy to reduce the total number of messages forwarded between vertices when generating the mapping solution. The policy may be dependent on the topology of the virtual network request.

20 Claims, 26 Drawing Sheets

(51) Int. Cl.
*H04L 12/911* (2013.01)
*H04L 12/24* (2006.01)

(56) References Cited

U.S. PATENT DOCUMENTS

| | | | | |
|---|---|---|---|---|
| 9,225,629 | B2* | 12/2015 | Lindem, III | H04L 45/22 |
| 9,628,380 | B2* | 4/2017 | Xia | H04L 45/58 |
| 9,979,602 | B1 | 5/2018 | Chinnakannan et al. | |
| 9,998,392 | B1* | 6/2018 | Allen | H04L 67/10 |
| 10,320,698 | B1* | 6/2019 | Allen | H04L 47/70 |
| 2016/0057075 | A1 | 2/2016 | Parikh et al. | |
| 2016/0105332 | A1 | 4/2016 | Xiang | |
| 2016/0156513 | A1 | 6/2016 | Zhang et al. | |
| 2016/0191370 | A1 | 6/2016 | Wood | |
| 2016/0212017 | A1 | 7/2016 | Li et al. | |
| 2017/0302530 | A1 | 10/2017 | Wolting | |
| 2018/0139154 | A1 | 1/2018 | Kusy et al. | |
| 2018/0039709 | A1* | 2/2018 | Chen | G06F 16/28 |
| 2018/0077080 | A1 | 3/2018 | Gazier et al. | |
| 2018/0212895 | A1 | 7/2018 | Szabo et al. | |

OTHER PUBLICATIONS

Vaishnavi, Ishan, et al. "Recursive, hierarchical embedding of virtual infrastructure in multi-domain substrates." Proceedings of the 1st IEEE Conference on Network Softwarization (NetSoft), London, UK, Apr. 2015; 9 pages.
Houidi, Ines, et al. "Virtual network provisioning across multiple substrate networks." Computer Networks, vol. 55, No. 4, Mar. 2011, pp. 1011-1023; 14 pages.
Xin, Yufeng, et al. "Embedding virtual topologies in networked clouds." Proceedings of the 6th ACM International Conference on Future Internet Technologies, New York, NY, 2011, pp. 26-29; 4 pages.
Chowdhury, Mosharaf, et al. "Polyvine: policy-based virtual network embedding across multiple domains." In Proceedings of the second ACM SIGCOMM workshop on Virtualized infrastructure systems and architectures, pp. 49-56, 2010; 8 pages.
Dietrich, David, et al. "Multi-domain virtual network embedding with limited information disclosure." Proceeding of IFIP Networking Conference, May 2013; 9 pages.
Zhang, Qiong, et al. "Resource Orchestration for Optically Interconnected Distributed Data Centers (Invited)." APC 2015; 20 pages.
Zhang, Qiong, et al. "Service function chaining in multi-domain networks." Optical Fiber Communications Conference and Exhibition (OFC), IEEE, 2016; 3 pages.
Zhang, Qiong, et al. "Vertex-centric computation of service function chains in multi-domain networks." NetSoft Conference and Workshops (NetSoft), IEEE, 2016; 8 pages.
"Network functions virtualization (NFV); User Cases," www.etsi.org/deliver/etsi_gs/nfv/001_009/001/01.01.01_60/gs_nfv001v010101p.pdf; 50 pages, 2013.
Mehragham, S., et al. "Specifying and Placing Chains of Virtual Network Functions," *Proc. IEEE CloudNet*, Luxembourg; 7 pages, 2014.
Malewicz, G., "Pregel: A System for Large-Scale Graph Processing," in Proc ACM SIGMOD, New York, NY; 11 pages, 2010.
Farrel, A., et al., "A Path Computation Element (PCE)-Based Architecture," Network Working Group, 40 pages, 2006.
Vasseur, JP., et al., "A Backward-Recursive PCE-Based Computation (BRPC) Procedure to Compute Shortest Constrained Inter-Domain Traffic Engineering Label Switched Paths," IETF RFC 5441, 19 pages, 2009.
Heller, B., et al., "The Controller Placement Problem," Proc. ACM HotSDN, New York, NY; 6 pages, 2012.
Hong, S., et al., "Effective VON Embedding Based on Topology Aggregation in Multi-Domain Optical Networks," OFC 2014, M3H.3; 3 pages.
Y. Low, et al., "Distributed GraphLab: a framework for machine learning and data mining in the cloud," in *Proc. VLDB*, vol. 5, No. 8, 2012; 12 pages.
W. Liu, et al., "Service function chaining general use cases," IETF internet draft, draft-liu-sfc-use-cases-08, Sep. 2014; 20 pages.

* cited by examiner

EFFICIENT MESSAGE FORWARDING FOR DISTRIBUTED RESOURCE ORCHESTRATION

RELATED APPLICATIONS

This application is a continuation-in-part of U.S. patent application Ser. No. 15/424,398, filed Feb. 3, 2017, entitled "Distributed Virtual Network Embedding", the contents of which are hereby incorporated by reference in its entirety.

BACKGROUND

Field of the Disclosure

The present disclosure relates generally to network function virtualization and, more particularly, to systems and methods for performing distributed resource orchestration with efficient message forwarding.

Description of the Related Art

Emerging network applications, such as cloud and big data applications, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-domain networks. For example, a network service may traverse one or more consumer broadband networks, mobile backhaul networks, mobile packet core networks, and/or virtual private networks.

Traditional distributed routing protocols typically compute network paths without considering the availability of service functions and virtual machines at the individual network nodes. A hybrid architecture (e.g., one with geographically distributed orchestrators that replicate a global view of service functions, virtual machines, and networks) can lead to additional challenges, such as managing the global network state, maintaining the confidentiality of various network domains, and managing high computation complexity on a large-scale global view. An approach using path-computation element (PCE)-based multi-domain heuristics to map virtual optical network requests would typically require a parent PCE to compute all possible inter-domain paths. Furthermore, mapping a single virtual link would typically require signaling along all possible inter-domain paths, which can result in significant signaling overhead for a very large number of paths in a large-scale network.

A virtual network request can have a linear topology or a mesh topology. A service function chain is an example of a linear topology, while a VNF forwarding graph is an example of a mesh topology. Previously proposed virtual network mapping algorithms for multi-domain networks can be suitable for mapping service function chain (SFC) requests, but they typically require a centralized orchestrator to maintain a hierarchical topology for all domains in a multi-domain network. Previously proposed virtual network mapping algorithms for directly mapping an entire virtual network request in a mesh topology have high computational complexity in centralized systems and also have high operational and signaling complexity of virtual node placement at domains and (for multi-domain cases) inter-domain paths between virtual nodes in distributed systems.

SUMMARY

In one aspect, a disclosed method is for identifying a mapping solution for a virtual network request. The method may include receiving, at a resource orchestrator, a virtual network request specifying a plurality of resources required on respective physical nodes in a network, each physical node being represented as a vertex in a resource orchestration framework, and generating, by the resource orchestrator, a mapping solution for the virtual network request. Generating the mapping solution may include identifying one or more vertices at which a first one of the plurality of resources is available, mapping each of the identified vertices to the first one of the plurality of resources in a respective candidate chaining solution, determining, for each of the identified vertices, a number of messages comprising the candidate chaining solution to be forwarded to respective neighbor vertices of the identified vertex, the physical nodes represented by each of the respective neighbor vertices being communicatively coupled to the physical node represented by the identified vertex over a physical link, and forwarding the determined number of messages to respective neighbor vertices of the identified vertices. Determining the number of messages to be forwarded to respective neighbor vertices may include applying a message forwarding policy, and the total number of messages forwarded between vertices as part of generating the mapping solution may be less than a maximum possible number of messages comprising candidate chaining solutions that are qualified to be forwarded between vertices in the resource orchestration framework.

In any of the disclosed embodiments, at least one of the plurality of resources required may include a service function.

In any of the disclosed embodiments, determining the number of messages to be forwarded to respective neighbor vertices may also include determining a number of physical nodes represented by respective neighbor vertices that are coupled to the physical node represented by the identified vertex over a physical link meeting criteria specified for the virtual network request, and forwarding the determined number of messages to respective neighbor vertices of the identified vertices may include forwarding the determined number of messages over physical links meeting criteria specified for the virtual network request.

In any of the disclosed embodiments, the virtual network request may include a linear topology, and applying the message forwarding policy may include calculating a message forwarding probability for the identified vertex, the message forwarding probability being dependent on availability of the plurality of resources in the network. Determining the number of messages to be forwarded to respective neighbor vertices may be dependent on the calculated message forwarding probability for the identified vertex.

In any of the disclosed embodiments, applying the message forwarding policy may also include generating a random number for each pairing between a message and a corresponding physical link over which the message can be forwarded. Determining the number of messages to be forwarded to respective neighbor vertices may include, for each pairing, comparing the random number to the calculated message forwarding probability, determining that the message is to be forwarded to a neighbor vertex over the corresponding physical link when the random number is greater than or equal to the calculated message forwarding probability, and determining that the message is not to be forwarded to a neighbor vertex over the corresponding physical link when the random number is less than the calculated message forwarding probability.

In any of the disclosed embodiments, the virtual network request may include a linear topology, and applying the message forwarding policy may include, for each physical link over which the identified vertex is communicatively coupled to a neighbor vertex, determining a set of messages received by the identified vertex that can be forwarded over the physical link, and determining whether the number of messages in the set is greater than a predetermined maximum number of mapping solutions to be generated for the virtual network request. Determining the number of messages to be forwarded to respective neighbor vertices may include, for each physical link over which the identified vertex is communicatively coupled to a neighbor vertex, determining that all of the messages in the set of messages received by the identified vertex that can be forwarded over the physical link are to be forwarded when the number of messages in the set is not greater than the predetermined maximum number of mapping solutions to be generated, and determining that fewer than all of the messages in the set of messages received by the identified vertex that can be forwarded over the physical link are to be forwarded when the number of messages in the set is greater than the predetermined maximum number of mapping solutions to be generated.

In any of the disclosed embodiments, the method may further include, in response to determining that fewer than all of the messages in the set of messages received by the identified vertex that can be forwarded over the physical link are to be forwarded, sorting the messages in the set based on respective values of a Quality of Service (QoS) metric associated with message in the set, and selecting a number of messages to be forwarded that is no greater than the predetermined maximum number of mapping solutions to be generated, the selected messages being associated with values of the QoS metric that are more favorable than the values of the QoS metric associated with unselected messages in the set.

In any of the disclosed embodiments, the method may further include, for at least one neighbor vertex of the identified vertex to which a message comprising a respective candidate chaining solution was forwarded, determining that a second one of the plurality of resources is available on the neighbor vertex, mapping the neighbor vertex to the second one of the plurality of resources in the respective candidate chaining solution to extend the respective candidate chaining solution, determining a number of messages comprising the extended candidate chaining solution to be forwarded to respective neighbor vertices of the neighbor vertex, the physical nodes represented by each of the respective neighbor vertices of the neighbor vertex being communicatively coupled to the physical node represented by the neighbor vertex over a physical link, and forwarding the determined number of messages to respective neighbor vertices of the neighbor vertex.

In any of the disclosed embodiments, the virtual network request may include a mesh topology, and generating the mapping solution may also include recording, for each candidate chaining solution, the mapping between the identified vertices and the first one of the plurality of resources, and for at least one neighbor vertex of an identified vertex to which a message comprising a respective candidate chaining solution was forwarded, determining that a second one of the plurality of resources is available at the neighbor vertex, mapping the neighbor vertex to the second one of the plurality of resources in the respective candidate chaining solution to extend the respective chaining solution when the second one of the plurality of resources is available at the neighbor vertex, and determining, based on the recording, whether a message comprising the extended candidate chaining solution is to be forwarded to respective neighbor vertices of the neighbor vertex.

In any of the disclosed embodiments, determining, for the at least one neighbor vertex of the identified vertex to which a message comprising a respective candidate chaining solution was forwarded, whether a message comprising the extended candidate chaining solution is to be forwarded to respective neighbor vertices of the neighbor vertex may include determining that a message comprising the extended candidate chaining solution is to be forwarded to respective neighbor vertices of the neighbor vertex when the extended chaining solution is compatible with the recordings of the mappings between the identified vertices and the first one of the plurality of resources for each candidate chaining solution, and discarding the extended candidate chaining solution when the extended chaining solution is incompatible with at least one of the recordings of the mappings between the identified vertices and the first one of the plurality of resources for each candidate chaining solution.

In another aspect, a disclosed resource orchestration framework may include a plurality of vertices, each of which represents a respective one of a plurality of physical nodes in a network, and a resource orchestrator. The resource orchestrator may include a processor, and a memory storing program instructions that when executed by the processor cause the processor to perform receiving a virtual network request specifying a plurality of resources required on respective ones of the physical nodes in the network, and generating a mapping solution for the virtual network request. Generating the mapping solution may include identifying one or more vertices at which a first one of the plurality of resources is available, mapping each of the identified vertices to the first one of the plurality of resources in a respective candidate chaining solution, determining, for each of the identified vertices, a number of messages comprising the candidate chaining solution to be forwarded to respective neighbor vertices of the identified vertex, the physical nodes represented by each of the respective neighbor vertices being communicatively coupled to the physical node represented by the identified vertex over a physical link, and forwarding the determined number of messages to respective neighbor vertices of the identified vertices. Determining the number of messages to be forwarded to respective neighbor vertices may include applying a message forwarding policy, and the total number of messages forwarded between vertices as part of generating the mapping solution may be less than a maximum possible number of messages comprising candidate chaining solutions that are qualified to be forwarded between vertices in the resource orchestration framework.

In any of the disclosed embodiments, at least one of the plurality of resources required may include a service function.

In any of the disclosed embodiments, determining the number of messages to be forwarded to respective neighbor vertices may also include determining a number of physical nodes represented by respective neighbor vertices that are coupled to the physical node represented by the identified vertex over a physical link meeting criteria specified for the virtual network request, and forwarding the determined number of messages to respective neighbor vertices of the identified vertices may include forwarding the determined number of messages over physical links meeting criteria specified for the virtual network request.

In any of the disclosed embodiments, the virtual network request may include a linear topology, and applying the message forwarding policy may include calculating a message forwarding probability for the identified vertex, the message forwarding probability being dependent on availability of the plurality of resources in the network. Determining the number of messages to be forwarded to respective neighbor vertices may be dependent on the calculated message forwarding probability for the identified vertex.

In any of the disclosed embodiments, the virtual network request may include a linear topology, and applying the message forwarding policy may include, for each physical link over which the identified vertex is communicatively coupled to a neighbor vertex, determining a set of messages received by the identified vertex that can be forwarded over the physical link, and determining whether the number of messages in the set is greater than a predetermined maximum number of mapping solutions to be generated for the virtual network request. Determining the number of messages to be forwarded to respective neighbor vertices may include, for each physical link over which the identified vertex is communicatively coupled to a neighbor vertex, determining that all of the messages in the set of messages received by the identified vertex that can be forwarded over the physical link are to be forwarded when the number of messages in the set is not greater than the predetermined maximum number of mapping solutions to be generated, and determining that fewer than all of the messages in the set of messages received by the identified vertex that can be forwarded over the physical link are to be forwarded when the number of messages in the set is greater than the predetermined maximum number of mapping solutions to be generated.

In any of the disclosed embodiments, the program instructions, when executed by the processor, may further cause the processor to perform, in response to determining that fewer than all of the messages in the set of messages received by the identified vertex that can be forwarded over the physical link are to be forwarded, sorting the messages in the set based on respective values of a Quality of Service (QoS) metric associated with message in the set, and selecting a number of messages to be forwarded that is no greater than the predetermined maximum number of mapping solutions to be generated, the selected messages being associated with values of the QoS metric that are more favorable than the values of the QoS metric associated with unselected messages in the set.

In any of the disclosed embodiments, the program instructions, when executed by the processor, may further cause the processor to perform, for at least one neighbor vertex of the identified vertex to which a message comprising a respective candidate chaining solution was forwarded, determining that a second one of the plurality of resources is available on the neighbor vertex, mapping the neighbor vertex to the second one of the plurality of resources in the respective candidate chaining solution to extend the respective candidate chaining solution, determining a number of messages comprising the extended candidate chaining solution to be forwarded to respective neighbor vertices of the neighbor vertex, the physical nodes represented by each of the respective neighbor vertices of the neighbor vertex being communicatively coupled to the physical node represented by the neighbor vertex over a physical link, and forwarding the determined number of messages to respective neighbor vertices of the neighbor vertex.

In any of the disclosed embodiments, the virtual network request may include a mesh topology, and generating the mapping solution may also include recording, for each candidate chaining solution, the mapping between the identified vertices and the first one of the plurality of resources, and for at least one neighbor vertex of an identified vertex to which a message comprising a respective candidate chaining solution was forwarded, determining that a second one of the plurality of resources is available at the neighbor vertex, mapping the neighbor vertex to the second one of the plurality of resources in the respective candidate chaining solution to extend the respective chaining solution when the second one of the plurality of resources is available at the neighbor vertex, and determining, based on the recording, whether a message comprising the extended candidate chaining solution is to be forwarded to respective neighbor vertices of the neighbor vertex.

In any of the disclosed embodiments, determining, for the at least one neighbor vertex of the identified vertex to which a message comprising a respective candidate chaining solution was forwarded, whether a message comprising the extended candidate chaining solution is to be forwarded to respective neighbor vertices of the neighbor vertex may include determining that a message comprising the extended candidate chaining solution is to be forwarded to respective neighbor vertices of the neighbor vertex when the extended chaining solution is compatible with the recordings of the mappings between the identified vertices and the first one of the plurality of resources for each candidate chaining solution, and discarding the extended candidate chaining solution when the extended chaining solution is incompatible with at least one of the recordings of the mappings between the identified vertices and the first one of the plurality of resources for each candidate chaining solution.

In any of the disclosed embodiments, at least one neighbor vertex of a given one of the identified vertices to which a message comprising a respective candidate chaining solution is forwarded resides in a different domain of a multi-domain network than the domain in which the given identified vertex resides.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

Figure 1:
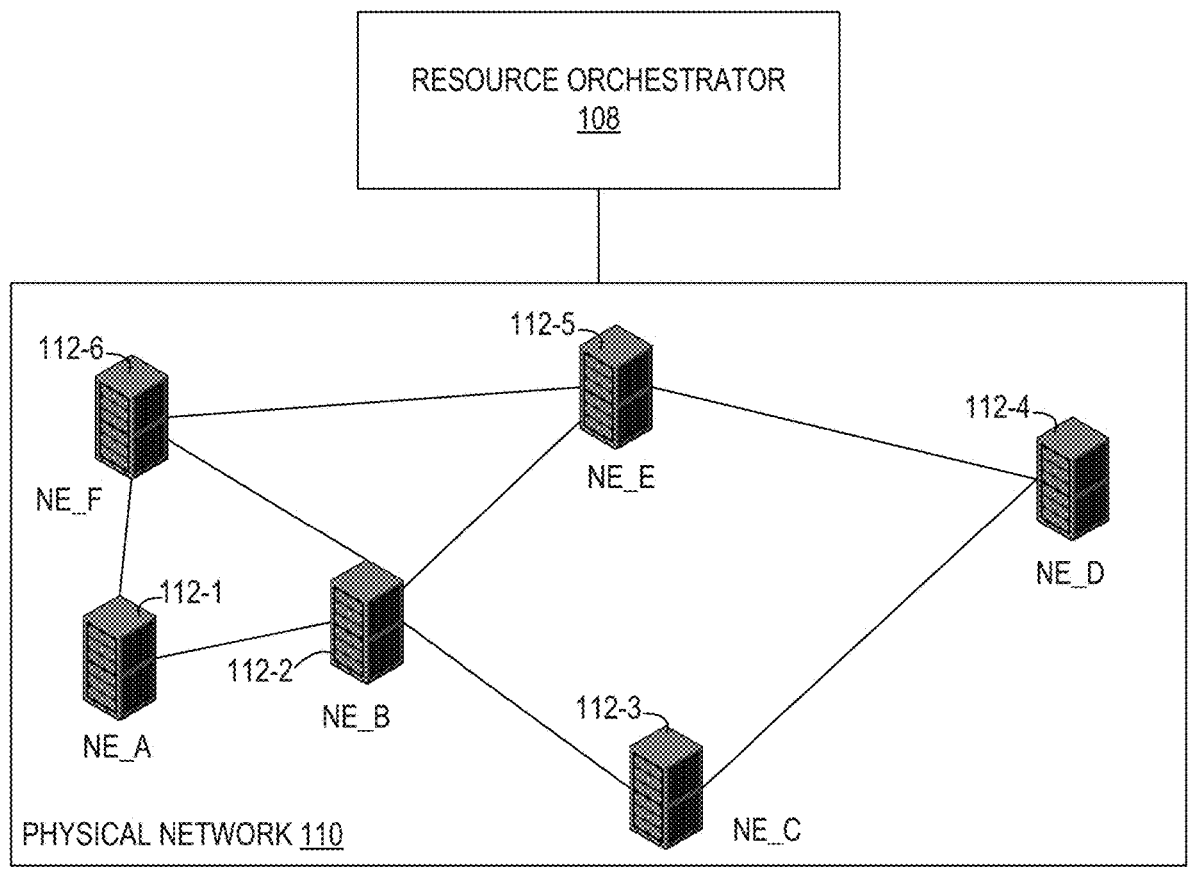
FIG. 1 illustrates selected elements of a distributed resource orchestration framework, according to at least some embodiments.

In the following description, details are set forth by way of example to facilitate discussion of the disclosed subject matter. It should be apparent to a person of ordinary skill in the field, however, that the disclosed embodiments are merely examples and are not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As described herein, a distributed resource orchestration framework may provide a scalable vertex-centric distributed approach for identifying qualified service function chain (SFC) solutions in a multi-domain network. In some embodiments, the distributed resource orchestration framework disclosed herein may apply a vertex-centric distributed processing approach that enables different vertices to exchange information about possible SFC solutions iteratively using controller messages until all possible solutions have been identified. In some embodiments of the distributed resource orchestration framework disclosed herein, each domain resource orchestrator managing the resources of a network domain may send messages to each vertex in its network domain, and the domain resource orchestrators may communicate with each other using controller messages. Simulation results have demonstrated superior efficiency and scalability for computing a large SFC request when compared to a centralized approach.

In some embodiments of the present disclosure, a distributed resource orchestration framework may perform distributed virtual network embedding for virtual network requests with arbitrary topologies, including mesh topologies. For example, as described in more detail below, resource orchestrators in a distributed resource orchestration framework may collaborate to partition a virtual network request over a mesh topology into multiple linear-topology sub-requests, to identify feasible mappings for each sub-request by applying, independently, a vertex-centric distributed processing approach to each sub-request, and to combine the feasible mappings for the sub-requests into a virtual network that satisfies the virtual network request. By only mapping linear topology chains, the message parsing in between the orchestrators and the message processing at each vertex may be simplified, when compared to other approaches to performing virtual network embedding. This approach may also make it easier to determine the forwarding path for messages than when using other approaches to performing virtual network embedding.

In some embodiments of the present disclosure, in order to reduce the complexity typically associated with generating multiple mapping solutions for a virtual network request, a distributed resource orchestration framework may reduce the number of messages exchanged between vertices according to a selected message forwarding policy. The message forwarding policy may be selected based on the particular topology of the virtual network request and/or on other factors. For example, a length-based message forwarding policy or a degree-based message forwarding policy may be applied when generating a mapping solution for a service function chain request or another type of linear virtual network request to reduce the number messages exchanged between the vertices compared to the maximum possible number of messages forwarded by qualified vertices to qualified edges. In another example, a step-based message forwarding policy may be applied when generating a mapping solution for a linear sub-request of a virtual network request in a mesh topology to reduce the number messages exchanged between the vertices compared to the maximum possible number of messages forwarded by qualified vertices to qualified edges. In some embodiments, two or more message forwarding policies may be combined to reduce the complexity of generating a mapping solution for a virtual network request.

Turning now to the drawings, FIG. 1 illustrates selected elements of a distributed resource orchestration framework, according to at least some embodiments. More specifically, FIG. 1 illustrates an example embodiment of a network domain 100, which is based on vertices that are individual network elements (NE). In FIG. 1, network domain 100 is shown including domain-specific resource orchestrator 108, and physical network 110. In some embodiments, physical network 110 may be an underlying optical network, such as an optical transport network (OTN) or a flexible optical data plane (e.g., flexible transceivers) configured to adjust the bandwidth of connections.

In FIG. 1, resource orchestrator 108 may manage or coordinate the use of resources within network domain 100, shown comprising multiple network elements 112. Network elements 112 may represent various types of network functionality, such as switches, routers, etc., and may include hardware to interconnect various types of physical interfaces. Network domain 100 comprises network element NE_A 112-1, network element NEB 112-2, network element NE_C 112-3, network element NE_D 112-4, network element NE_E 112-5, and network element NE_F 112-6, along with connections between the network elements that may have different distances. Thus, network domain 100 may represent a network topology for a single network domain, the use of whose resources are coordinated by resource orchestrator 108. Note that, in some embodiments, various network management functions for network domain 100 other than those provided by resource orchestrator 108 may be provided by a dedicated (e.g., domain-specific) SDN controller (not shown). When larger networks include multiple network domains, each individual network domain may be managed by a respective SDN controller.

As disclosed in further detail herein, network domain 100 may be included in a multi-domain network that uses a distributed processing approach and in which controller messages are exchanged between a plurality of resource orchestrators and/or network controllers, such as resource orchestrator 108 and/or an SDN controller, each of which is associated with a respective one of a plurality of network domains, such as physical network 110. In some embodiments, the resource orchestrators may work collaboratively to execute an SFC in the multi-domain network, which may include identifying all possible SFC solutions, selecting one or more of the possible SFC solutions for execution (e.g., dependent on user preferences or various policies), and configuring the physical resources of various network nodes to implement the selected solution(s). In some embodiments, the resource orchestrators may work collaboratively to perform distributed virtual network embedding for virtual network requests with arbitrary topologies.

As previously noted, network function virtualization (NFV) may be used to virtualize network functions and migrate them from devices that are built for a single, specific purpose to multi-purpose virtual machines on commercial off-the-shelf servers, which may reduce service deployment costs and improve service flexibility. Virtual networks may include a set of virtual links that connect a set of virtual nodes. For a given virtual network request, each virtual node may require a particular number of virtual machines (VMs), one or more particular network or service functions, or particular applications to be available on the underlying physical resources of the virtual node. In addition, for at least some virtual network requests, one or more of the virtual links that connect the virtual nodes may require a certain amount of bandwidth and may need to satisfy a particular delay constraint. In some embodiments, a virtual network in a Network Function Virtualization (NFV) framework may represent a service function chain, which has a linear topology. In other embodiments, a virtual network in a Network Function Virtualization (NFV) framework may represent a Virtual Network Function (VNF) forwarding graph, which has a mesh topology. In general, the techniques described herein for performing distributed virtual network embedding may be used to map the virtual nodes of a virtual network request over an arbitrary topology to physical resources, according to the required resources for the virtual nodes and/or for the virtual links that connect them in the arbitrary topology.

In systems that implement NFV, in order to provide an end-to-end network service, virtual network functions (VNFs) may need to be invoked in a sequential order, referred to as a service function chain (SFC). Service function chaining may involve configuring and/or allocating various virtual machines (VMs) to run these virtualized network functions, and may also involve steering traffic across one or more networks. For example, a traffic flow may be steered through a number of virtual network functions (VNFs) or service functions (SFs) in a specific order based on the service provider's policies and/or on user preferences. In some embodiments of the distributed resource orchestration frameworks described herein, service function chaining may be supported by the application of resource orchestration. For example, in some embodiments, a plurality of resource orchestration elements, referred to herein as resource orchestrators, may collectively and individually manage and coordinate the use of various resources (including service functions, virtual machines, and networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-domain networks, as described herein, may be highly beneficial for providing end-to-end network services. For example, a network service may span across multiple networks such as consumer broadband, mobile backhaul, mobile packet core, and/or virtual private networks (including, e.g., networks implemented on the 1Finity™ platform from Fujitsu Network Communications Inc.).

In various embodiments of the present disclosure, a large-scale multi-domain network may include many different domains, and these domains may have different network technologies, different vendors, different administration, different types of resources, and/or different virtualized networks. These domains may include domains in which reside Internet of Things (IoT) devices, computing resources, storage resources, and/or different types of service functions (including access service functions, metro service functions, and/or core service functions). In at least some embodiments, these multi-domain networks may preserve confidentiality among domains and improve scalability for service providers. In at least some of the multi-domain orchestration architectures described herein, each domain may be controlled by a local orchestrator, and vertex-centric distributed computing among the orchestrators may provide for end-to-end resource allocation.

Figure 2:
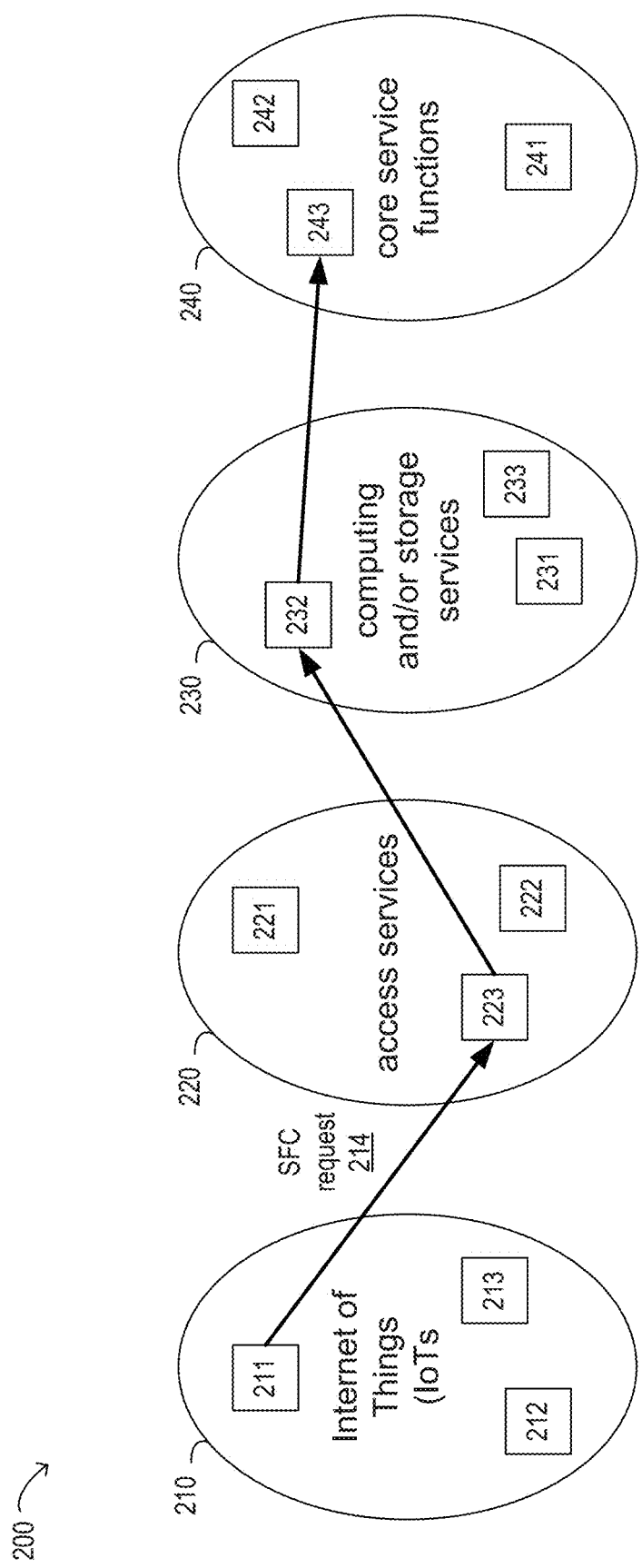
FIG. 2 is a block diagram illustrating selected elements of a multi-domain network for providing end-to-end services, according to one embodiment.

FIG. 2 is a block diagram illustrating selected elements of a multi-domain network for providing end-to-end services, according to one embodiment. In this example embodiment, multi-domain network 200 includes four domains, shown as domains 210, 220, 230, and 240. Each of these domains may include one or more nodes (vertices), at least some of which may implement one or more service functions using the resources within that domain. The first domain, domain 210, represents the Internet of Things (IoTs), various devices of which may issue service function chain requests or virtual network requests. Three such devices are illustrated in FIG. 2 as devices 211, 212, and 213, although any number of devices may be included in domain 210, in different embodiments. In this example embodiment, the second domain, domain 220, represents one or more data centers or other entities that provide access services that may be included in a service function chain or virtual network. Three such services are illustrated in FIG. 2 as services 221, 222, and 223, although any number of services or devices may be included in domain 220, in different embodiments.

In this example embodiment, the third domain, domain 230, represents one or more data centers or other entities that provide computing and/or storage services that may be included in a service function chain or virtual network. Three such services are illustrated in FIG. 2 as services 231, 232, and 233, although any number of services or devices may be included in domain 230, in different embodiments. In this example embodiment, the fourth domain, domain 240, represents one or more data centers or other entities that provide core service functions that may be included in a service function chain or virtual network. Three such services are illustrated in FIG. 2 as core service functions 241, 242, and 243, although any number of services or devices may be included in domain 240, in different embodiments.

In the example illustrated in FIG. 2, device 211 within domain 210 has issued a service function chain request 214, which includes at least one access service, one computing or storage service, and one core service function. More specifically, service function chain request 214 specifies a service function chain that includes an access service function 223 (which is available on one of the nodes/vertices within domain 220), a computing or storage service function 232 (which is available on one of the nodes/vertices within domain 230), and a core service function 243 (which is available on one of the nodes/vertices within domain 240).

In various embodiments, the systems described herein may perform vertex-centric distributed computing to identify one or more qualified service function chain (SFC) solutions for an SFC request, or may use vertex-centric distributed computing in performing virtual network embedding in systems that include network function virtualization, mobile edge computing, and/or IoTs with data analytics, and in which traffic may traverse a collection of service function instances across multiple domains.

In at least some embodiments of the present disclosure, each domain in a multi-domain network may include physical nodes and physical links, such as IP/OTN links. In at least some embodiments, a respective resource orchestrator may be associated with each network domain to manage all the physical nodes and links within its domain. In some embodiments, each physical node may include network elements (e.g., an OTN switch, or a router) and/or compute servers and storage elements (e.g., datacenters) capable of invoking a subset of network or service functions selected from a catalog of such functions. Some examples of the network and service functions provided in these multi-domain networks include firewalls, deep packet inspection (DPI), network address translation (NAT), load balancers, and parental control functions. In one example, a service function chain may include a firewall, a deep packet inspection (DPI) service function, a parental control service function, and an anti-virus service function, each of which may be provided by nodes in a different network domain. In another example, a service function chain may include a network address translation (NAT) service function between two other types of service functions and/or between other service functions and an internet access service function, each of which is provided by nodes in a different network domain. In some embodiments, after identifying all feasible mappings of a service function chain request in a network, the results may be further pruned to obtain the service function chains that best satisfy the requestor's preferences and/or the service provider's constraints. Similarly, in some embodiments, after identifying all feasible mappings of a virtual network request, or of multiple sub-requests thereof, the results may be further pruned to obtain the virtual network that best satisfies the requestor's preferences and/or the service provider's constraints. In some embodiments, it may not be desirable or necessary to identify all feasible mappings of a particular virtual network request, or of multiple sub-requests thereof. In such embodiments, the application of a message forwarding policy may reduce the number of messages exchanged between nodes when identifying mapping solutions for the particular virtual network request.

Figure 3:
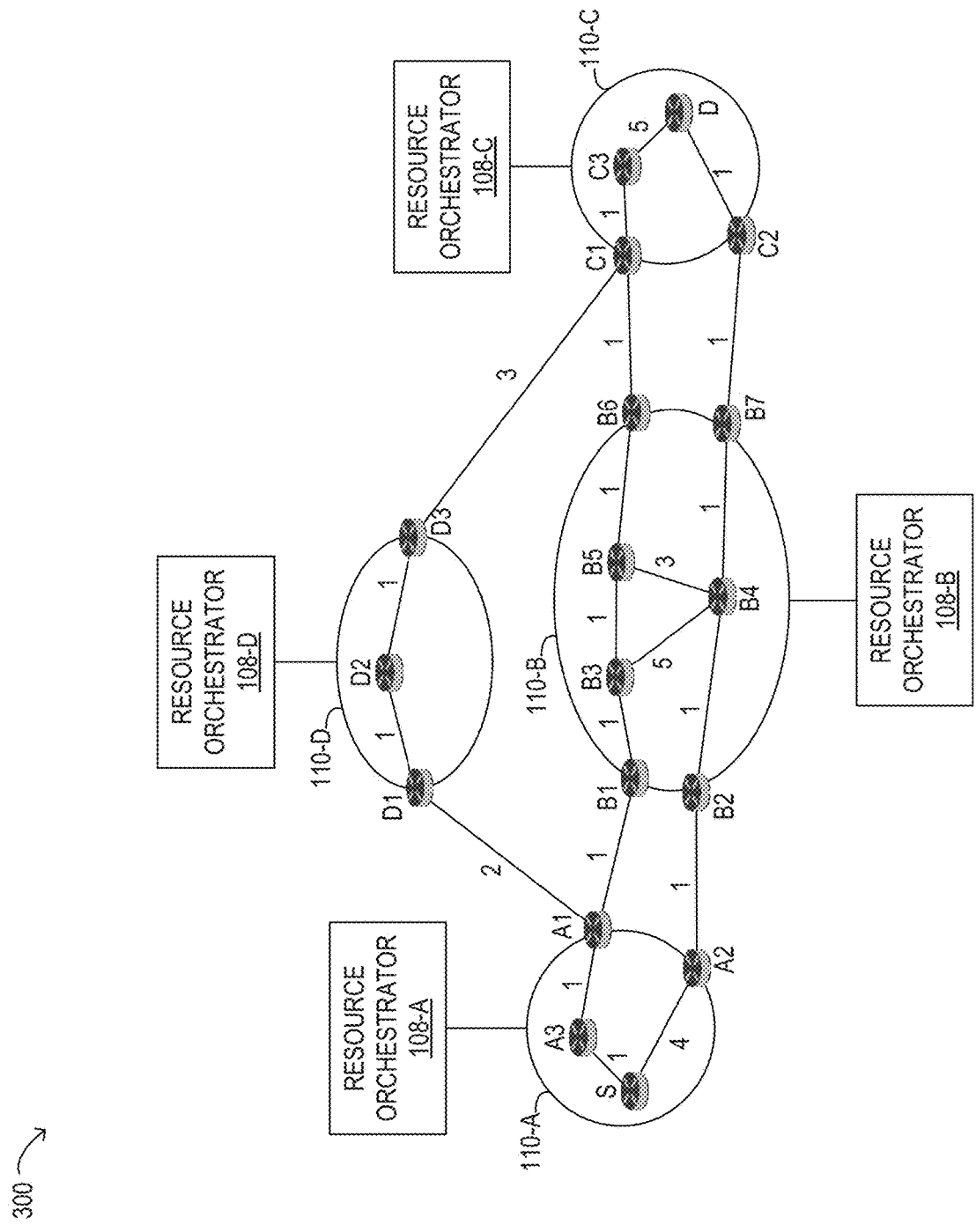
FIG. 3 is a network diagram illustrating selected elements of multiple distributed network domains, according to one embodiment.

Referring now to FIG. 3, selected elements of multiple distributed network domains are shown as a network diagram. In this example embodiment, the distributed network domains collectively represent an example of a multi-domain network 300 in which the use of resources for satisfying an SFC request is coordinated by a respective plurality of resource orchestrators 108, such as those illustrated in FIG. 1 and described herein. Although the distributed network domains within multi-domain network 300 are shown as a specific network topology, it will be understood that various different types and sizes of networks and different numbers of network domains may be used with the network service computation system disclosed herein. Note that the distributed network domains within multi-domain network 300 are shown as a schematic illustration and are not drawn to scale.

In FIG. 3, multi-domain network 300 includes a plurality of domains 110, each comprised of individual vertices. A vertex may represent any of a variety of network nodes, such as a switch, a router, a network element, a data center, a sub-network, a sub-domain, among others. Thus, each vertex may be enabled to provide network connectivity to other vertices, as well as computational resources, such as for providing network services and supporting network applications. As shown, a respective connection link is provided between pairs of vertices and is labeled in FIG. 3 with an integer value representing a relative path distance for the connection link. This relative path distance may represent a delay between the vertices or other edge information (e.g., bandwidth), in other embodiments. It is noted that the connection links may be intra-domain links or inter-domain links.

The vertices in multi-domain network 300 represent a reachable network of vertices that may provide potential paths between a source vertex S and a destination vertex D. In this example, each domain has a local orchestrator 108. For example, resource orchestrator 108-A may coordinate the use of resources within domain 110-A, which includes source vertex S, and vertices A1, A2, and A3; resource orchestrator 108-B may coordinate the use of resources within domain 110-B, which includes vertices B1, B2, B3, B4, B5, B6, and B7; resource orchestrator 108-C may coordinate the use of resources within domain 110-C, which includes vertices C1, C2, C3, and destination vertex D; and resource orchestrator 108-D may coordinate the use of resources within domain 110-D, which includes vertices D1, D2, and D3. In some embodiments of the distributed network domains shown within multi-domain network 300, each resource orchestrator 108 (and/or an SDN controller for the domain) may communicate with vertices in its own respective domain 110, while the vertices may refrain from communicating with each other.

In some embodiments, when computing service function chaining requests or chains mapping virtual network sub-requests, each vertex (node) may send and receive messages to and from its vertex neighbors inside a compute function. For example, vertex (node) A1 has three edges, as it has three vertex neighbors that it can communicate with, and a common compute function. Vertex A1 may also have node information indicating, for example, the number of compute resources available on the node, the number of storage resources available on the node, the vertex ID for the node, and the service functions that are implemented and available on the node. In at least some embodiments, the resource orchestrators associated with different domains may be interconnected via control channels for communication to compute requests (e.g., service function chaining requests or sub-requests of a virtual network request), based on the vertex-centric distributed processing described herein.

In at least some embodiments, the resource orchestrators (such as various ones of the resource orchestrators 108 illustrated in FIGS. 1 and 3) may communicate with each other and may be networked together using any suitable topology, such as a mesh, a ring, a star, or a bus, among others. Similarly, SDN controllers for the domains may communicate with each other and may be networked together using any suitable topology, such as a mesh, a ring, a star, or a bus, among others. In some embodiments, the communication among resource orchestrators 108 and/or among SDN controllers for management purposes may take place using a sideband network channel or other network connection. In such embodiments, communication taking place using the sideband network or other network connection does not interfere with communication that takes place over network connections between vertices. The network connections between vertices may represent a payload network offered as a commercial service to customers by a service provider.

In at least some embodiments, the resource orchestrators (such as various ones of the resource orchestrators 108 illustrated in FIGS. 1 and 3) may send messages to each other to compute a final result for a distributed computation to solve a service function chain request or a virtual network request (or sub-request thereof). In such embodiments, each resource orchestrator may maintain a logical representation of the physical infrastructure of its own domain, where the vertices in the resource orchestration architecture represent the physical nodes in that domain. In at least some embodiments, in addition to maintaining vertex information (such as the node information described above), each vertex may also maintain information about its incoming and outgoing edges, and a common compute function, which is user-defined function. In at least some embodiments, for distributed computing among orchestrators, a computation may be broken down into iterations, called supersteps. In each superstep, each orchestrator may coordinate the execution of the compute functions of each vertex within its domain.

Figure 4:
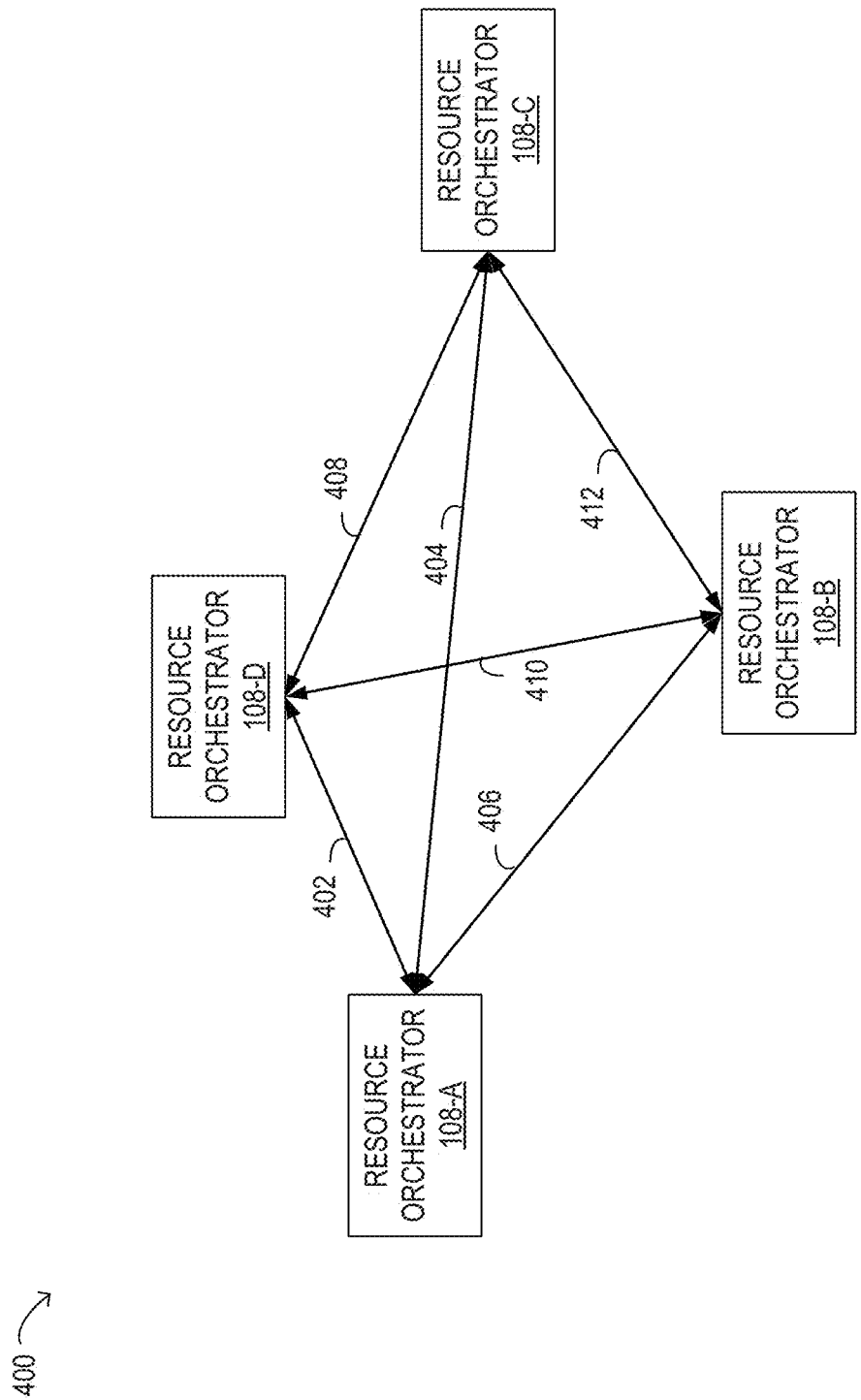
FIG. 4 illustrates a distributed resource orchestration architecture, including communication channels (or links) between respective resource orchestrators of different domains, according to one embodiment.

FIG. 4 illustrates a distributed resource orchestration architecture 400, including the communication channels (or links) between the respective resource orchestrators of the different domains illustrated in FIG. 3. In this example, the link between resource orchestrator 108-A (which coordinates the use of resources within domain 110-A) and resource orchestrator 108-B (which coordinates the use of resources within domain 110-B) is shown as link 406. Similarly, the link between resource orchestrator 108-A and resource orchestrator 108-C (which coordinates the use of resources within domain 110-C) is shown as link 404; the link between resource orchestrator 108-A and resource orchestrator 108-D (which coordinates the use of resources within domain 110-D) is shown as link 402; the link between resource orchestrator 108-B and resource orchestrator 108-D is shown as link 410; the link between resource orchestrator 108-C and resource orchestrator 108-D is shown as link 408; and the link between resource orchestrator 108-B and resource orchestrator 108-C is shown as link 412.

In the examples illustrated in FIG. 3 and FIG. 4, there are four network domains, and each network domain may include multiple physical nodes and optical transport network (OTN) overlay links. Each physical node may be a switch, router, or data center that includes one or more virtual machines and that is capable of invoking a set of service functions. For example each physical node may be capable of providing a firewall, deep packet inspection (DPI), a WAN optimization controller (WOC), customer premises equipment (CPE), a provider edge (PE) or, in general, any type of service function.

In various embodiments of the present disclosure, a distributed resource orchestration framework and a vertex-centric distributed computing approach may be used to identify all qualified SFCs in multi-domain networks. In some embodiments, after identifying all qualified chains, one or more SFCs may be selected for execution based on any suitable criteria. For example, an SFC may be selected for execution that best reflects user preferences for resource usage or other policy decisions. In another example, the lowest-cost disjoint SFC may be selected (e.g., to address protection concerns). In yet another example, multiple parallel SFCs may be selected for execution, according to a user preference or an applicable SFC selection policy. In some embodiments, a distributed resource orchestration framework and a vertex-centric distributed computing approach may be used to identify all feasible mappings for a virtual network request (or sub-requests thereof) in multi-domain networks.

In at least some embodiments, an SFC request may include information specifying the following request elements: the service functions to be performed, the resources required to perform those service functions (e.g., the required number of virtual machines and/or storage resources), and delay or bandwidth requirements for the links between the nodes on which the different service functions in the chain are to be performed. Similarly, a virtual network request may include information specifying a set of virtual nodes and a corresponding set of virtual links connecting various pairs of the virtual nodes, specifying any required resources for particular ones of the virtual nodes, and/or specifying any required resources for particular ones of the virtual links.

Figure 5:
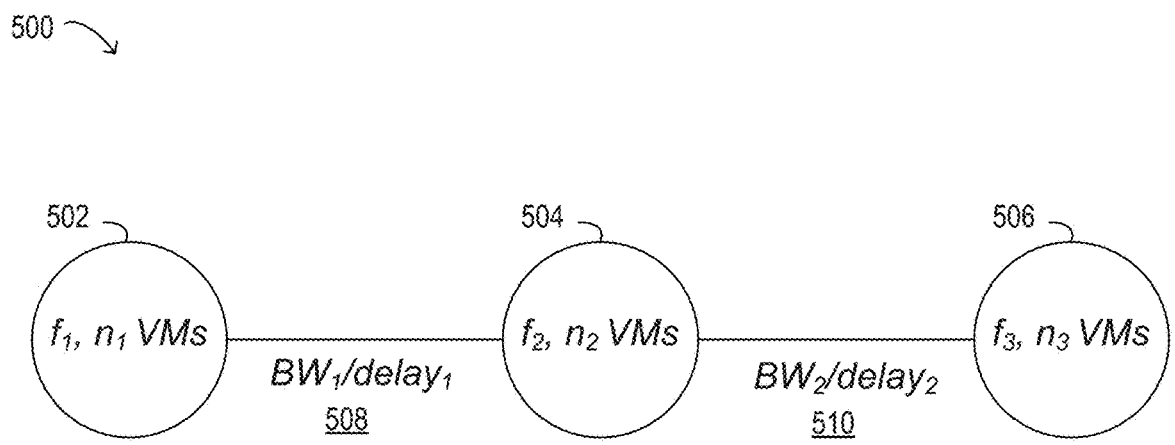
FIG. 5 depicts an abstraction of an example SFC request, according to one embodiment.

FIG. 5 depicts an abstraction of an example SFC request 500, according to one embodiment. In this example, to satisfy SFC request 500, the distributed resource orchestration mechanism may need to identify a first node 502 that includes $n_1$ virtual machines (VMs) and can perform a first service function, $f_1$; a second node 504 that includes $n_2$ virtual machines (VMs) and can perform a second service function, $f_2$; and a third node 506 that includes $n_3$ virtual machines (VMs) and can perform a third service function, $f_3$. In addition, the distributed resource orchestration mechanism may need to verify that the link between node 502 and node 504 meets a first set of bandwidth and/or delay requirements 508 (e.g., $BW_1$ and/or $delay_1$), and that the link between node 504 and node 506 meets a second set of bandwidth and/or delay requirements 510 (e.g., $BW_2$ and/or $delay_2$).

In contrast to other types of virtual network requests, SFC requests may include two unique characteristics: they may be more linear in topology, and they may be flexible in terms of the order in which the service functions are executed, in some cases. Based on these characteristics of SFC requests, the resource orchestration frameworks described herein may apply a vertex-centric distributed computing approach to solve service function chaining in multi-domain networks. In some embodiments, multiple service functions in an SFC can be mapped to a single physical node. In some embodiments, a linear-topology sub-request of a virtual network request may be represented using a depiction similar to that of SFC request 500. For example, a sub-request of a virtual network request may specify a first virtual node 502 that requires $n_1$ virtual machines (VMs) and a first service function, $f_1$; a second virtual node 504 that requires $n_2$ virtual machines (VMs) and a second service function, $f_2$; and a third virtual node 506 that requires $n_3$ virtual machines (VMs) and a third service function, $f_3$. The sub-request may also specify a first set of bandwidth and/or delay requirements 508 (e.g., $BW_1$ and/or $delay_1$) for the virtual link between virtual node 502 and virtual node 504, and a second set of bandwidth and/or delay requirements 510 (e.g., $BW_2$ and/or $delay_2$) for the virtual link between virtual node 504 and virtual node 506.

In some embodiments, an SFC request may specify a flexible-ordered service function chain for which any of multiple possible fixed-ordered chains, if found, would satisfy the request. For example, for a flexible-ordered service function chain $f_1*f_2*f_3$ any of six possible fixed-ordered chains, if found, would satisfy the request. These six fixed-ordered chains are $f_1 \cdot f_2 \cdot f_3$, $f_1 \cdot f_3 \cdot f_2$, $f_2 \cdot f_1 \cdot f_3$, $f_2 \cdot f_3 \cdot f_1$, $f_3 \cdot f_1 \cdot f_2$, and $f_3 \cdot f_2 \cdot f_1$. In this example, the symbol "*" between functions denotes a flexible ordering and the symbol "·" between functions denotes a fixed order.

As previously noted, in various embodiments, a vertex-centric distributed processing approach may include performing iterations of supersteps that are sequentially executed. Each superstep may involve receiving controller messages and/or other information at one or more resource orchestrators (such as various ones of the resource orchestrators 108 illustrated in FIG. 1, 3, or 4) or SDN controllers, performing local actions (in this case, executing a common compute function) at respective network domains 110, and then sending out controller messages to other resource orchestrators 108 or SDN controllers. In some embodiments, a vertex-centric distributed processing approach may be used with a suitable network operating system using distributed network domains such as those illustrated in FIGS. 2, 3, and 4. In some embodiments, a resource orchestrator 108 or an SDN controller for each network domain 110 may keep track of the network topology of its respective network domain 110.

In some embodiments, the controller messages may be inter-domain messages sent with respect to a sending vertex and a target vertex that are in different domains. In some embodiments, each controller message may include: a sending vertex identifier; a target vertex identifier, and a minimum distance from source vertex S to the target vertex. In various embodiments, different numbers of supersteps may be performed to identify all possible solutions to a distributed computation for solving an SFC request, a virtual network request (or a sub-request thereof) or another type of distributed computation.

As previously noted, in some embodiments, each network domain may include (or be associated with) a respective resource orchestrator that manages (and coordinates the use of) the physical nodes and links within its domain. These distributed resource orchestrators may be interconnected by control channels (e.g., in-band control channels or out-of-band control channels, in different embodiments). In at least some embodiments, each orchestrator may store information about each physical node as a vertex data structure and may store information about each overlay OTN link as an edge data structure. In at least some embodiments, each vertex data structure may include a current value, a set of incoming/outgoing edges, and a common compute( ) function (an example embodiment of which is illustrated by pseudo-code shown later), which may be a user-defined function. In at least some embodiments, each edge data structure may include information about a respective OTN link, such as its bandwidth, delay information, information about the cost to use the link, and/or any other information usable in the system. In some embodiments, each vertex may be able to send and/or receive messages to and/or from other vertices. Some messages may be delivered in memory (e.g., if they are exchanged between vertices that are within the same network domain or are controlled by the same orchestrator), while messages exchanged between vertices that are in different network domains or are controlled by different orchestrators may be delivered via various control channels.

Figure 6A:
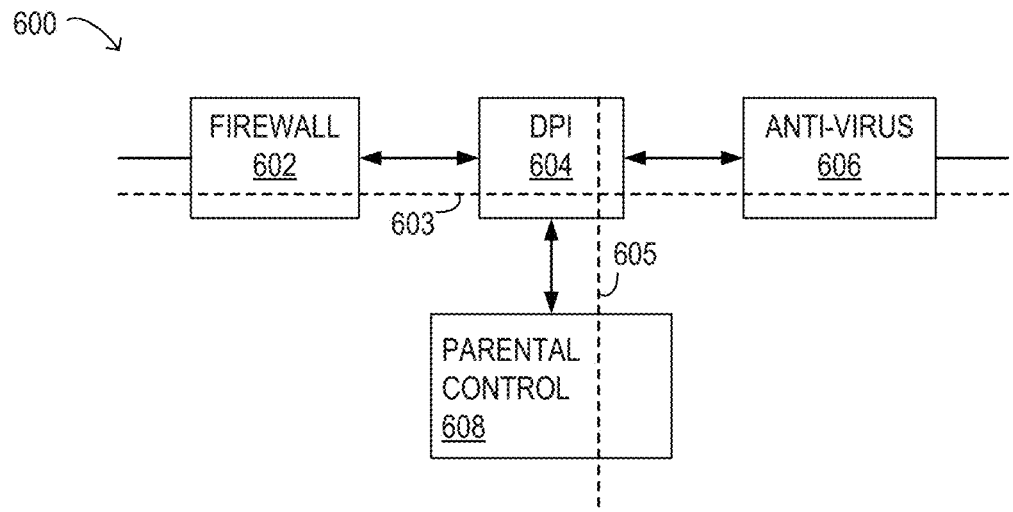
FIGS. 6A through 6D illustrate example mesh topologies for virtual networks to which the mechanisms for implementing distributed virtual network embedding may be applied, according to some embodiments.

FIGS. 6A through 6D illustrate example mesh topologies for virtual networks to which the mechanisms for implementing distributed virtual network embedding described herein may be applied, according to some embodiments. In these examples, virtual links are shown using solid arrows, and sub-requests are represented by dashed lines. For example, FIG. 6A illustrates a virtual network 600 containing four service or network functions 602, 604, 606, and 608, through which at least a portion of the network traffic passes. In this example, traffic first passes through a firewall 602, at which point some packets may be dropped. The remaining packets are forwarded to a Deep Packet Inspection (DPI) function 604. From DPI 604, some or all remaining packets may be forwarded to an anti-virus function 606 and/or to a parental control function 608 for further processing. Although the four service or network functions 602, 604, 606, and 608, and the links that connect them, are arranged in a mesh topology, in order to find a mapping solution for this virtual network, the mesh topology may be separated into multiple sub-requests, each having a linear topology, and mappings for each sub-request may be identified independently using a vertex-centric distributed computing approach, such as that described herein. Subsequently, the results may be combined to generate a solution for mapping virtual network 600 to physical nodes and links. In this example, a mapping for a chain of virtual nodes may be identified for a first linear sub-request (shown as 603), where the chain includes firewall 602 chained to DPI 604 and then to the anti-virus function 606. For a second sub-request (shown as 605), a mapping may be identified for a chain of virtual nodes that includes DPI 604, and parental control function 608. In this example, both of the two sub-requests include DPI 604. However, the two sub-requests do not share any overlapping links between the service and/or network functions of the mesh topology.

Figure 6B:
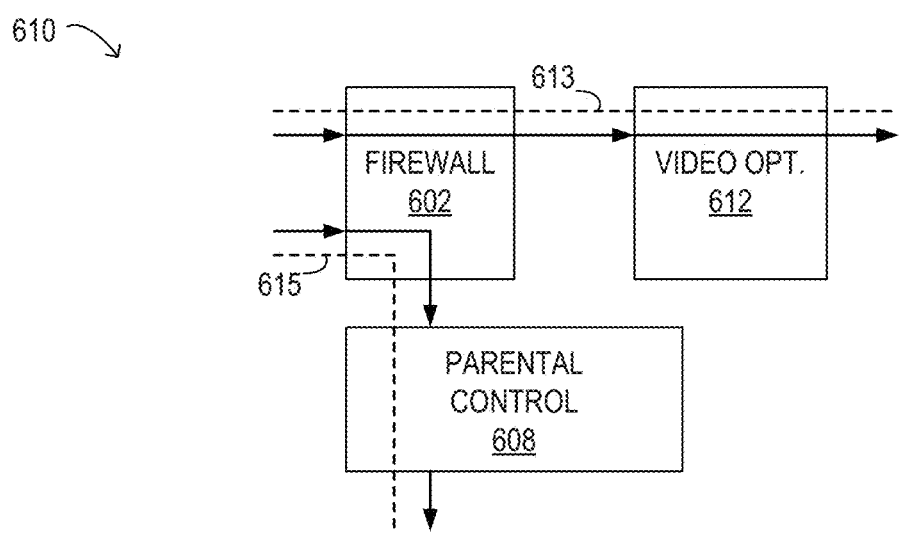

Another example of a virtual network having a mesh topology is illustrated in FIG. 6B. In this example, virtual network 610 includes a firewall 602, a video optimization function 612, and a parental control function 608. In order to find a mapping solution for this virtual network, the mesh topology may be separated into a first linear sub-request 613, which includes firewall 602 and video optimization function 612, and a second linear sub-request 615, which includes a firewall 602 and a parental control function 608. Mappings for each of these sub-requests may be identified independently using a vertex-centric distributed computing approach, such as that described herein, after which the results may be combined to generate a solution for mapping virtual network 610 to physical nodes and links. In this example, both of the two sub-requests include firewall 602. However, the two sub-requests do not share any overlapping links between the service and/or network functions of the mesh topology.

Figure 6C:
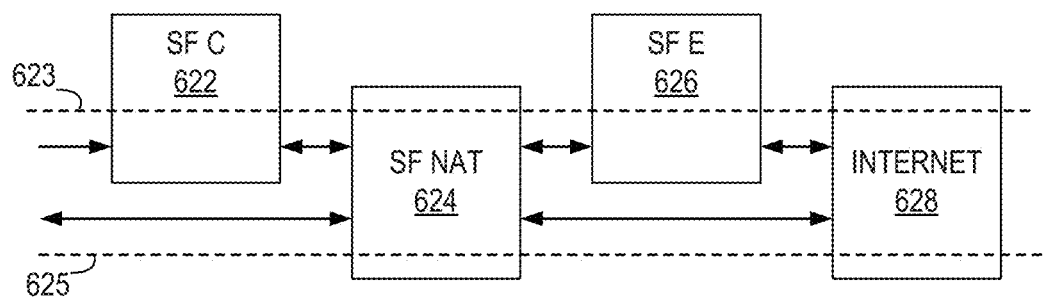

A third example of a virtual network having a mesh topology is illustrated in FIG. 6C. In this example, virtual network 620 includes a service function (SF) C 622, a service function (SF) E 626, a service function for network address translation (SF NAT) 624, and an internet function 628. In order to find a mapping solution for this virtual network, the mesh topology may be separated into a first linear sub-request 623, which includes all four of the service and/or network functions of the mesh topology, and a second linear sub-request 625, which includes only SF NAT 624 and internet function 628. Mappings for each of these sub-requests may be identified independently using a vertex-centric distributed computing approach, such as that described herein, after which the results may be combined to generate a solution for mapping virtual network 620 to physical nodes and links. In this example, both of the two sub-requests include SF NAT 624 and internet function 628. However, the two sub-requests do not share any overlapping links between the service and/or network functions of the mesh topology.

Figure 6D:
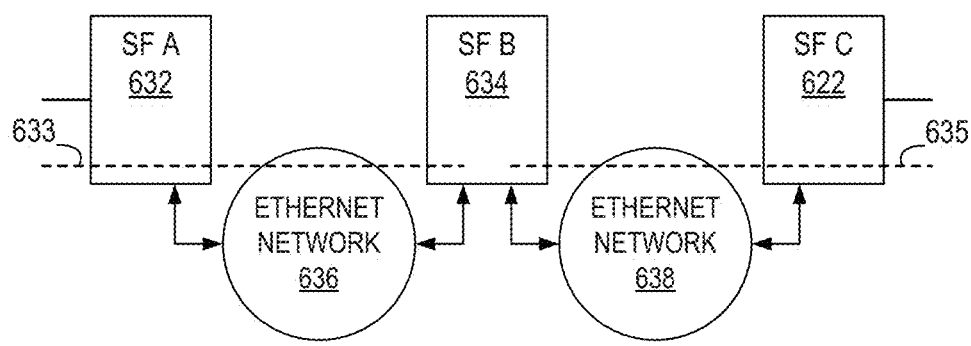

A fourth example of a virtual network having a mesh topology is illustrated in FIG. 6D. In this example, virtual network 630 includes a service function (SF) A 632, a service function (SF) B 634, a service function (SF) C 622, an Ethernet network 636, and an Ethernet network 638. In order to find a mapping solution for this virtual network, the mesh topology may be separated into a first linear sub-request 633, which includes SF A 632, Ethernet network 636, and SF B 634, and a second linear sub-request 635, which includes SF B 634, Ethernet network 638, and SF C 622. Mappings for each of these sub-requests may be identified independently using a vertex-centric distributed computing approach, such as that described herein, after which the results may be combined to generate a solution for mapping virtual network 630 to physical nodes and links. In this example, both of the two sub-requests include SF B 634. However, the two sub-requests do not share any overlapping links between the service and/or network functions of the mesh topology.

The virtual networks illustrated in FIGS. 6A through 6D are merely examples of virtual networks having mesh topologies. However, the techniques described herein for performing distributed virtual network embedding may be used to identify feasible mappings from the virtual nodes of any arbitrary virtual network to physical nodes, in different embodiments. In addition, the partitioning solutions shown for the virtual networks illustrated in FIGS. 6A through 6D are merely examples of partitioning solutions for these virtual networks. Other partitioning solutions may be possible for these virtual networks, in other embodiments.

As noted above, previously proposed virtual network mapping algorithms for directly mapping an entire virtual network request in a mesh topology have high computational complexity in centralized systems and also have high operational/signaling complexity of virtual node placement at domains and (for multi-domain cases) inter-domain paths between virtual nodes in distributed systems. For example, some proposed approaches address the problem of virtual network embedding in multi-domain networks, in which each domain has a part of a topology, based on a centralized framework in which a centralized orchestrator maintains a hierarchical topology database for all network domains in order to decide the inter-domain paths. This approach may have limitations in terms of scalability and potential inconsistency in network state, and the centralized framework may be unable to preserve confidentiality. Others have proposed distributed virtual network embedding algorithms in multi-domain networks in which an entire virtual network request is relayed across multiple domains until the completion of the virtual network embedding. The virtual network request is partially mapped in each domain based on the resource availability in each domain. However, this approach relies on a global view of resources when making decisions about the inter-domain paths on which to relay virtual network requests. Still others have proposed the use of a traffic-matrix based virtual network representation that relies on a collection of information about node types/costs in each domain, border nodes, and link costs between border nodes at a centralized repository, which is not scalable for large-scale networks.

In work directed to SFC requests, it has been shown that vertex-centric distributed computing has superior efficiency and scalability for linear topologies. In various embodiments of the systems described herein, resource orchestrators in a distributed resource orchestration framework may collaborate to partition a virtual network request over a mesh topology into multiple linear-topology sub-requests, to identify feasible mappings for each sub-request by applying, independently, a vertex-centric distributed processing approach to each sub-request, and to combine the feasible mappings for the sub-requests into a virtual network that satisfies the virtual network request. Given a virtual network request and a physical network whose topology can be partitioned and managed at distributed orchestrators, an objective of the distributed resource orchestration framework may be to find all feasible mappings of the virtual network request to the physical network. While several of the examples presented herein describe virtual network embedding techniques in terms of their application in a physical network that can be partitioned and managed at distributed orchestrators, these techniques may be applied in centralized environments as well as in distributed environments.

Figure 7:
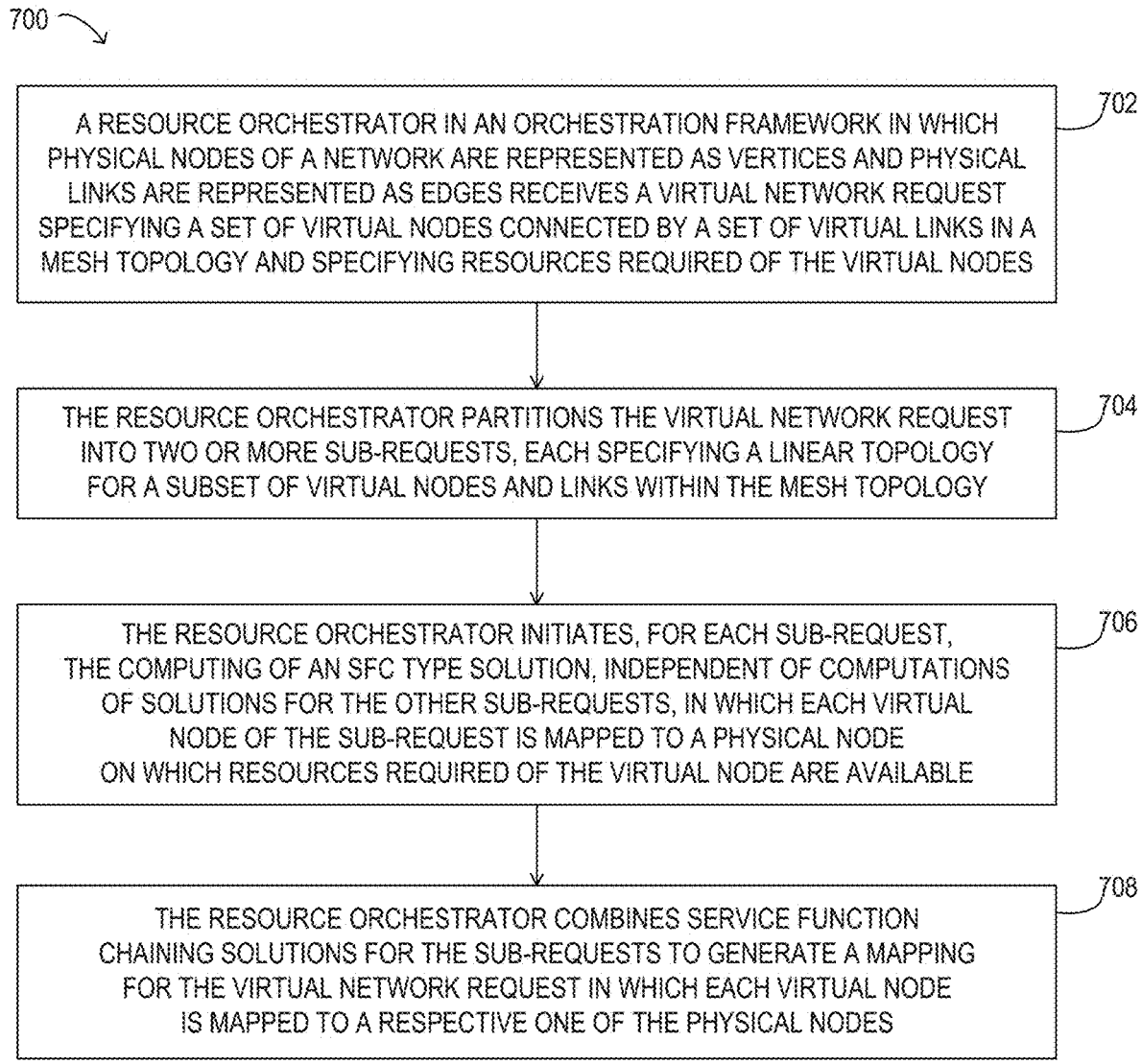
FIG. 7 is a flow diagram illustrating selected elements of a method for performing distributed virtual network embedding, according to one embodiment.

FIG. 7 is a flow diagram illustrating selected elements of a method 700 for performing distributed virtual network embedding, according to one embodiment. In some embodiments, method 700 may be performed by a master resource orchestrator on one of the physical nodes in a network of physical nodes to which the request is being mapped. In some embodiments, the network may be a multi-domain network. In this example embodiment, the method includes (at 702) a resource orchestrator in an orchestration framework in which physical nodes of a network are represented as vertices and physical links are represented as edges receiving a virtual network request that specifies a set of virtual nodes connected by a set of virtual links in a mesh topology and that specifies resources required of at least some of the virtual nodes. For example, the virtual network request may specify that a given virtual node requires a particular number of virtual machines (VMs) or that a given virtual node requires one or more particular network or service function(s) or application(s). In some embodiments, the virtual network request may also specify resources required of at least some of the virtual links, such as a certain amount of bandwidth or the satisfaction of certain delay requirements.

In the example embodiment illustrated in FIG. 7, method 700 may also include (at 704) the resource orchestrator partitioning the virtual network request into two or more sub-requests, each specifying a linear topology for a subset of virtual nodes and virtual links within the mesh topology. In some embodiments, two or more of the sub-requests may include a shared virtual node. In some embodiments, there may be no overlapping virtual links between any of the sub-requests. In some embodiments, the partitioning may produce a minimum set of linear-topology sub-requests for which there are no overlapping virtual links. Example methods for performing the partitioning are described in more detail below, according to some embodiments.

Method 700 may also include (at 706) the resource orchestrator initiating, for each sub-request, the computing of a service function chaining (SFC) type solution for mapping each of the virtual nodes of the linear topology of the sub-request to a physical node on which resources required of the virtual node are available. In some embodiments, the SFC type solutions may be identified using a vertex-centric distributed computing approach, such as that described herein. The solutions may be computed independently for each of the sub-requests. In some embodiments, the chaining solutions for two or more sub-requests may be computed in parallel. In other embodiments, the chaining solutions for the sub-requests may be computed sequentially. In some embodiments, two or more feasible solutions for mapping the virtual nodes of the linear topology of a given sub-request to physical nodes may be identified.

Method 700 may also include (at 708) the resource orchestrator combining the chaining solutions for the sub-requests to generate a mapping for the original virtual network request in which each virtual node is mapped to a respective one of the physical nodes. In some embodiments, this may include selecting one of two or more feasible solutions identified for one or more of the sub-requests. Example methods for combining the service function chaining solutions for the sub-requests to generate a mapping for the original virtual network request are described in more detail below, according to some embodiments.

In various embodiments of the present disclosure, different approaches may be taken to partitioning a virtual network request over a mesh topology into multiple linear-topology sub-requests. With any of these approaches, given a virtual network request, the objective is to partition a virtual network request to a minimum set of linear topologies that collectively reflect the virtual network request. In some embodiments, one or more constraints may be applied to the partitioning operation. Adherence to these constraints may serve to reduce the computation complexity when combining the results of applying vertex-centric distributed processing to identify feasible mappings for each of the sub-requests (e.g., by reducing the number of feasible mapping options identified for each sub-request) while also improving the overall performance of the vertex-centric distributed processing itself for all linear-topology sub-requests. In various embodiments, the values of the partitioning constraints described herein, or other partitioning constraints, may be default values for the network, may be determined and applied by the master resource orchestrator based on available resources, current conditions or workloads on the network, or various applicable system-wide, network-specific, request-specific, or customer-specific partitioning policies, or may be configurable by the requestor, in which case they may be specified for a particular virtual network request (e.g., in the virtual network request itself). In at least some embodiments, the partitioning of a virtual network request into a minimum set of linear-topology sub-requests according to various constraints may be an NP-complete problem solvable using heuristics such as those described herein or other heuristics.

In some embodiments, there may be a constraint specifying that there should be no overlapping links among the resulting set of linear topologies. For example, each overlapping link may result in more supersteps, more messages exchanged between orchestrator, potentially longer computation delays, and more complexity when applying vertex-centric distributed processing to identify feasible mappings for each of the sub-requests and/or when combining the results of that processing to generate an overall solution for the virtual network request. In other words, adherence to this constraint may cause a virtual network request to be partitioned into fewer linear-topology sub-requests than might otherwise be the case, resulting in fewer total messages exchanged, fewer feasible mappings for each longer sub-request, and fewer potential combinations of sub-request feasible mappings to be considered.

In some embodiments, there may be a constraint specifying that the lengths of the sub-requests, following partitioning of a virtual network request, should be balanced. For example, the constraint may specify that the difference between the lengths of any two sub-requests should be less than or equal to one. This may serve to reduce the time that it takes to perform the vertex-centric distributed processing to identify feasible mappings for each of the sub-requests, even when two or more sub-requests are processed in parallel, as there would not be one computation that takes much longer than the others and on which the master orchestrator would need to wait before combining feasible mappings for the sub-requests. For example, the system time required to perform the vertex-centric distributed processing may be largely based on the number of supersteps that need to be run, and the number of supersteps that need to be run is dependent on the maximum length of the linear topologies being processed at a given point in time, with the number of supersteps increasing as the maximum length of the linear topologies increases.

In some embodiments, there may be a constraint specifying the maximum length of any sub-request resulting from the partitioning of a virtual network request. However, the higher the value of this constraint (and thus the longer the linear topologies into which the virtual network request is partitioned), the fewer feasible mappings there will be for each sub-request, which simplifies the computation complexity, as described above. In some embodiments, there may be a delay constraint specifying that the maximum number of virtual links among any sub-request is no larger than a predetermined threshold value.

In some embodiments, if there are multiple partitioning options having the same maximum sub-request length, a partitioning solution in which there are higher resource requirements for virtual nodes at, or near, the beginning of a linear topology may be preferred, since there may be fewer vertices and corresponding edges that can satisfy the requirements, resulting in fewer feasible mappings and fewer successfully mapped messages exchanged between virtual nodes in subsequent positions within the linear topology.

In some embodiments, a master resource orchestrator may apply a shortest-first approach to the partitioning of a virtual network request. Using this approach, the mesh topology of the virtual network request may be partitioned into the shortest, equal-length, linear topologies first, after which these linear topologies may be one additional virtual node at a time until a length/delay constraint is reached. Once all possible linear topologies of a given length have been identified, the master resource orchestrator may identify a set of set of linear topologies of the given length (and/or a length that is one less than the given length) that contains all of the virtual links in the mesh topology, but has no overlapping links.

Figure 8:
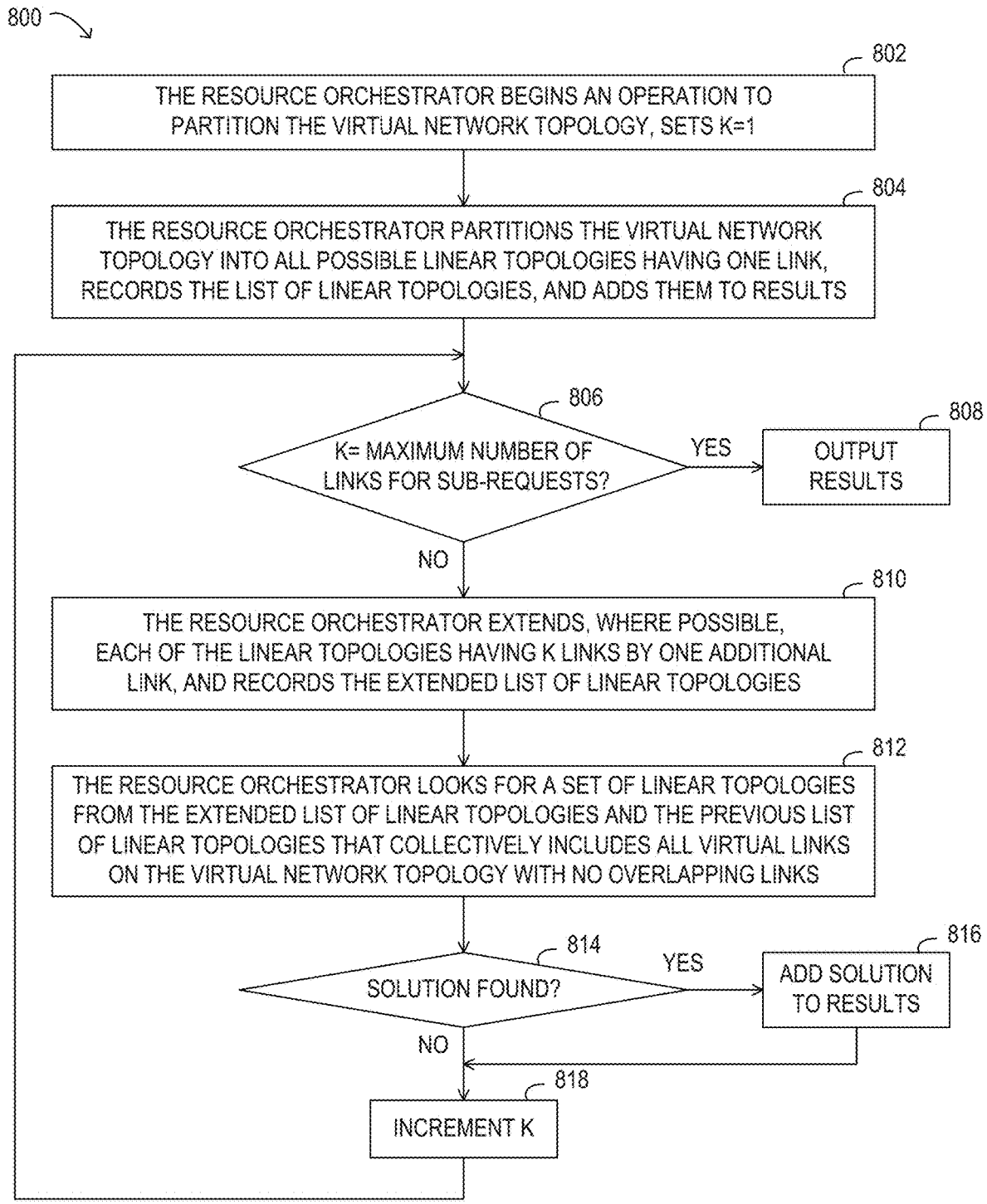
FIG. 8 is a flow diagram illustrating selected elements of a method for partitioning a virtual network request having a mesh topology into multiple sub-requests, each of which has a linear topology, according to one embodiment.

FIG. 8 is a flow diagram illustrating selected elements of a method 800 for partitioning a virtual network request having a mesh topology into multiple sub-requests, each of which has a linear topology, according to one embodiment. In some embodiments, method 800 may be performed by a master resource orchestrator on one of the physical nodes in a network of physical nodes to which the virtual network request is to be mapped. In some embodiments, the network may be a multi-domain network. In this example, method 800 uses a shortest-first approach to the partitioning, such as that described above. Method 800 includes (at 802) the resource orchestrator beginning an operation to partition the virtual network topology, and sets an indicator of the current linear topology length K to a value of 1. Method 800 also includes (at 804) the resource orchestrator partitioning the virtual network topology into all possible linear topologies having one link, recording these linear topologies in a list (e.g., a $List_K$) and adding them to a set of results (e.g., set of results $s_k$).

At 806, it may be determined (e.g., by the resource orchestrator) whether or not K is equal to a predetermined maximum number of virtual links for each sub-request (e.g., a predetermined threshold value). If so, method 800 may proceed to 808, where the current results of the partitioning operation (e.g., set of results $s_k$) are output and the partitioning operation may be complete. If not, method 800 may continue at 810. At 810, method 800 may include the resource orchestrator extending, where possible, each of the linear topologies having K links by one additional virtual link to a corresponding neighbor of the last virtual node in the linear topology, and recording the extended list of linear topologies (e.g., as $List_{K+1}$).

Figure 9:
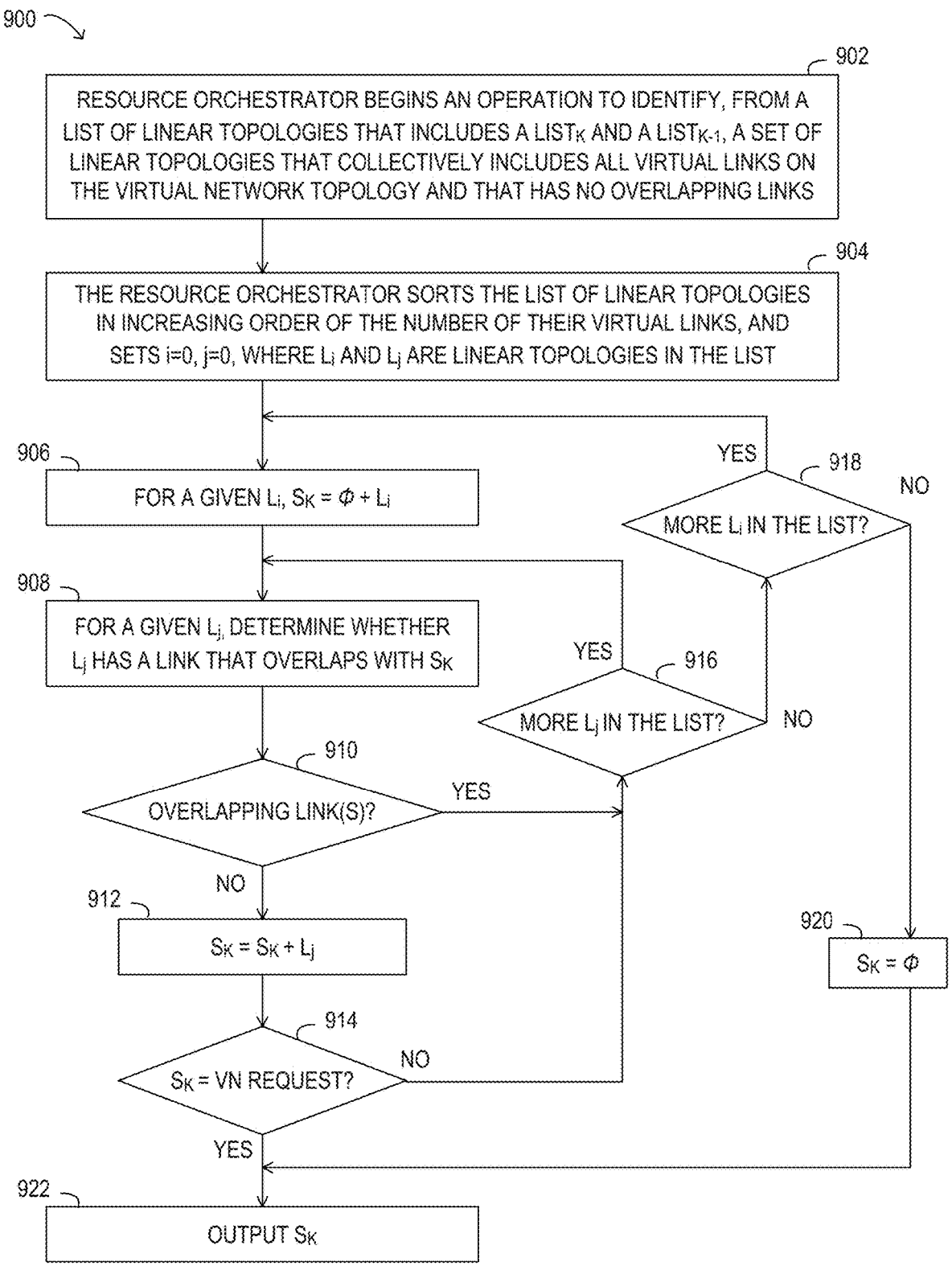
FIG. 9 is a flow diagram illustrating selected elements of a method for identifying a set of linear topologies from an extended list of linear topologies and the previous list of linear topologies that collectively includes all virtual links on the mesh topology for the virtual network request with no overlapping links, according to one embodiment.

Method 800 may include (at 812) the resource orchestrator looking for a set of linear topologies from the extended list of linear topologies and the previous list of linear topologies that collectively includes all virtual links on the mesh topology for the virtual network request with no overlapping links. An example method 900 for identifying such a set of linear topologies is illustrated in FIG. 9 and described below, according to one embodiment. If (at 814) a solution is found, the solution may be added to the results (e.g., set of results $s_k$) at 816. Otherwise, there may be no change to the results. Method 800 may include (at 818) incrementing K and returning to 806. In this case, one or more of the operations shown as elements 808-818 in FIG. 8 may be repeated for each additional value of K until the value of K reaches the predetermined maximum number of virtual links for each sub-request, after which the cumulative results up to that point (e.g., the set of results $s_k$) may be output (at 808).

FIG. 9 is a flow diagram illustrating selected elements of a method 900 for identifying a set of linear topologies from an extended list of linear topologies and the previous list of linear topologies that collectively includes all virtual links on the mesh topology for the virtual network request with no overlapping links, according to one embodiment. The method may include iteratively examining the virtual links in each linear topology, within two nested loops, to determine whether or not they are also included in another linear topology. For example, the orchestrator may add a first linear topology to a temporary result set. The resource orchestrator may then search each other linear topology, one at a time, to see if it includes any links that overlap with the linear topology in the temporary result set. If none of the links of a given linear topology overlap with those of the linear topology, they may be added to the temporary result set. If no solution is identified, the temporary result set may be cleared and the process may repeated starting with a different initial linear topology.

In some embodiments, method 900 may be performed by a master resource orchestrator on one of the physical nodes in a network of physical nodes to which the virtual network request is to be mapped. In some embodiments, the network may be a multi-domain network. In some embodiments, the linear topologies that make up the final set of linear topologies may include linear topologies from at most two lists of linear topologies corresponding to consecutive values of K. In other words, to complete a set of linear topologies in which the maximum number of links for any sub-request is equal to a given value of K, the resource orchestrator may consider only the linear topologies having K links (e.g., those on a $List_K$) or K−1 links (e.g., those on a $List_{K-1}$). This may guarantee that the linear topologies in the final set of linear topologies are well balanced, with all of them having the same length, or there being a difference between the lengths of the shortest and longest sub-requests in the set of no more than one link.

In this example, method 900 may include (at 902) a resource orchestrator beginning an operation to identify, from a list of linear topologies that includes a $List_K$ and a $List_{K-1}$, a set of linear topologies that collectively includes all virtual links on the mesh topology for the virtual network request with no overlapping links. Method 900 may include (at 904) the resource orchestrator sorting the list of linear topologies in increasing order of the number of their virtual links, and setting i=0, j=0, where $L_i$ and $L_j$ are linear topologies in the list.

At 906, for a given linear topology $L_i$, method 900 may include the resource orchestrator recording the current results as $S_K=\Phi+L_i$, where $S_K$ represents the current results and $\Phi$ represents the empty set. At 908, for a given $L_j$, the method may include determining whether or not $L_j$ includes a link that overlaps with a link already in $S_K$. If (at 910) there are overlapping links, method 900 may proceed to 916. At 916, if there are more linear topologies $L_j$ on the list, method 900 may return to 908. Otherwise, method 900 may proceed to 918. If (at 918) there are more linear topologies $L_i$ on the list, method 900 may return to 906. Otherwise, method 900 may proceed to 920. At 920, since no feasible solution has been identified, method 900 may include resetting the current results to the empty set as $S_K=\Phi$, after which this result may be output (at 922).

If (at 910) there are no overlapping links, method 900 may continue at 912. At 912, method 900 may include the resource orchestrator updating the current results as $S_K=S_K+L_j$. In other words, the linear topology $L_j$ may be added to the current results $S_K$. If (at 914) the current results $S_K$ now satisfy the virtual network request, they may be output by the resource orchestrator as an identified set of linear topologies from an extended list of linear topologies and the previous list of linear topologies that collectively includes all virtual links on the mesh topology for the virtual network request with no overlapping links (at 922).

In some embodiments, once a solution has been identified, meaning that a set of linear topologies has been identified that collectively includes all virtual links on the mesh topology with no overlapping links, no further attempts to identify such a set may be performed. In other embodiments, one or more additional attempts may be made to identify such sets. In some embodiments, if two or more such sets are identified, one or more feasible mappings to physical nodes may be identified for each of them and they may all be considered when attempting to combine feasible mappings to generate a solution for the virtual network request. In some embodiments, the linear topology that serves as the initial linear topology $L_i$ may be chosen at random. In other embodiments, the linear topology that serves as the initial linear topology $L_i$ may be chosen based on its position within the list of identified linear topologies (e.g., it may be the first linear topology that was identified), based on the resources required of one or more of the virtual nodes in the linear topology, or using other criteria. Similarly, linear topologies other than the initial linear topology $L_i$ (e.g., the linear topology that serves as the initial linear topology $L_j$) may be examined and compared with the temporary results in a random order, in order of their positions within the list of identified linear topologies, in an order that is based on the resources required of one or more of the virtual nodes in the linear topologies, or in an order that is based on other criteria, in different embodiments.

Distributed Chaining

In at least some embodiments of the distributed resource orchestration framework described herein, there may be no global network topology and no global node information available. Instead, each orchestrator may only have access to a partition of a global network topology. In such embodiments, in order to identify one or more candidate solutions for a chaining request, such as an SFC request or a linear-topology sub-request of a virtual network request, a vertex-centric distributed process may be adopted, in which each computation is broken down into iterations, called supersteps. In such embodiments, in each superstep, the compute( ) function of each vertex may be executed once. For example, in some embodiments, upon the arrival of a chaining request, a source orchestrator may send the request to all participating orchestrators and may coordinate all orchestrators to execute the compute( ) function in each superstep. During each superstep, these compute functions may be executed substantially in parallel on vertices (nodes) in different domains, but they may synchronize with each other at the end of each superstep. For example, before moving on to the next superstep, the resource orchestrators may ensure that message exchanges for the current superstep have ceased and that all of the vertices received the controller messages that they were supposed to receive from the other vertices over the control channels.

Once a qualified solution to a chaining request is found at a vertex, it may be emitted to the source orchestrator. The distributed computing may halt when there are no further messages exchanged between orchestrators. In some embodiments, after obtaining all qualified chaining solutions from the participating orchestrators, the source orchestrator may select an optimal or preferred multi-domain chaining solution for execution based on various user preferences and/or applicable resource usage policies, and may inform the associated orchestrators (e.g., those that manage the resources selected to execute the requested chain) that they should configure the physical nodes within their own domains accordingly (e.g., as needed to perform the various functions of the requested chain). As previously noted, in some embodiments, dependent on various user preferences and/or applicable resource usage policies, the source orchestrator may select two or more of the possible chaining solutions for execution in parallel. In such embodiments, the source orchestrator may inform all of the orchestrators associated with the selected chaining solutions that they should configure the physical nodes within their own domains to perform particular ones of the functions of the chain.

In some embodiments, providing distributed chaining, given a multi-domain network topology (a physical infrastructure topology) that includes vertices (nodes) and edges (links between the nodes), given a set of service functions and the number of compute and/or storage resources available at each vertex, and given the delay and bandwidth at each edge, may include identifying all possible solutions for a chaining request. As previously noted, each chaining request may specify required resources. For example each virtual node in a sub-request of a virtual network request may require a certain number of compute and/or storage resources (e.g., virtual machines) and may require a certain amount of bandwidth (or have an upper limit on delay) for outgoing traffic. In some embodiments, after identifying all feasible mapping solutions for chaining request, the solutions may be pruned according to various policies, requirements, or constraints imposed by a service provider or the requestor of the services. For example, they may be pruned to include only those solutions that have the lowest total cost or the lowest total delay, a subset of solutions that include multiple disjoint chains, those solutions that do (or do not) include bi-directional chains, or solutions that meet multiple different constraints. In some embodiments, the solutions may be pruned by a load balancer that selects a mapping solution based on the current loading on the nodes that are mapped to the various resources required by virtual nodes in the chain. In some embodiments, the computing of a solution (or set of solutions) for a chaining request may be a non-deterministic polynomial-time hard (NP-hard) problem. In some cases, virtual network requests over mesh topologies may be divided into multiple linear-topology sub-requests for mapping to physical nodes, and the results may subsequently be merged back together in order to satisfy these requests.

In at least some embodiment of the present disclosure, a vertex value data structure and a controller message format may be defined for a vertex-centric distributed computing approach for generating chaining solutions in multi-domain networks. Note that such a vertex data structure and message format may be specific for a particular distributed computing problem. Table 2 below illustrates an example vertex value data structure for use in the context of an SFC request or in the context of a linear-topology sub-request of a virtual network request, according to at least one embodiment.

TABLE 2

Vertex Value vertexID (the current vertex ID)
{f$_i$} : a set of network/service functions or applications available at the vertex a set of resources at the vertex (e.g., VMs, storage, etc.)

In this example, the vertex value data structure includes a vertex identifier, a set of network functions, service functions and/or applications that are available at the vertex, and a set of resources available at the vertex (which may include compute and/or storage resources). In some embodiments, the set of network functions, service functions and/or applications that are available at the vertex may be a subset of the network functions, service functions and/or applications that are supported in the multi-domain network or may be a subset of the network functions, service functions and/or applications that are implemented at the vertex (e.g., if some of the network functions, service functions and/or applications are not currently available for inclusion in requested chaining solution). In at least some embodiments of the present disclosure, if all, or a great many, of the physical nodes and links in a network to which a virtual network request is being mapped include all of the resources needed for all of the virtual nodes in a sub-request of the virtual network request, this may be the worst case scenario from a computation complexity standpoint because of the large number of potential solutions to be identified and evaluated. However, in a typical chaining request, there might be fewer potential solutions because only certain nodes include the resources needed for at least some of the virtual nodes in the chain.

Table 3 below illustrates an example controller message format for use in the context of an SFC request or in the context of a linear-topology sub-request of a virtual network request, according to at least one embodiment.

TABLE 3

Controller Message Format requestID
the current chain

In this example, each message exchanged as part of a vertex-centric distributed computation for identifying solutions to a chaining request in a multi-domain network may include an identifier of the chaining request, and the current chain (which may be a partially mapped chain or a completed chain, in different controller messages).

In at least some embodiments, the vertex-centric distributed processing approach that is applied to identify all possible chaining solutions for a given chaining request may include three major components: the vertex value, the message format, and the compute( ) function, examples of which are shown in Table 2, in Table 3, and in the pseudo-code below, respectively. As shown in Table 3, which describes an example of the message format, the current chain may include a sequence of elements of the form <vertexID, nextVertexID, edge info>, each representing a vertex with a particular vertexID that might or might not have been mapped to a corresponding function or virtual node. In these elements, empty brackets (shown as < >) may indicate that the corresponding function or virtual node has not yet been mapped to a vertex. In at least some embodiments, the vertices and their corresponding functions or virtual nodes must maintain the same order in the chain. The nextVertexID indication in each element of the sequence may be used for ordering mapped vertices in the chain.

In some embodiments, the value of the vertexID for a given vertex may be assigned by its local resource orchestrator, and may be unique within its domain. In some embodiments, to distinguish between vertices in different domains, the vertexID may include an identifier of the domain or its resource orchestrator. In other embodiments, within controller messages exchanged between vertices, the vertexID may be augmented with an identifier of the domain or its resource orchestrator. In some embodiments, the value of the chaining request identifier may be assigned by the source resource orchestrator when the chaining request is received or when the source resource orchestrator sends a controller message that includes the chaining request to the other resource orchestrators in the multi-domain network.

One example embodiment of a compute( ) function to be executed at various vertices (nodes) when applying vertex-centric distributed chaining is illustrated by the pseudo-code below. In this example, the compute function performs operations during the first superstep (superstep 0) that are not performed during one or more subsequent supersteps.

```
compute( )
    if (superstep == 0 && vertex.isQualified( )){
        for each neighbor{
            if (edge.isQualified( )){
                generate a chain with the vertex mapped to the function or
                virtual node;
                    send the chain to the neighbor;}}}
    for each message received{
        if (vertex.isQualified( )) {
            if (all functions/nodes in the chain are mapped) {
                emit the completed chain to the source orchestrator;}
            else {
                for each neighbor{
                    if (edge.isQualified( )){
                        generate the chain with the vertex mapped to the
                        function/node;
                        send the chain to the neighbor;}}}
```

In the example embodiment illustrated above, the compute function may call (or otherwise invoke) a vertex.isQualified( ) method to determine whether or not the particular vertex on which the compute function executes is a qualified vertex. In this example embodiment, for each neighbor vertex of the particular vertex, the compute function may also call (or otherwise invoke) an edge.isQualified( ) method to determine whether or not the link between the particular vertex on which the compute function executes and one of its neighbor vertices is a qualified link. If, for one or more of the neighbor vertices, both of these methods return True, the current vertex may extend the chain (by mapping itself to a service in the chain and including a link to the neighbor vertex) and may send the extended chain to that neighbor vertex in a controller message. In this example, if the vertex.isQualified( ) method returns False, the vertex.isQualified( ) method may not be called for any of the neighbor vertices. In this example, if the vertex.isQualified( ) method returns True, the current chain may be extended and controller messages may be sent only to those neighbor vertices with which the current vertex has a qualified connection (where the edge.isQualified( ) method returns True). In at least some embodiments, if, during superstep 0, no qualifying vertices are found, the distributed computation may stop without returning any feasible solutions. Similarly, if, during a subsequent superstep, none of the partially mapped chains generated by qualified vertices can be completed, the distributed computation may stop without returning any feasible solutions.

In various embodiments, the method vertex.isQualified( ) may call one or more other methods to determine whether or not the particular vertex on which the compute function executes is a qualified vertex. In one example, the method vertex.isQualified( ) may call a method vertex.hasFunction( ), which determines whether or not the current vertex includes functionality that is required to begin, extend, or complete the requested chain. In another example, the method vertex.isQualified( ) may call a method vertex.hasResource( ) that determines whether or not required resource capacity is available on the current vertex (e.g., whether or not required compute and/or storage resources are available at the current vertex). In yet another example, the method vertex.isQualified( ) may call a method vertex.hasVMs( ), which, more specifically, determines whether or not the current vertex includes a required number of VMs for the next element in the chain. Still other methods may be called as part of qualifying the particular vertex on which the compute function executes, in different embodiments. In some embodiments, both a vertex.hasFunction( ) method and another method that determines whether or not required resources are available at the vertex (such as a vertex.hasResource( ) method or a vertex.hasVMs( )(method) may need to return True in order for the vertex.isQualified( ) method to return True.

Similarly, in some embodiments, the method edge.isQualified( ) may call one or more other methods to determine whether or not the link between the particular vertex on which the compute function executes and one of its neighbor vertices is a qualified link. In one example, the method edge.isQualified( ) may call a method edge.hasBW( ), which determines whether or not the link between the particular vertex on which the compute function executes and its neighbor vertex has sufficient bandwidth to extend the chain to the neighbor vertex. In another example, the method edge.isQualified( ) may call a method edge.delayOK( ), which determines whether or not the delay over the link between the particular vertex on which the compute function executes and its neighbor vertex meets delay requirements for extending the chain to the neighbor vertex (e.g., that the link has a delay that is within an acceptable range specified for the requested chain). Still other methods may be called as part of qualifying the link between the particular vertex on which the compute function executes and one of its neighbors, in different embodiments. In some embodiments, the method edge.isQualified( ) may call two or more methods, all of which may need to return True in order for the edge.isQualified( ) method to return True.

Figure 10:
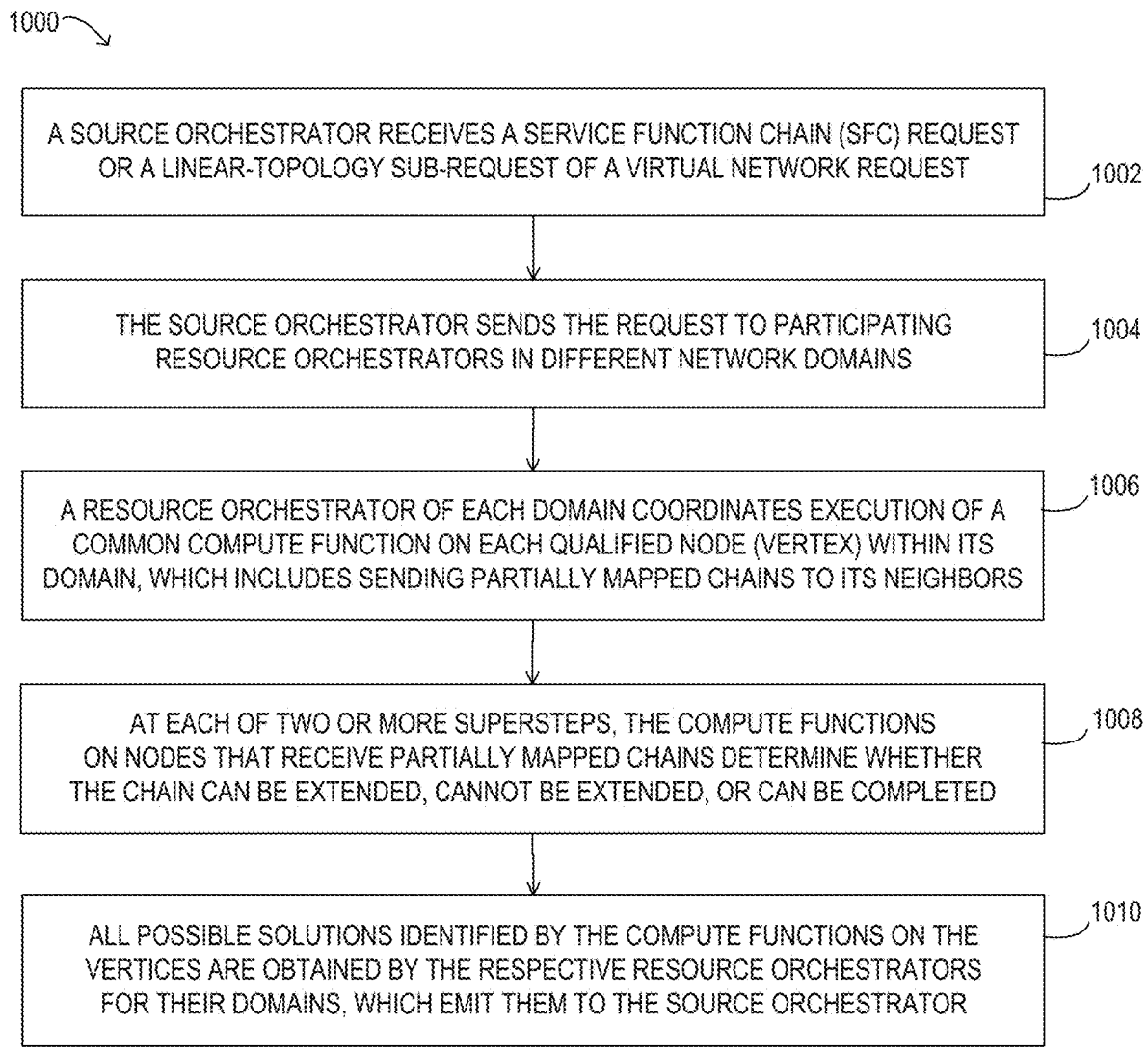
FIG. 10 is a flow diagram illustrating selected elements of a method for performing vertex-centric distributed computing to identify all feasible mappings for a chain of virtual nodes, and corresponding virtual links, in a sub-request of a virtual network request, according to one embodiment.

FIG. 10 is a flow diagram illustrating selected elements of a method 1000 for performing vertex-centric distributed computing to identify all feasible mappings for a chain of virtual nodes, and corresponding virtual links, in a service function chain (SFC) request or in a linear sub-request of a virtual network request over a mesh topology in a network, according to one embodiment. In some embodiments, the network may be a multi-domain network. In this example embodiment, the method includes (at 1002) a source orchestrator receiving one such linear-topology sub-request. The method includes (at 1004) the source orchestrator sending the request to participating resource orchestrators in different network domains.

In this example, the method includes (at 1006) the resource orchestrators of each domain coordinating the execution of a common compute function on each qualified node (vertex) its domain (e.g., on each physical node that includes the required resources for the first virtual node in the sub-request). This may include the qualified nodes sending partially mapped chains to their neighbor nodes. The method includes (at 1008), at each of two or more supersteps, the compute function on these and other nodes that receive a partially mapped chain determining whether the chain can be extended, cannot be extended, or can be completed. The method also includes (at 1010) all possible solutions identified by the compute functions on the vertices being obtained by the respective resource orchestrators for their domains, which emit them to the source orchestrator.

In some embodiments, an objective of the vertex-centric distributed approach described herein is to identify all qualified mapping solutions for a sub-request of virtual network request over a mesh topology. In some embodiments, the results of this computation may be pruned to identify only those solutions that meet other criteria, according to policies of the service provider and/or requestor preferences. For example, in some embodiments, the potential solutions may be pruned to include only those potential solutions having a total cost that is below a specified total cost threshold or having a total delay that is below a specified total delay threshold. The total cost of a solution may be specified in terms of real costs (e.g., fiber costs or the cost of physical links) or in terms of bandwidth or delay, in different embodiments. In some embodiments, the potential solutions may be pruned to include only those potential solutions that meet multiple such constraints (e.g., constraints on two or more of: cost, delay, and/or bandwidth). In some embodiments, the selection of one or more of the potential solutions may be determined at runtime by a load balancer. In some embodiments, for protection purposes, the potential solutions may be pruned to include a set of potential solutions that include disjoint chains. For example, if the chains in the pruned set of potential solutions do not include any overlapping resources (e.g., no overlapping physical links or physical nodes), and if one of the resources in a selected chain in the set becomes unavailable, it will not affect the availability of the other chains in the pruned set of potential solutions.

Figure 11:
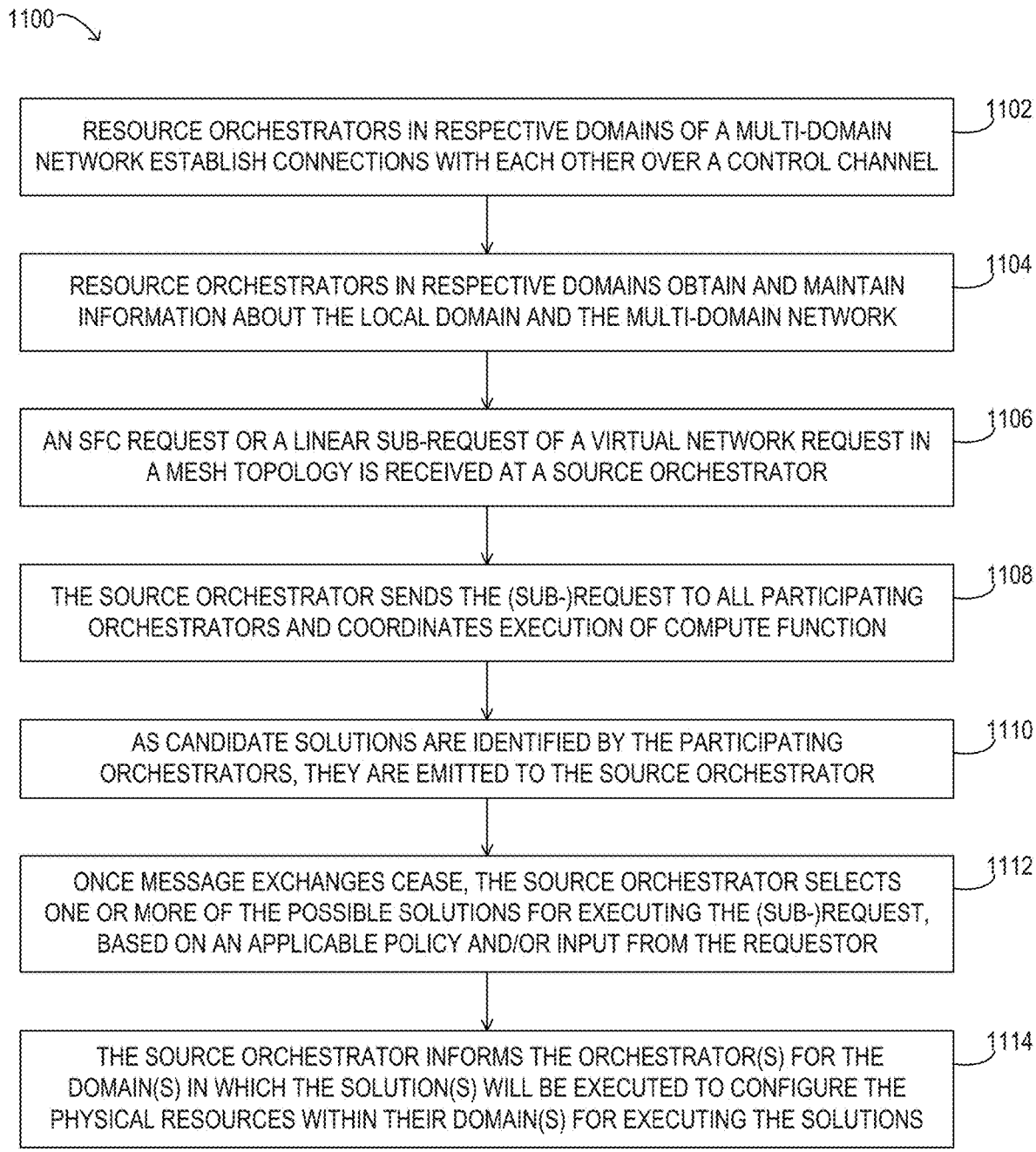
FIG. 11 is a flow diagram illustrating selected elements of a method for satisfying a linear-topology sub-request of a virtual network request, according to one embodiment.

FIG. 11 is a flow diagram illustrating selected elements of a method 1100 for satisfying an SFC request or a linear-topology sub-request of a virtual network request, according to one embodiment. In this example embodiment, the method includes (at 1102) the resource orchestrators in respective domains of a multi-domain network establishing connections with each other over a control channel. The method includes (at 1104) the resource orchestrators in the respective domains obtaining and maintaining information about their local domains and about the multi-domain network. For example, in some embodiments, the resource orchestrators may store this information in memory on the nodes on which they reside (e.g., in vertex value data structures, edge data structures, and/or other data structures). While coordinating a vertex-centric distributed computation to identify all qualified solutions for the SFC request or linear-topology sub-request in a multi-domain network, the local resource orchestrators may also maintain (e.g., in memory) information representing the virtual network requests or sub-requests thereof, SFC requests, partially mapped service function chains, completed service function chains, or other information usable in computing solutions for various virtual network requests (or linear-topology sub-requests thereof) or SFC requests, in different embodiments.

In this example embodiment, the method includes (at 1106) receiving an SFC request or a linear sub-request of a virtual network request in a mesh topology at a source orchestrator. The method also includes (at 1108) the source orchestrator sending the SFC request or linear sub-request to all participating orchestrators in the multi-domain network and coordinating the execution of a common compute function, as described herein. As candidate solutions are identified by the participating orchestrators (at 1110), the method includes emitting them to the source orchestrator. Once (at 1112) the message exchanges cease, the method includes the source orchestrator selecting one or more of the possible solutions for executing the SFC request or linear sub-request, based on an applicable policy and/or input from the requestor. The method also includes (at 1114) the source orchestrator informing the orchestrator(s) for the domain(s) in which the solutions will be executed to configure the physical resources within their domain(s) for executing the solutions.

Figure 12:
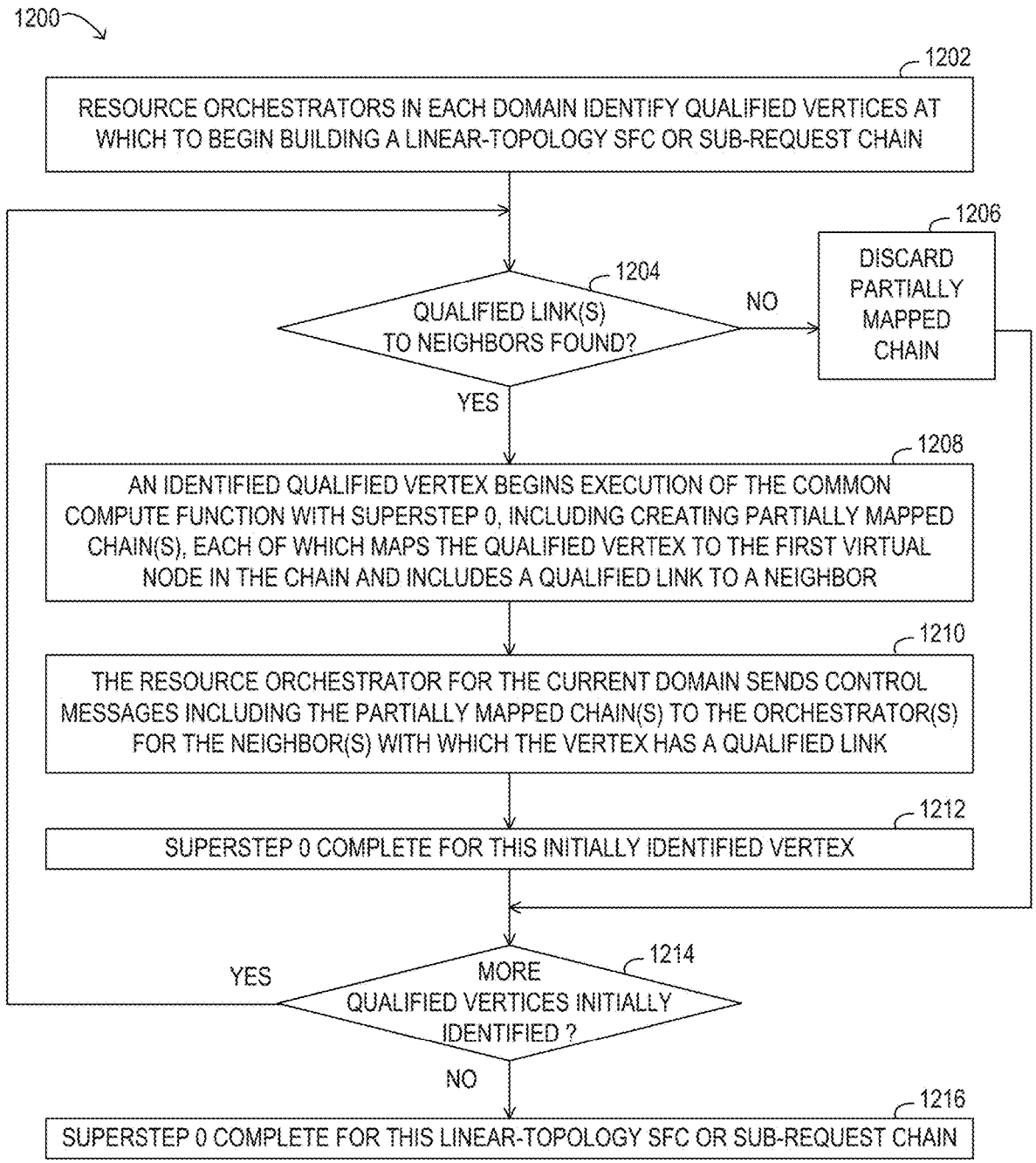
FIGS. 12 and 13 illustrate selected elements of an example method for performing a compute( ) function, according to one embodiment.
Figure 13:
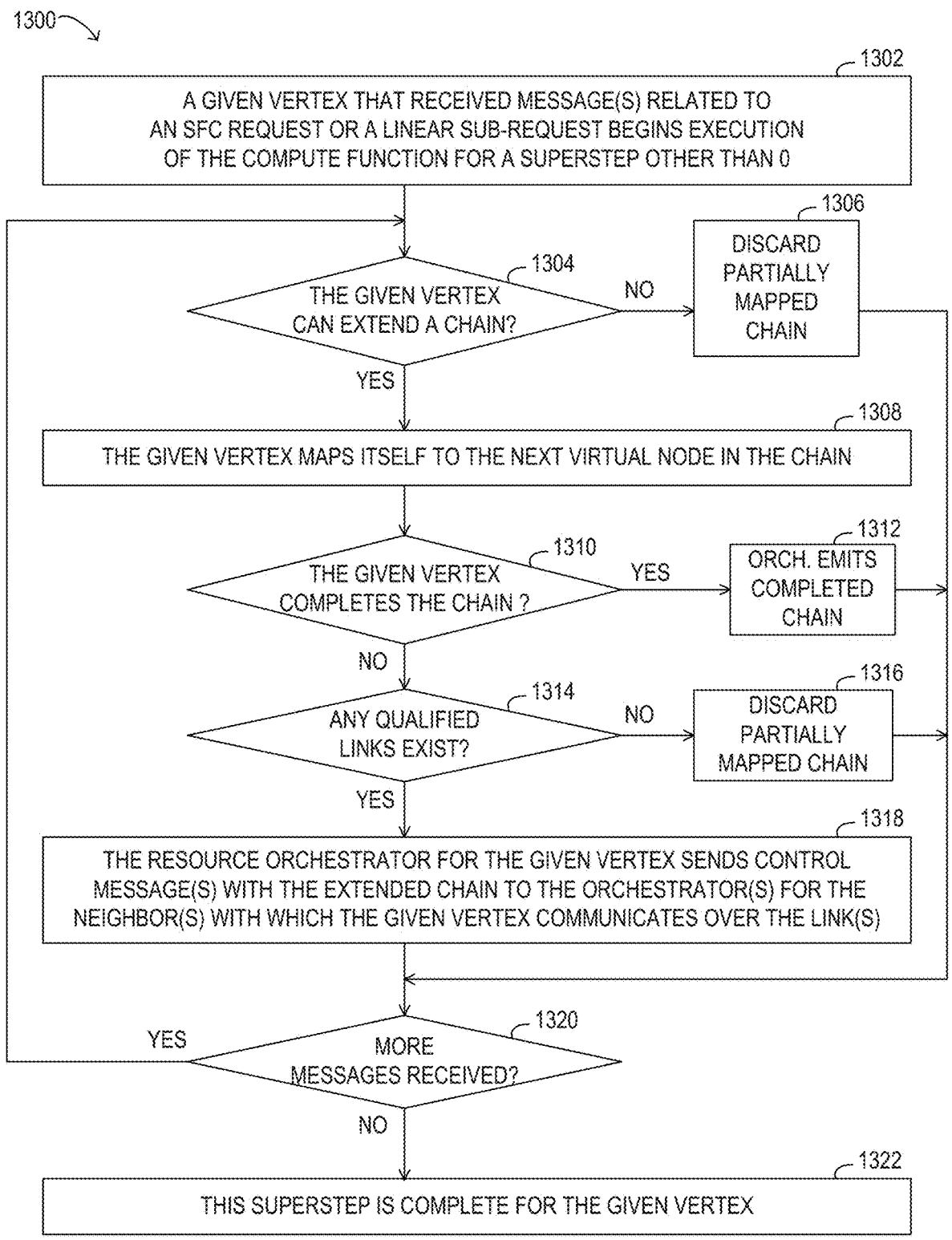

FIGS. 12 and 13 illustrate selected elements of an example method for performing a compute( ) function, such as that described above. More specifically, FIG. 12 illustrates selected elements of a method 1200 for performing superstep 0 of the compute function, according to one embodiment. In this example embodiment, during superstep 0, each qualified vertex sends a message to each potentially qualified neighbor (neighbors that have qualified links to the qualified vertex and that may also include the required resources for the next virtual node in a service function chain or a linear sub-request of a virtual network request in a mesh topology). In this example embodiment, the method includes (at 1202) the resource orchestrators in each network domain identifying any qualified vertices (each of which corresponds to a physical node) at which to begin building a given linear-topology SFC or sub-request chain. For example, a source resource orchestrator in one domain may send a controller message that includes an empty chain to the respective resource orchestrators for one or more other domains, each of which may identify any vertices (physical nodes) in its domain that include the required resources for the first virtual node in the linear-topology chain. Each vertex that is identified as a qualified vertex may be mapped to the first virtual node in a respective partially mapped chain.

In this example embodiment, the method includes (at 1204), determining whether there are any qualified links between the given vertex and its neighbors (e.g., links in the physical infrastructure that meet bandwidth and/or delay requirements for the linear-topology chain). If not, the method includes discarding the partially mapped chain that includes the identified qualified vertex (as in 1206). If (at 1204) one or more qualified links between the given vertex and its neighbors is found, the method includes (at 1208) one of the identified qualified vertices beginning execution of the common compute function with superstep 0, including, for any qualified links from the qualified vertex to a neighbor, creating a partially mapped chain that maps the qualified vertex to the first virtual node in the chain and includes the qualified link to the neighbor. In some embodiments, when a neighbor with a qualified link is in a different domain than the qualified vertex, the method also includes (at 1210) the resource orchestrator for the current domain sending a control message that includes the partially mapped chain(s) to the orchestrator(s) for the neighbor(s) with which the vertex has a qualified link, after which superstep 0 is complete for this initially identified qualified vertex (as in 1212). In some embodiments in which a neighbor with a qualified link is in the same domain as the qualified vertex, the domain controller may not send a control message to any other orchestrator, but may handle the next superstep for that neighbor itself. In other embodiments in which a neighbor with a qualified link is in the same domain as the qualified vertex, messages may be exchanged between the two vertices through writes to and reads from a memory.

In this example embodiment, if (as shown in 1214) there were more qualified vertices initially identified (at step 1202), the operations shown in 1204-1212 may be repeated, as appropriate, for each additional one of the initially qualified vertices. If, or once (at 1214), there are no more qualified vertices that were initially identified to process, superstep 0 may be complete for this linear-topology SFC or sub-request chain (as in 1216). Note that while FIG. 12 illustrates an embodiment in which the operations shown in 1204-1212 are performed for each initially identified qualified vertex in series, in at least some embodiments of the present disclosure, these operations may be performed substantially in parallel for some or all of the initially identified qualified vertices.

FIG. 13 illustrates selected elements of a method 1300 for performing supersteps of the compute function described above other than superstep 0, according to one embodiment. More specifically, FIG. 13 illustrates the actions taken on one vertex (physical node) that receives a controller message including a partially mapped chain for a linear-topology SFC or a linear sub-request of a virtual network request in a mesh topology, and that may or may not be able to be extended or completed on the given vertex, depending on whether it includes required resources for the next virtual node in the linear-topology SFC or sub-request chain. In this example embodiment, the method includes (at 1302) a given vertex that received one or more such controller messages beginning execution of the compute function for a superstep other than superstep 0 (e.g., for the superstep following the superstep in which the controller message was sent to the given vertex). The method includes (at 1304) determining whether the received controller message includes a partially mapped chain for a linear-topology sub-request that can be extended (or completed) at the given vertex. If it is determined that the received controller message includes a partially mapped chain for a linear-topology sub-request that cannot be extended (much less completed) at the given vertex, the method includes discarding the partially mapped chain that was included in the received message (as in 1306).

If (at 1304) it is determined that the received controller message includes a partially mapped chain for a linear-topology SFC or sub-request that can be extended at the given vertex, the method includes (at 1308) the given vertex mapping itself to the next virtual node in the chain. The method also includes (at 1310) determining whether or not the mapping of the given vertex to the next virtual node in the chain completes the chain. If so, the mapping is completed for this candidate solution, and the method includes the orchestrator for the domain in which the given vertex resides emitting the completed chain to the source resource orchestrator (as in 1312).

If (at 1310) it is determined that the partially mapped chain in the received controller message is not completed by mapping of the given vertex to the next virtual node in the chain, the method may include continuing the attempt to identify a potential candidate solution for the linear-topology SFC or sub-request chain. In the example embodiment illustrated in FIG. 13, this includes (at 1314) determining whether or not there are any qualified links between the given vertex and its neighbors (e.g., links in the physical infrastructure that meet bandwidth and/or delay requirements for the linear-topology SFC or sub-request chain). If not, the method includes discarding the partially mapped chain that includes the identified qualified vertex (as in 1316). If (at 1314) one or more qualified links between the given vertex and its neighbors is found (and if any of the neighbors with qualified links are in a different domain than the given vertex), the method includes the resource orchestrator for the given vertex sending a respective control message with the extended chain to the orchestrator for each of the neighbor(s) in other domains with which the given vertex communicates over the qualified link(s). In some embodiments in which a neighbor with a qualified link is in the same domain as the given vertex, the domain controller may not send a control message to any other orchestrator, but may handle the next superstep for that neighbor itself. In other embodiments in which a neighbor with a qualified link is in the same domain as the given vertex, messages may be exchanged between the two vertices through writes to and reads from a memory.

If (as shown at 1320) more controller messages related to the linear-topology SFC or sub-request chain were received by the given vertex, the operations shown in elements 1304-1318 may be repeated, as appropriate, for each additional message that was received. If, or once (at 1320), there are no additional received messages to process, this superstep is complete for the given vertex (as shown in 1322).

In the example embodiment described above, during each superstep other than superstep 0, the operations shown in FIG. 13 are repeated for each vertex that received a controller message from a resource orchestrator in the previous superstep. In at least some embodiments, during each superstep, the operations shown in FIG. 13 may be performed substantially in parallel for two or more vertices that received a controller message from a resource orchestrator in the previous superstep. In some embodiments, the total number of supersteps performed by the compute function in response to a linear-topology SFC or sub-request chain may be equal to number of virtual nodes included in the linear-topology SFC or sub-request chain.

In the example illustrated in FIGS. 12 and 13, during superstep 0, the compute function is executed to identify any vertices (physical nodes) on which required resources for the first virtual node in a linear-topology SFC or sub-request chain are available and to send a partially mapped chain to its neighbor vertices (physical nodes) with which it has qualifying links. During superstep 1, the compute function is executed to identify any of those neighbor vertices (nodes) on which required resources for the second virtual node in the linear-topology SFC or sub-request chain are available and to send an extended partially mapped chain to their neighbors (i.e., to the neighbors of the neighbors), if there are qualifying links to those neighbor vertices (physical nodes). During superstep 2, the compute function is executed to determine whether the neighbors of the neighbors can complete the chain by adding a mapping for the third virtual node in the linear-topology SFC or sub-request chain, and to return any completed chains to the source resource requestor. This example shows that, in at least some embodiments, the number of supersteps will be equal to the number of virtual nodes in the linear-topology SFC or sub-request chain, illustrating the scalability of this approach.

In some embodiments, messages exchanged between a pair of resource orchestrators at a particular superstep may be combined. However, in at least some embodiments, the physical nodes may not communicate with each other during distributed computing (e.g., when performing the functions of an SFC or of another type of distributed operation or computation).

Figure 14:
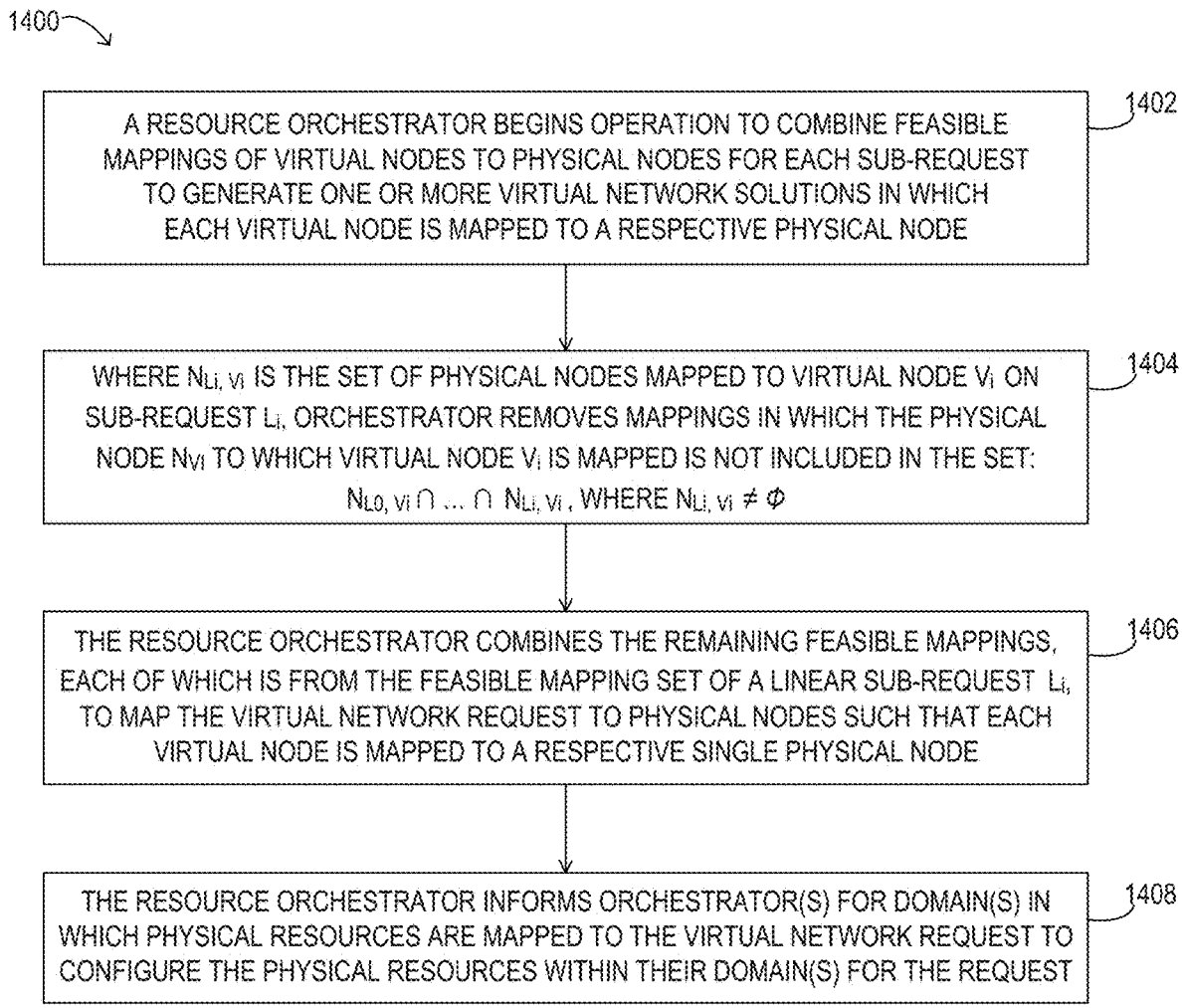
FIG. 14 is a flow diagram illustrating selected elements of a method for combining feasible mapping solutions for each of multiple linear-topology sub-requests into which a virtual network request over a mesh topology has been partitioned, according to one embodiment.

FIG. 14 is a flow diagram illustrating selected elements of a method 1400 for combining feasible mapping solutions for each of multiple linear-topology sub-requests into which a virtual network request over a mesh topology has been partitioned, according to one embodiment. In some embodiments, method 1400 may be performed by a master resource orchestrator on one of the physical nodes in a network of physical nodes to which the virtual network request is being mapped. In some embodiments, the network may be a multi-domain network.

In this example, method 1400 includes (at 1402) a resource orchestrator beginning an operation to combine feasible mappings of virtual nodes to physical nodes for each sub-request to generate one or more virtual network solutions in which each virtual node is mapped to a respective physical node. In this example embodiment, (at 1404), where $N_{Li, Vi}$ is the set of physical nodes mapped to virtual node $V_i$ on sub-request $L_i$, method 1400 includes the resource orchestrator removing any mappings in which the physical node $N_{VI}$ to which virtual node $V_1$ is mapped is not included in the set:

$$N_{Li,Vi} \cap \ldots \cap N_{Li,Vi}, \text{ where } N_{Li,Vi} \neq \Phi$$

Method 1400 also includes (at 1406) the resource orchestrator combining the remaining feasible mappings, each of which is selected from the feasible mapping set of a linear sub-request $L_i$, to map the virtual network request to physical nodes such that each virtual node is mapped to a respective single physical node. At 1408, method 1400 includes the resource orchestrator informing orchestrator(s) for domain(s) in which physical resources are mapped to the virtual network request to configure the physical resources within their domain(s) for the request.

Figure 15B:
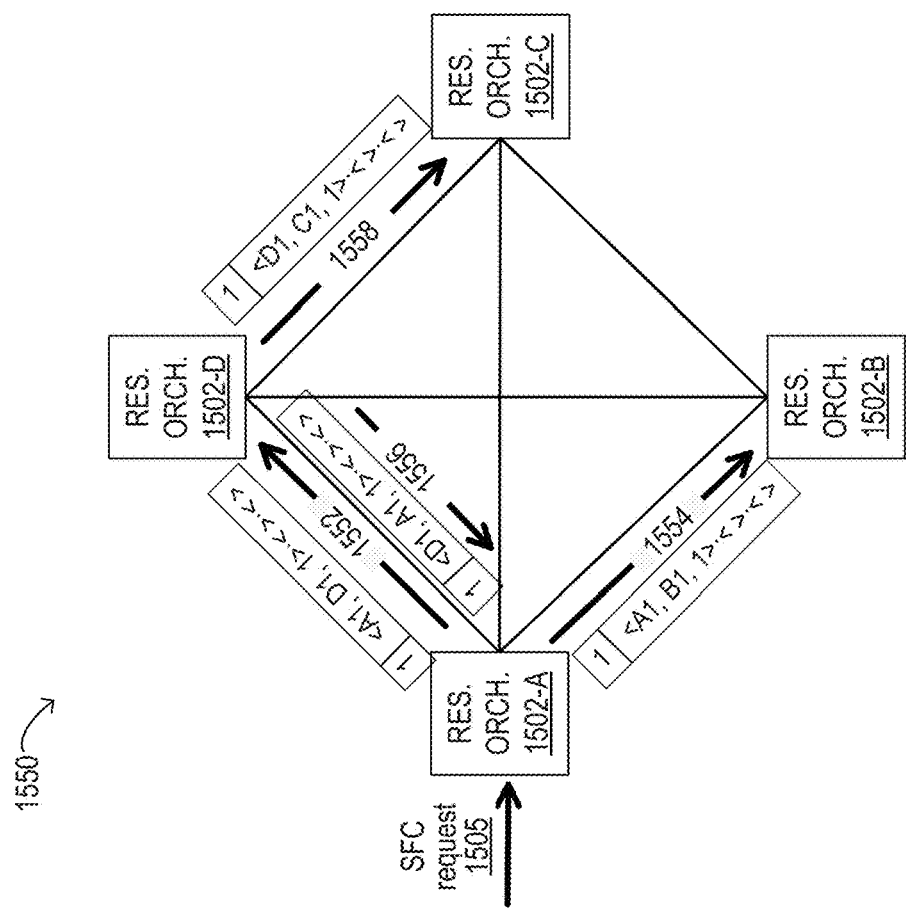
FIGS. 15A-15D illustrate an example of the use of vertex-centric distributed computing for generating candidate solutions to a service function chain request, according to one embodiment.
Figure 15A:
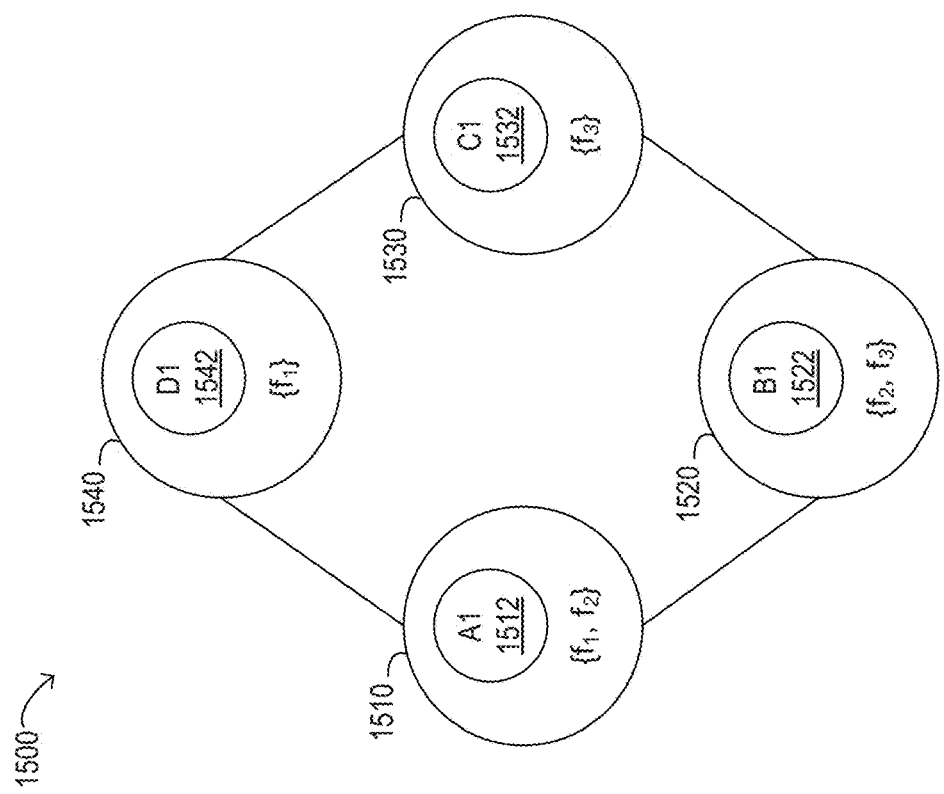

The vertex-centric distributed computing approach described above, which may be applied to virtual network requests and service function chains in linear topologies or to linear sub-requests of a virtual network request in a mesh topology, may be further illustrated by way of the example illustrated in FIGS. 15A-15D. More specifically, FIGS. 15A-15D illustrate an example of the use of vertex-centric distributed computing for generating one or more candidate solutions to a service function chain request, according to one embodiment. In this example, vertex-centric distributed computing is used to generate one or more mapping solutions for a fixed-ordered SFC request $f_1 \cdot f_2 \cdot f_3$ that has a request ID=1. In this example, FIG. 15A presents a multi-domain network 1500 that includes four domains (A, B, C, and D), shown as domains 1510, 1520, 1530, and 1540, respectively. In this example, each domain includes a single node (A1 1512, B1 1522, C1 1532, and D1 1542, respectively), and each node has a set of service functions that is a subset of all the available service functions in the multi-domain network. In this example, node A1 (1512) in domain A (1510) includes service functions $f_1$ and $f_2$, node B1 (1522) in domain B (1520) includes service functions $f_2$ and $f_3$, node C (1532) in domain C (1530) includes service function $f_3$, and node D1 (1542) in domain D (1540) includes service function $f_1$.

In this example, the service function request is for a fixed order chain $f_1 \cdot f_2 \cdot f_3$. While not all of the nodes include all of the service functions included in the requested service function chain, in this example (for simplicity of illustration), is it assumed that all of the nodes (vertices) and edges (links) meet the other qualifying requirements for the requested service function chain. More specifically, it is assumed that the number of compute and/or storage resources required for each of the supported service functions are available on each node (vertex), and that bandwidth and/or delay requirements are met for all of the edges (links) between the neighboring nodes that include the service functions to be mapped as part of a candidate solution for the service function chain request. For example, all of the delays between neighboring nodes (and service functions) in domains A 1510 and D 1540, domains D 1540 and C 1530, domains C 1530 and B 1520, and domains A 1510 and B 1520 are assumed to be 1.

Figures 15C, 15D:
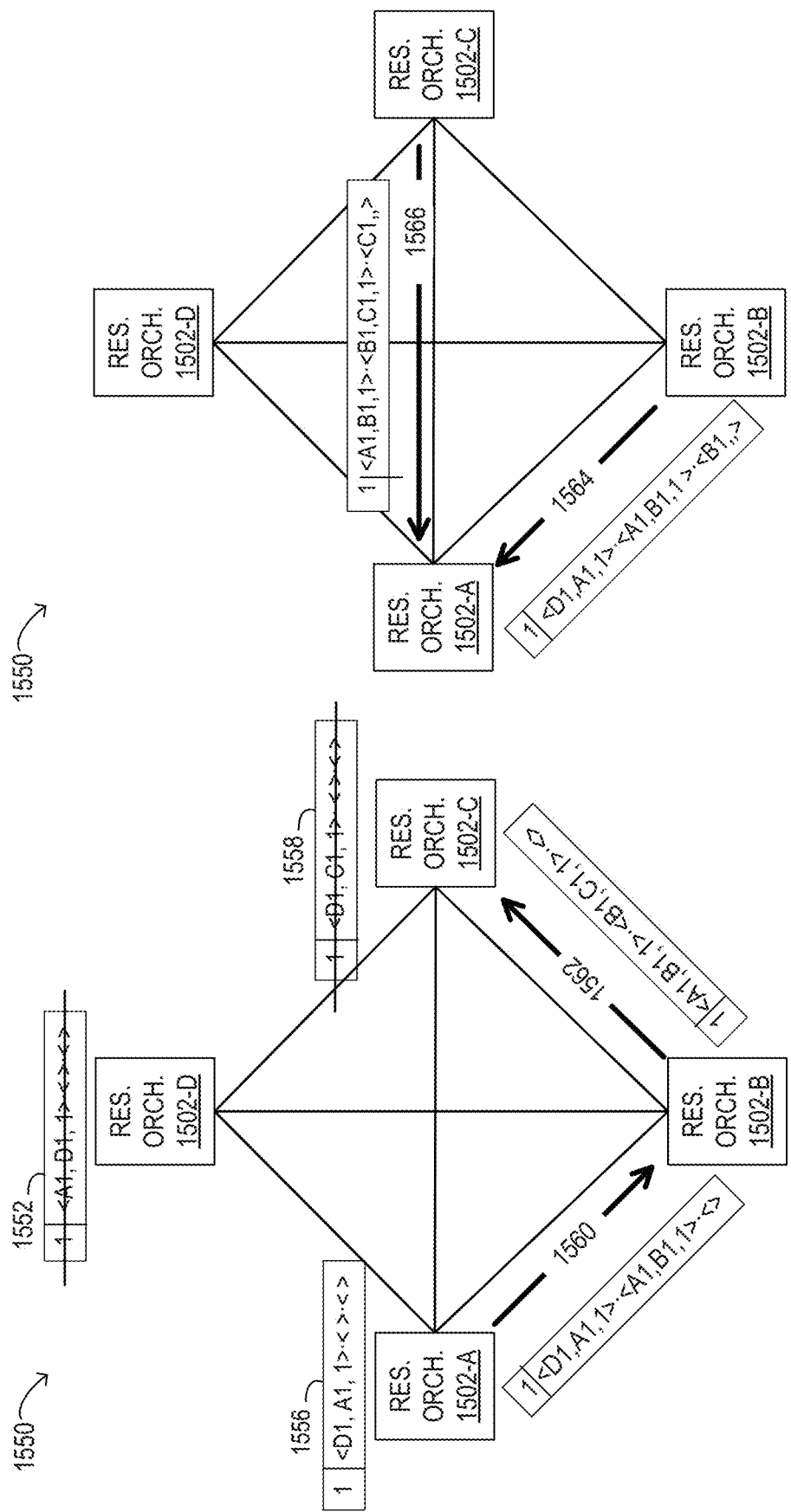

FIGS. 15B-15D illustrate the operations of the vertex-centric distributed computing on a distributed resource orchestration architecture 1550 over three supersteps. The distributed resource orchestration architecture 1550 includes the communication channels (or links) over which controller messages are exchanged between the respective resource orchestrators of the domains A 1510, B 1520, C 1530, and D 1540 illustrated in FIG. 15A. These resource orchestrators are shown as resource orchestrator A (1502-A), resource orchestrator B (1502-B), resource orchestrator C (1502-C), and resource orchestrator D (1502-D), respectively. In this example, an SFC request 1505 is submitted to resource orchestrator A (1502-A). This resource orchestrator may be (or may serve as) a source orchestrator, which may be the resource orchestrator for a master domain in the multi-domain network.

In the first superstep (superstep 0), resource orchestrator A (1502-A), as the source orchestrator, forwards the SFC request 1505 to the other three resource orchestrators (resource orchestrators B, C, and D) in the distributed resource orchestration architecture 1550. Each of the resource orchestrators may then identify any qualified vertices with which to start building a candidate solution for SFC request 1505. For example, since SFC request 1505 includes a fixed-ordered chain, each resource orchestrator may identify any vertices within their respective domains that include the first function in SFC request 1505 (i.e., service function $f_1$). In this example, the initially identified qualified vertices include node A1 (1510) and node D1 (1540). Note that, in this example, it is assumed that nodes A1 and D1 have sufficient resources for performing service function $f_1$, and so they are qualified nodes.

In this example, during superstep 0, each vertex (node) that was identified as having the first function $f_1$, in this case, nodes A1 (1510) and D1 (1540) executes a portion of a compute function such as that described above. In this case, for each of its neighbors, each of these vertices generates partially mapped SFC in which the vertex itself is mapped to the first function in the chain, and in which the partially mapped SFC includes a qualified link to a neighbor. The resource orchestrator for the domain in which the vertex resides then sends an appropriate controller message containing one of the partially mapped SFCs to each of those neighbors. For example, because node A1 (1512) in domain A (1510) includes service function $f_1$ (which is the first service function in the requested service function chain), and has qualified links to node B1 (1522) in domain B (1520) and node D1 (1542) in domain D (1540), it creates two partially mapped chains in which node A1 is mapped to the first function in the SFC and is linked to either node B1 or node D1, respectively.

In this example, resource orchestrator A (1502-A) sends a controller message 1554 to the resource orchestrator B (1502-B) for domain B (1520). Controller message 1554 includes the SFC request identifier (1) and the partially mapped chain (<A1, B1, 1>•< >•< >). The values within the first bracket in the controller message indicate that node A1, which is the first item, is the vertex that maps to the first service function $f_1$, and that node B1 is the vertex to which the partially mapped chain is sent over a link with a delay value of 1. Since the other service functions in the SFC request are not yet mapped, the partially mapped service function chain included in controller message 1554 includes two empty brackets. Similarly, resource orchestrator A (1502-A) sends a controller message 1552 to the resource orchestrator D (1502-D) for domain D (1540). Controller message 1552 includes the SFC request identifier (1) and the partially mapped chain (<A1, D1, 1>•< >•< >). The values within the first bracket in the controller message indicate that node A1, which is the first item, is the vertex that maps to the first service function $f_1$, and that node D1 is the vertex to which the partially mapped chain is sent over a link with a delay value of 1. Since the other service functions in the SFC request are not yet mapped, the partially mapped service function chain included in controller message 1552 includes two empty brackets.

In superstep 0, because node D1 (1542) in domain D (1540) also includes service function $f_1$ (which is the first service function in the requested service function chain), and has qualified links to node A1 (1512) in domain A (1510) and node C1 (1532) in domain C (1530), it creates two partially mapped chains in which node D1 is mapped to the first function in the SFC and is linked to either node B1 or node D1, respectively. In this example, resource orchestrator D (1502-D) sends a controller message 1556 to the resource orchestrator A (1502-A) for domain A (1510). Controller message 1556 includes the SFC request identifier (1) and the partially mapped chain (<D1, A1, 1>•< >•< >). The values within the first bracket in the controller message indicate that node D1, which is the first item, is the vertex that maps to the first service function $f_1$ and that node A1 is the vertex to which the partially mapped chain is sent over a link with a delay value of 1. Since the other service functions in the SFC request are not yet mapped, the partially mapped service function chain included in controller message 1556 includes two empty brackets. Similarly, resource orchestrator D (1502-D) sends a controller message 1558 to the resource orchestrator C (1502-C) for domain C (1530). Controller message 1558 includes the SFC request identifier (1) and the partially mapped chain (<D1, C1, 1>•< >•< >). The values within the first bracket in the controller message indicate that node D1, which is the first item, is the vertex that maps to the first service function $f_1$, and that node C1 is the vertex to which the partially mapped chain is sent over a link with a delay value of 1. Since the other service functions in the SFC request are not yet mapped, the partially mapped service function chain included in controller message 1558 includes two empty brackets.

In this example, since neither node B1 (1522) nor node C1 (1532) includes service function $f_1$ (which is the first service function in the requested service function chain), these nodes are not qualified nodes and no controller messages are sent from their respective resource orchestrators to the resource orchestrators of their neighbors during superstep 0. Once all of the vertices (nodes) have received the controller messages that they are supposed to receive, superstep 0 ends. FIG. 15B illustrates that, at the end of the superstep 0, four controller messages containing partially mapped service function chains have been delivered to destination vertices. More specifically, node A1 has received controller message 1552, node B1 has received controller message 1554, node C1 has received controller message 1558, and node D1 has received controller message 1558, all of which are described above.

As described above, during supersteps other than superstep 0, each vertex (node) that received a controller message related to the SFC request during the previous superstep processes those messages and determines whether or not the partially mapped service function chains in those messages can be extended or completed. For example, FIG. 15C illustrates that, during superstep 1, node A1 (which received a partial chain <D1, A1, 1>•< >•< >) is able to extend the chain to <D1, A1, 1>•<A1, B1, 1>•< >, since the function $f_2$ (the second function in the requested service function chain) is available at node A1 (1512), and node A1 has a qualified link to its neighbor node B1 (1522). In this example, resource orchestrator A (1502-A) sends a controller message 1560 that includes this extended service function chain to the resource orchestrator for node B1 (resource orchestrator B, 1502-B) that includes the extended service function chain.

Similarly, FIG. 15C illustrates that, during the second superstep (superstep 1), node B1 (which received a partial chain <A1, B1, 1>•< >•< >) is able to extend the chain to <A1, B1, 1>•<B1, C1, 1>•< >, since the function $f_2$ (the second function in the requested service function chain) is available at node C1 (1532), and node B1 has a qualified link to its neighbor node C1 (1532). In this example, resource orchestrator B (1502-B) sends a controller message 1562 that includes this extended service function chain to the resource orchestrator for node C1 (resource orchestrator C, 1502-C) that includes the extended service function chain.

In this example, during superstep 1, vertex (node) D1 1542 discards the partially mapped chain <A1, D1, 1>•< >•< > that it received in controller message 1552 since the function $f_2$ that extends the chain is not available at node D1 (which disqualifies node D1). Similarly, during superstep 1, vertex (node) C1 1532 discards the partially mapped chain <D1, C1, 1>•< >•< > that it received in controller message 1558 since the function $f_2$ that extends the chain is not available at node C1 (which disqualifies node C1). Once all of the vertices (nodes) have received the controller messages that they are supposed to receive during superstep 1, superstep 1 ends. FIG. 15C illustrates that, at the end of the superstep 1, two remaining controller messages containing partially mapped service function chains have been delivered to destination vertices. More specifically, node B1 has received controller message 1560, and node C1 has received controller message 1562, both of which are described above.

During the third superstep (superstep 2 illustrated in FIG. 15D), since both vertex B and vertex C have the last required service function for the requested service function chain (service function $f_3$), each of them may complete a respective candidate solution for the requested service function chain and may send the completed service function chain back to the source orchestrator. For example, vertex (node) C1 1532 (which received a partial chain <A1, B1, 1>•<B1, C1, 1>•< >) is able to extend and complete the chain as <A1, B1, 1>•<B1, C1, 1>•<C1, > by mapping itself to the third service function in the chain. In this example, resource orchestrator C (1502-C) sends a controller message 1566 to the source resource orchestrator (resource orchestrator A, 1502-A) that includes the completed service function chain. Similarly, vertex (node) B1 1522 (which received a partial chain <D1, A1, 1>•<A1, B1, 1>•< >) is able to extend and complete the chain as <D1, A1, 1>•<A1, B1, 1>•<B1, > by mapping itself to the third service function in the chain. In this example, resource orchestrator B (1502-B) sends a controller message 1564 to the source resource orchestrator (resource orchestrator A, 1502-A) that includes the completed service function chain. Once controller message 1566 and controller message 1564 have been delivered to the source resource orchestrator, superstep 2 (and the distributed computation as a whole) are complete.

In the example vertex-centric distributed computation illustrated in FIGS. 15A-15D, there were two possible service function chain solutions found and communicated back to the source orchestrator. One service function chain goes from node D1 (to perform service function $f_1$) to node A1 (to perform service function $f_2$) to node B1 (to perform service function $f_3$). The other service function chain goes from node A1 (to perform service function $f_1$) to node B1 (to perform service function $f_2$) to node C1 (to perform service function $f_3$). In this example, the source orchestrator may thus receive two possible solutions for SFC request 1505: D1·A1·B1 and A1·B1·C1.

While the example illustrated in FIGS. 15A-15D and described above involves a fixed-ordered SFC request, the vertex-centric distributed computing approach described herein may also be suitable for application to flexible-ordered SFC requests or linear sub-requests in a mesh topology, in some embodiments. In cases in which an SFC request or linear sub-request includes a flexible-ordered service function chain, in at least some supersteps, the compute function executed at each superstep may perform multiple searches in parallel, each of which attempts to identify one of multiple options for extending or completing a partially mapped chain. In this case, the vertex-centric distributed computation will have the same number of supersteps as would be performed for a fixed-ordered SFC request in which the service function chain has the same number of service functions, but it will exchange more messages during each superstep than in the fixed-ordered case.

In the case of a flexible-ordered SFC request, in at least some embodiments, a vertex.hasFunction( ) method (such as one called by a vertex.isQualified( ) method) may be able to compute the function that is used to extend the chain based on the current chain. For example, for an SFC request $f_1 * f_2 * f_3$, a vertex B with a service function $f_1$ may receive a controller message that includes a partially mapped chain < >*<A, B, 1>*< >. This chain may carry two pieces of information: the fact that vertex A maps to service function $f_2$, and an indication that the service function that extends the chain can be either service function $f_1$ or service function $f_3$. In this example, since vertex B has service function $f_1$, it is able to map to $f_1$ in the chain, extending the chain to become <B, >*<A, B, 1>*< >. In this example, vertex C may then receive a controller message that includes the partially mapped chain <B, C, 1>*<A, B, 1>*< >. Based on this controller message, vertex C knows that vertex A maps to service function $f_2$, that vertex B maps to service function $f_1$, and that the ordering of service functions in this candidate solution (so far) is $f_2 \cdot f_1$. Therefore, vertex C may complete the chain if it has service function $f_3$.

In some cases, an SFC request may include a service function chain in which the ordering is flexible for some of the service functions, but not others. In at least some embodiments, the vertex-centric distributed computing approach described herein may be used to identify any potential solutions for these types of SFC requests, as well. For example, for a service function chain request $(f_1 * f_2 * f_3) \cdot f_4$, the first set of service functions to mapped is $\{f_1, f_2, f_3\}$. That is, any vertex associated with any service function in the set $\{f_1, f_2, f_3\}$ can map to the associated service function. For a partially mapped chain in which service function $f_1$ has already been mapped, the next set of service functions to be mapped is $\{f_2, f_3\}$, and so on. Once all of the service functions in the set $\{f_1, f_2, f_3\}$ have been mapped, service function $f_4$ is mapped. In another example, for a chain for a service function chain request $f_4 \cdot (f_1 * f_2 * f_3)$, the first service function that can be mapped is service function $f_4$, and any vertex with the service function $f_4$ should map to service function $f_4$ first. In this example, after service function $f_4$ is mapped, then the service functions in the set $\{f_1, f_2, f_3\}$ in the chain can be mapped in any order. Note that while several examples of the use of vertex-centric distributed computing included herein are directed to the generation of mapping solutions to service function chain requests, in other embodiments, they may be used to generate mapping solutions for other types of virtual network requests requiring network functions and/or other types of resources to be available on respective physical nodes.

Figure 16:
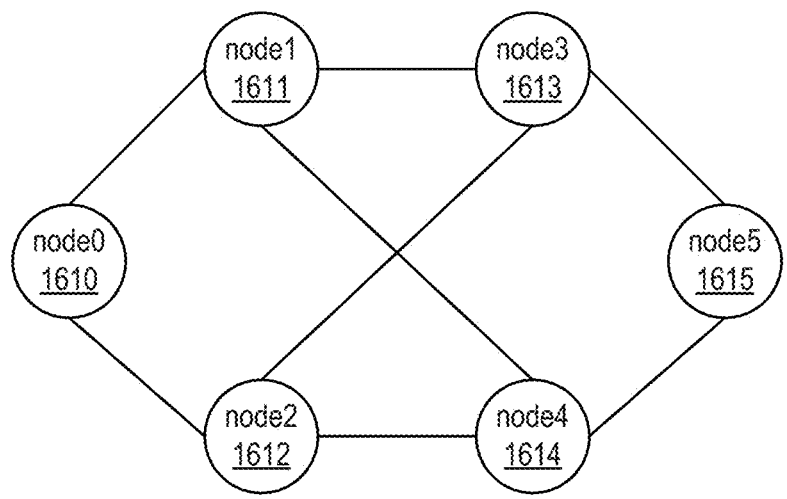
FIG. 16 illustrates an example virtual network request that has a mesh topology.

The techniques for performing distributed virtual network embedding described herein may be further illustrated by way of their application to an example virtual network request. FIG. 16 illustrates an example virtual network request 1600 that has a mesh topology. In this example, the virtual network request includes six virtual nodes, shown as node 0 (1610), node 1 (1611), node 2 (1612), node 3 (1613), node 4 (1614) and node 5 (1615). These six virtual nodes are connected to each other in a mesh topology that includes eight virtual links. For example, respective virtual links connect node 0 to node 1 and to node 2. Additional links connect node 1 to node 3 and to node 4. Other links connect node 2 to node 3 and to node 4, connect node 3 to node 5, and connect node 4 to node 5. In this example, it is assumed that the maximum number of links on any sub-requests is 4. In this example, the results of applying the shortest-first approach to partitioning virtual network request 1600 into sub-requests having linear topologies, as described in more detail below, are shown in Table 1 below.

TABLE 1

Example partitioning results

| | K = 1 | K = 2 | K = 3 | K = 4 |
|---|---|---|---|---|
| list of all linear topologies for sub-requests having K links | 0-1 | 0-1-3 | 0-1-3-2 | 0-1-3-2-4 |
| | 0-2 | 0-1-4 | 0-1-3-5 | 0-1-3-5-4 |
| | 1-0 | 0-2-3 | 0-1-4-2 | 0-1-4-2-3 |
| | 1-3 | 0-2-4 | 0-1-4-5 | 0-1-4-5-3 |
| | 1-4 | 1-0-2 | 0-2-3-1 | 0-2-3-1-4 |
| | 2-0 | 1-3-2 | 0-2-3-5 | 0-2-3-5-4 |
| | 2-3 | 1-3-5 | 0-2-4-1 | 0-2-4-1-3 |
| | 2-4 | 1-4-2 | 0-2-4-5 | 0-2-4-5-3 |
| | 3-1 | 1-4-5 | 1-0-2-3 | 1-0-2-3-5 |
| | 3-2 | 2-0-1 | 1-0-2-4 | 1-0-2-4-5 |
| | 3-5 | 2-3-1 | 1-3-2-0 | 1-3-2-4-5 |
| | 4-1 | 2-3-5 | 1-3-2-4 | 1-3-2-4-5 |
| | 4-2 | 2-4-1 | 1-3-5-4 | 1-4-2-3-5 |
| | 4-5 | 2-4-5 | 1-4-2-0 | 1-4-5-3-2 |
| | 5-3 | 3-1-0 | 1-4-2-3 | 2-0-1-3-5 |
| | 5-4 | 3-1-4 | 1-4-5-3 | 2-0-1-4-5 |
| | | 3-2-0 | 2-0-1-3 | 2-3-1-4-5 |

TABLE 1-continued

Example partitioning results

| | K = 1 | K = 2 | K = 3 | K = 4 |
|---|---|---|---|---|
| | | 3-2-4 | 2-0-1-4 | 2-3-5-4-1 |
| | | 3-5-4 | 2-3-1-0 | 2-4-1-3-5 |
| | | 4-1-0 | 2-3-1-4 | 2-4-5-3-1 |
| | | 4-1-3 | 2-3-5-4 | 3-1-0-2-4 |
| | | 4-2-0 | 2-4-1-0 | 3-1-4-2-0 |
| | | 4-2-3 | 2-4-1-3 | 3-2-0-1-4 |
| | | 4-5-3 | 2-4-5-3 | 3-2-4-1-0 |
| | | 5-3-1 | 3-1-0-2 | 3-5-4-1-0 |
| | | 5-3-2 | 3-1-4-2 | 3-5-4-2-0 |
| | | 5-4-1 | 3-1-4-5 | 4-1-0-2-3 |
| | | 5-4-2 | 3-2-0-1 | 4-1-3-2-0 |
| | | | 3-2-4-1 | 4-2-0-1-3 |
| | | | 3-2-4-5 | 4-2-3-1-0 |
| | | | 3-5-4-1 | 4-5-3-1-0 |
| | | | 3-5-4-2 | 4-5-3-2-0 |
| | | | 4-1-0-2 | 5-3-1-0-2 |
| | | | 4-1-3-2 | 5-3-1-4-2 |
| | | | 4-1-3-5 | 5-3-2-0-1 |
| | | | 4-2-0-1 | 5-3-2-4-1 |
| | | | 4-2-3-1 | 5-4-1-0-2 |
| | | | 4-2-3-5 | 5-4-1-3-2 |
| | | | 4-5-3-1 | 5-4-2-0-1 |
| | | | 4-5-3-2 | 5-4-2-3-1 |
| | | | 5-3-1-0 | |
| | | | 5-3-1-4 | |
| | | | 5-3-2-0 | |
| | | | 5-3-2-4 | |
| | | | 5-4-1-0 | |
| | | | 5-4-1-3 | |
| | | | 5-4-2-0 | |
| | | | 5-4-2-3 | |
| resulting set of linear topologies | same as above | 0-1-3 0-2-3 1-4-2 3-5-4 | 0-1-3-2 0-2-4-1 3-5-4 | 1-3-5-4-2 3-2-0-1-4 |

In Table 1, the first row under each column heading contains a list of all linear topologies having a length equal to K, and the second row under each column heading indicates a resulting set of linear topologies that includes all virtual links but for which there are no overlapping links between the linear topologies. As noted above, the linear topologies shown in Table 1 may be identified using a shortest-first approach. For example, in the first row under the column with the heading K=1 are listed all possible linear topologies within the mesh topology for virtual network request 1600 that have a single virtual link connecting two virtual nodes. Since each linear topology is defined by a single unique link between two virtual nodes, there are no overlapping links between the linear topologies listed in the first row. Therefore, the resulting set of linear topologies in the second row is the same as the list of linear topologies in the first row, and it includes 16 linear topologies, each of which includes a single link. If the predetermined maximum number of links on any sub-requests were 1, the partitioning would stop after the generation of the list of linear topologies shown in column 1. In this case, the partitioning would have identified all linear topologies with only one single link, and the result is a feasible result, since the mappings, having balanced lengths, having lengths less than the maximum threshold value, and having no overlapping links, meets the constraints for the partitioning. This solution, although it satisfies all of the constraints, might not be optimal since the chains are the shortest chains possible, resulting in the highest possible number of feasible linear topologies.

In this example, if K is greater than one, the resource orchestrator attempts to extend each of the linear topologies listed in the first row under the column with the heading K=1 by one additional virtual link and corresponding virtual node. For example, the 0-1 linear topology can be extended to generate one extended linear topology 0-1-3 and another extended linear topology 0-1-4, because the two neighbors of virtual node 1 (as shown in FIG. 16) are virtual nodes 3 and 4. Such extensions may be generated for all of the linear topologies in the K=1 column for which the second node in the linear topology has one or more neighbors. As a result, in the first row under the column with the heading K=2 are listed all possible linear topologies within the mesh topology for virtual network request 1600 that have three virtual nodes connected by two virtual links. Once all of the linear topologies within the mesh topology for virtual network request 1600 that have three virtual nodes connected by two virtual links have been identified, the resource orchestrator may identify one or more sets of linear topologies from among the identified linear topologies under the K=2 and K=1 headings that include all of the virtual links within the mesh topology for virtual network request 1600 but that do not have overlapping links. In this case, a single resulting set of linear topologies shown in row 2 under the K=2 heading includes five linear topologies, each of which includes two links. In some embodiments, the resource orchestrator may identify such sets of linear topologies using a method similar to method 900 illustrated in FIG. 9 and described above.

If K is greater than two, any of the linear topologies listed in the first row under the K=2 heading may be further extended if the third node in the linear topology has one or more additional neighbors. As a result, in the first row under the column with the heading K=3 are listed all possible linear topologies within the mesh topology for virtual network request 1600 that have four virtual nodes connected by three virtual links. Subsequently, the resource orchestrator may identify one or more sets of linear topologies from among the identified linear topologies under the K=3 and K=2 headings that include all of the virtual links within the mesh topology for virtual network request 1600 but that do not have overlapping links. In this case, a single resulting set of linear topologies shown in row 2 under the K=3 heading includes three linear topologies, two of which include three links and one of which includes two links. In some embodiments, the resource orchestrator may identify such sets of linear topologies using a method similar to method 900 illustrated in FIG. 9 and described above.

In this example, any of the linear topologies listed in the first row under the K=3 heading may be further extended if the fourth node in the linear topology has one or more additional neighbors. The results of this last extension are shown in the first row under the column with the heading K=4, in which are listed all possible linear topologies within the mesh topology for virtual network request 1600 that have five virtual nodes connected by four virtual links. Subsequently, the resource orchestrator may identify one or more sets of linear topologies from among the identified linear topologies under the K=4 and K=3 headings that include all of the virtual links within the mesh topology for virtual network request 1600 but that do not have overlapping links. In this case, a single resulting set of linear topologies shown in row 2 under the K=4 heading includes two linear topologies, each of which includes four links. In some embodiments, the resource orchestrator may identify such sets of linear topologies using a method similar to method 900 illustrated in FIG. 9 and described above.

The distributed chaining approach described above may be further illustrated in reference to virtual network request 1600 shown in FIG. 16. For example, a master resource orchestrator that partitioned virtual network request 1600 into two linear-topology sub-requests may send the first sub-request $L_0$ (which includes a subset of the virtual nodes and corresponding virtual links of the mesh topology for virtual network request 1600) to resource orchestrators in one or more other domains of a multi-domain network. The respective orchestrator in each of one or more of the domains may identify a vertex (e.g., a physical node A) on which required resources for the first virtual node in the first linear-topology sub-request $L_0$ (virtual node 1) are available. If there are no qualified links from node A to any of its neighbors found (e.g., no physical links that meet resource requirements for the link between the first and second virtual nodes in the linear-topology sub-request), the attempt to build the linear-topology sub-request beginning at node A may be abandoned. On the other hand, if there are qualified links from node A to one or more neighbors found, node A may begin executing the common compute function with superstep 0, creating a first partially mapped chain in which virtual node 1 is mapped to node A, and sending control messages including the partially mapped chain to the orchestrators for the neighbors with which node A has a qualified link. Similarly, if required resources for the first virtual node in the first linear-topology sub-request $L_0$ (virtual node 1) are available on a physical node H and if there are qualified links from node H to any of its neighbors found, physical node H may also begin executing the common compute function with superstep 0, creating a second partially mapped chain in which virtual node 1 is mapped to node H, and sending control messages including the partially mapped chain to the orchestrators for the neighbors with which node H has a qualified link.

Subsequently, one of the neighbors of node A (e.g., physical node B) that received the first partially mapped chain may begin execution of the common compute function for superstep 1, including determining whether the partially mapped chain for linear-topology sub-request $L_0$ can be extended on node B (e.g., determining whether or not required resources for the second virtual node, virtual node 3, are available on physical node B). If so, node B may map itself to virtual node 3 and, assuming there are qualified links from node B to one or more of its neighbors, node B may send control messages including the first partially mapped chain to the orchestrators for the neighbors with which node B has a qualified link. Similarly, a node I that received the second partially mapped chain from node H may extend the chain, mapping itself to virtual node 3.

In superstep 2, a physical node C that received the first partially mapped chain from node B may extend the chain, mapping itself to virtual node 5, and a node J that received the second partially mapped chain from node I may extend the chain, mapping itself to virtual node 5. In superstep 3, a physical node D that received the first partially mapped chain from node C may extend the chain, mapping itself to virtual node 4, and a node K that received the second partially mapped chain from node J may extend the chain, mapping itself to virtual node 4. Finally, in superstep 4, a physical node E that received the first partially mapped chain from node D may complete the first chain by mapping itself to virtual node 2, and a node L that received the second partially mapped chain from node K may complete the chain by mapping itself to virtual node 2. In this way, two feasible mappings for linear-topology sub-request $L_0$ may be identified.

A similar approach may be taken to construct one or more feasible mappings for the virtual nodes 3, 2, 0, 1, and 4 of the second linear-topology sub-request $L_1$, (in that order) to respective physical nodes. For example, a first chain may map virtual node 3 to physical node B, virtual node 2 to physical node E, virtual node 0 to physical node F, virtual node 1 to physical node A, and virtual node 4 to physical node D. A second chain may map node 3 to physical node M, virtual node 2 to physical node N, virtual node 0 to physical node O, virtual node 1 to physical node P, and virtual node 4 to physical node Q. In this way, two feasible mappings for linear-topology sub-request $L_1$ may be identified.

In some embodiments, after one or more feasible mappings are identified for each sub-request of a virtual network request, a master resource orchestrator may combine one of the mappings for each sub-request to generate a solution for the virtual network request. In one example embodiment, the resource orchestrator may remove the feasible mappings for a given sub-request in which a physical node that is mapped to a given virtual node is not included in the set of physical nodes formed by the intersection of the physical nodes to which the given virtual node is mapped in the given sub-request and one or more other sub-requests. The remaining feasible mappings, any of which may include mappings for some non-overlapping virtual nodes within the mesh topology for the virtual network request, may be combined to generate the final result.

Referring again to the virtual network request 1600 illustrated in FIG. 16, and the results of the partitioning of virtual network request 1600 shown in Table 1 above, virtual network request 1600 can be partitioned into two sub-requests, each of with a linear topology that includes five virtual nodes connected by four virtual links. For example, virtual network request 1600 may be partitioned into a linear topology $L_0$ containing a chain of virtual nodes 1-3-5-4-2 (as one sub-request) and another linear topology $L_1$ containing a chain of virtual nodes 3-2-0-1-4 (as another sub-request).

If, as described above, two feasible mappings are identified for sub-request $L_0$, and two feasible mappings are identified for sub-request $L_0$, a master resource orchestrator may further reduce the feasible mappings to filter out unsatisfied physical mappings before combining them into potential solutions for the virtual network request. For example, for the first sub-request $L_0$=1-3-5-4-2, the identified feasible mappings are {A-B-C-D-E, H-I-J-K-L}. For the second sub-request $L_1$=3-2-0-1-4, the identified feasible mappings are {B-E-F-A-D, M-N-O-P-Q}. In this example, the mapping H-I-J-K-L for $L_0$ may be discarded because physical node H (to which virtual node 1 is mapped) does not appear in the set formed by intersection of the set of nodes mapped to virtual node 1 by the feasible mappings of $L_0$ and the set of nodes mapped to virtual node 1 by the feasible mappings of $L_1$, which includes only node A. Similarly, only node B appears in the set formed by intersection of the set of nodes mapped to virtual node 3 by the feasible mappings of $L_0$ and the set of nodes mapped to virtual node 3 by the feasible mappings of $L_1$, only node D appears in the set formed by intersection of the set of nodes mapped to virtual node 4 by the feasible mappings of $L_0$ and the set of nodes mapped to virtual node 4 by the feasible mappings of $L_1$. Since virtual node 5 appears only in L0 and virtual node 0 appears only in L1, the nodes to which they are mapped for their respective sub-requests cannot disqualify any of the feasible mappings for the other sub-request.

In addition, the mapping M-N-O-P-Q for $L_1$ may be discarded because physical node M (to which virtual node 3 is mapped) does not appear in the set formed by intersection of the set of nodes mapped to virtual node 3 by the feasible mappings of $L_0$ and the set of nodes mapped to virtual node 3 by the feasible mappings of $L_1$ (which includes only node B), physical node N (to which virtual node 2 is mapped) does not appear in the set formed by intersection of the set of nodes mapped to virtual node 2 by the feasible mappings of $L_0$ and the set of nodes mapped to virtual node 2 by the feasible mappings of $L_1$ (which includes only node E), physical node P (to which virtual node 1 is mapped) does not appear in the set formed by intersection of the set of nodes mapped to virtual node 1 by the feasible mappings of $L_0$ and the set of nodes mapped to virtual node 1 by the feasible mappings of $L_1$ (which includes only node A), and physical node Q (to which virtual node 4 is mapped) does not appear in the set formed by intersection of the set of nodes mapped to virtual node 4 by the feasible mappings of $L_0$ and the set of nodes mapped to virtual node 4 by the feasible mappings of $L_1$ (which includes only node D). Therefore, in this example, the only remaining feasible mappings are {A-B-C-D-E} for $L_0$ and {B-E-F-A-D} for $L_1$.

Figure 17:
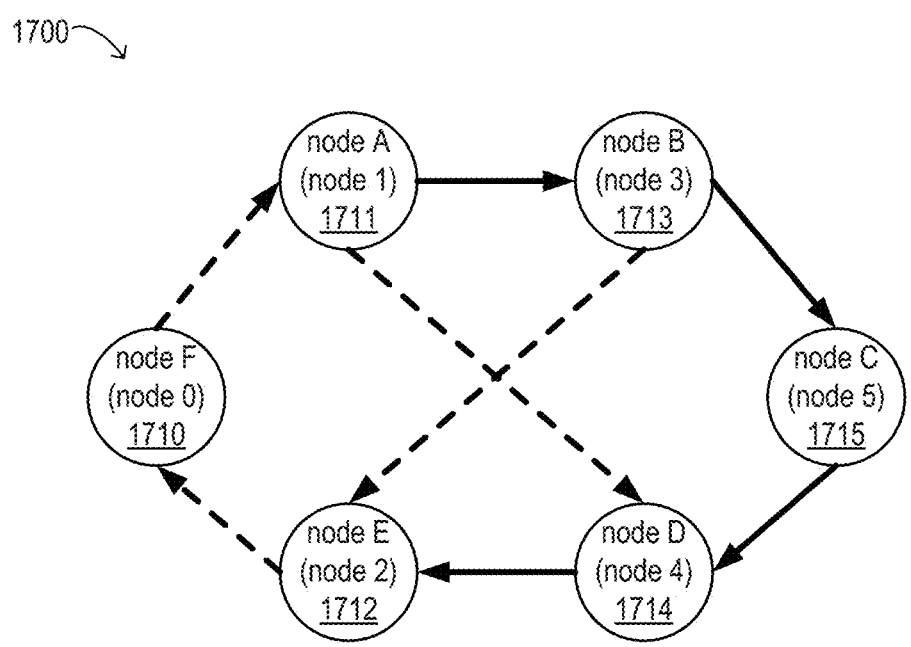
FIG. 17 illustrates results of an operation to combine feasible mapping solutions for each of the linear-topology sub-requests into which the example virtual network request illustrated in FIG. 16 has been partitioned, according to one embodiment.

The result of the combining operation is illustrated in FIG. 17. In this example, a linear topology $L_0$ containing a chain of virtual nodes 1-3-5-4-2 (corresponding to the first sub-request) is shown by the solid arrows connecting physical nodes A (1711), B (1713), C (1715), D (1714), and E (1712) to each other, in that order. Another linear topology $L_1$ containing a chain of virtual nodes 3-2-0-1-4 (corresponding to the second sub-request) is shown by the dashed arrows connecting physical nodes B (1713), E (1712), F (1710), A (1711), and D (1714), in that order. In this example, while physical nodes A (1711), B (1713), D (1714), and E (1712) are included in both linear topologies, there are no physical links that are common to the two linear topologies (i.e., no overlapping links). In this example, node C (1715) is only found in linear topology $L_0$, and node F (1710) is only found in linear topology $L_1$.

In some embodiments, if more than one feasible mapping remains for one or more of the sub-requests following a pruning operation such as that described above, there may be multiple feasible solutions for the virtual network request. In this case, the number of feasible physical mappings would be equal to the product of the number of remaining feasible mappings for each of the sub-requests. For example, if two feasible mappings remained for sub-request $L_0$ and only one feasible mapping remained for sub-request $L_1$, there would be two possible combinations of these feasible mappings, thus two possible solutions for the virtual network request. In some embodiments, the selection of a solution from among multiple possible solutions may be made randomly by the orchestrator that combines them. In other embodiments, the selection of a solution from among multiple possible solutions may be dependent on the relative locations of the physical resources in different solutions, the relative costs of the physical resources in different solutions, relative delays associated with different solutions, the relative positions within the network at which physical nodes are mapped to particular virtual nodes in different solutions, or on any other suitable criteria.

In some embodiments of the systems described herein, a goal of a method for generating a mapping solution for a virtual network request may be to identify all feasible solutions for mapping the virtual network request to physical nodes in a network. Identifying all feasible solutions may be computationally expensive and may require a large number of messages containing partially mapped solutions (chains) to be exchanges between vertices in the network. For example, to analyze the number of partially mapped chains (and thus, messages) exchanged between vertices for a fixed-order SFC, let:

α represent the probability of a vertex having a required service function and enough virtual machines for chaining β represent the probability of an edge having enough bandwidth for chaining V represent the number of vertices in a network N represent the maximum number of neighbors for a vertex F represent the number of service functions in a SFC request In this example, the number of messages exchanged during superstep 0 may be equal to $\alpha V \cdot \beta N$. The number of messages exchanged during each subsequent superstep i may be equal to $\alpha^{i+1} V \cdot (\beta N)^{i+1}$. For example, during the penultimate superstep F-2, the number of messages exchanged may be $\alpha^{F-1} V \cdot (\beta N)^{F-1}$. During the final superstep, the completed chains are collected. The total number of messages exchanged may be computed as:

$$\sum_{i=0}^{F-2} \alpha^{i+1} V \cdot (\beta N)^{i+1} = V \cdot \sum_{i=1}^{F-1} (\alpha \beta V)^i$$
$$= \frac{V \alpha \beta N}{\alpha \beta N - 1} [(\alpha \beta N)^{F-1} - 1]$$

This analysis illustrates that the maximum possible number of partially mapped chains (and thus messages exchanged between vertices) increases exponentially as the number of service functions in the request (F) increases.

As described in more detail below, in embodiments that do not require the identification of all feasible mapping solutions for a given virtual network request, a message forwarding policy may be applied during the generation of a mapping solution for the request to strategically reduce the number of messages exchanged between neighboring vertices. In some embodiments, a maximum number of feasible mappings (M) may be specified for a given virtual network request. In such embodiments, the application of a message forwarding policy when generating a mapping solution for the virtual network request may reduce the computation complexity of the mapping operation while minimizing the impact on the final results. In some embodiments, subsets of all possible messages that could be forwarded between vertices may be selected for forwarding based on quality of service (QoS) metrics or other criteria.

The message forwarding policy applied when generating a mapping solution for a particular virtual network request may be dependent on the topology of the virtual network request. For example, message forwarding policies to be applied when generating mapping solutions for virtual network requests with linear topologies, including service function chains (e.g., SFC A-B-C . . . ) may include length-based message forwarding policies or degree-based message forwarding policies. In some embodiments in which there are abundant network resources, a hybrid message forwarding policy that combines aspects of both the length-based message forwarding policies and the degree-based message forwarding policies may be applied when generating a mapping for virtual network requests with linear topologies. In embodiments in which the virtual network request has a mesh topology, a step-based message forwarding policy may be applied when generating a mapping solution. In some embodiments, a suitable message forwarding policy may be implemented as part of the compute( ) method for message forwarding in the vertex-centric computing algorithm described above.

Length-Based Message Forwarding

It has been shown that as the number of service functions (F) in a service function chain increases, the number of feasible mapping solutions decreases. It has also been shown that the number of messages exchanged between vertices at a given superstep decreases for each successive superstep.

In some embodiments, when generating one or more mapping solutions for a service function chain or virtual network request in a linear topology or a linear sub-request in a mesh topology, a length-based message forwarding policy may be applied to reduce the total number of messages exchanged between vertices. According to a length-based message forwarding policy, instead of a qualified vertex forwarding all of the messages containing partially mapped chains that it receives to all of its qualified edges, the number of messages forwarded may be determined based on a message forwarding probability value for the qualified vertex. In some embodiments, the probability may be based on an adjustable weighting factor w that is dependent on the availability of resources in the network.

In some embodiments, the weighting factor may be determined based on a statistical analysis of the results of one or more previous requests within the network that include the same or similar resources. For example, if very few feasible mapping solutions are identified for requests that include a particular resource, this may indicate that the particular resource is scarce in the network or that access to the particular resource is otherwise limited. On the other hand, if a relatively large number of feasible mapping solutions are identified for requests that include a particular resource, this may indicate that the particular resource is common in the network and that access to the particular resource is not particularly limited. In some embodiments, the weighting factor may be set to a higher value when resources (generally or for a particular request) are scarce and may be set to a lower value when resources (generally or for a particular request) are more readily available.

When applying a length-based message forwarding policy, at each vertex, and at a given superstep i, a message that is received at the vertex is forwarded to each qualified outgoing edge with a probability of β.

$$\beta = w * \left(1 - \frac{1}{F}\right) * \left(1 - \frac{1}{i}\right), \text{ where } 0 < w \leq 1$$

In this example message forwarding policy, w represents the weighting factor. Here, the term $$\left(1 - \frac{1}{F}\right)$$

causes an increase in the value of probability β as the number of service functions increases. In other words, when F is large (and the number of feasible mapping solutions is lower), the probability of forwarding any individual message containing a partially mapped candidate chaining solution is high. Similarly, the term $$\left(1 - \frac{1}{i}\right)$$

causes an increase in the value of probability β for each successive superstep i. This approach may reduce the number of messages containing candidate solutions that are discarded as the number of messages available to be forwarded is decreasing. Because this length-based message forwarding policy is based on probability, its application may impact the final results of the mapping solution. For example, because messages containing candidate solutions are forwarded or discarded based on probability, the best solutions (according to various performance or QoS criteria) might inadvertently be discarded.

Figure 18:
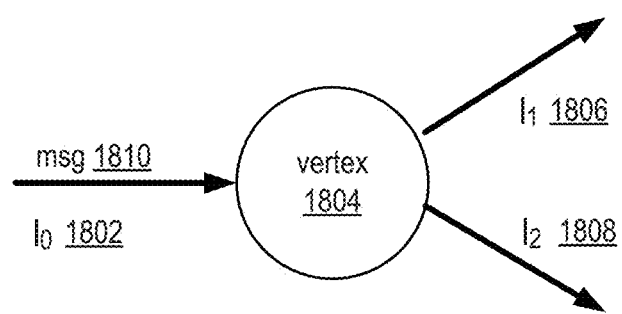
FIG. 18 illustrates the use of a length-based message forwarding policy at a qualified vertex, according to one embodiment.

FIG. 18 illustrates the use of a length-based message forwarding policy at a qualified vertex, according to one embodiment. In this example, vertex 1804 receives message 1810 over link $l_0$ (1802) because vertex 1804 is a qualified vertex for extending a partially mapped chain contained in message 1810. In this example, vertex 1804 has two qualified edges to which message 1810 could be forwarded. These are shown as link $l_1$ (1806) and $l_2$ (1808). In order to determine whether to forward message 1810, after extending the partially mapped chain to include vertex 1804, to either or both of links $l_1$ (1806) and $l_2$ (1808), a message forwarding probability value is calculated for vertex 1804, as described above. In addition, a probability generator generates a respective random probability for each outgoing edge.

If the random probability generated for link $l_1$ (1806) is greater than or equal to the message forwarding probability value calculated for vertex 1804, message 1810, as extended, will be forwarded to link $l_1$ (1806). If not, message 1810 will not be forwarded to link $l_1$ (1806). Similarly, if the random probability generated for link $l_2$ (1808) is greater than or equal to the message forwarding probability value calculated for vertex 1804, message 1810, as extended, will be forwarded to $l_2$ (1808). If not, message 1810 will not be forwarded to link $l_2$ (1808). If neither the random probability generated for link $l_1$ (1806) nor the random probability generated for link $l_2$ (1808) is greater than or equal to the message forwarding probability value calculated for vertex 1804, message 1810 may be discarded. According to the length-based message forwarding policy, the process for pruning outgoing messages described above in reference to vertex 1804 may be applied to any or all qualified vertices in the network that receive a partially mapped chaining solution. This may reduce the overall number of messages exchanged between vertices when generating one or more mapping solutions for virtual network requests, such as service function chains in linear topologies or linear sub-requests in a mesh topology.

Figure 19:
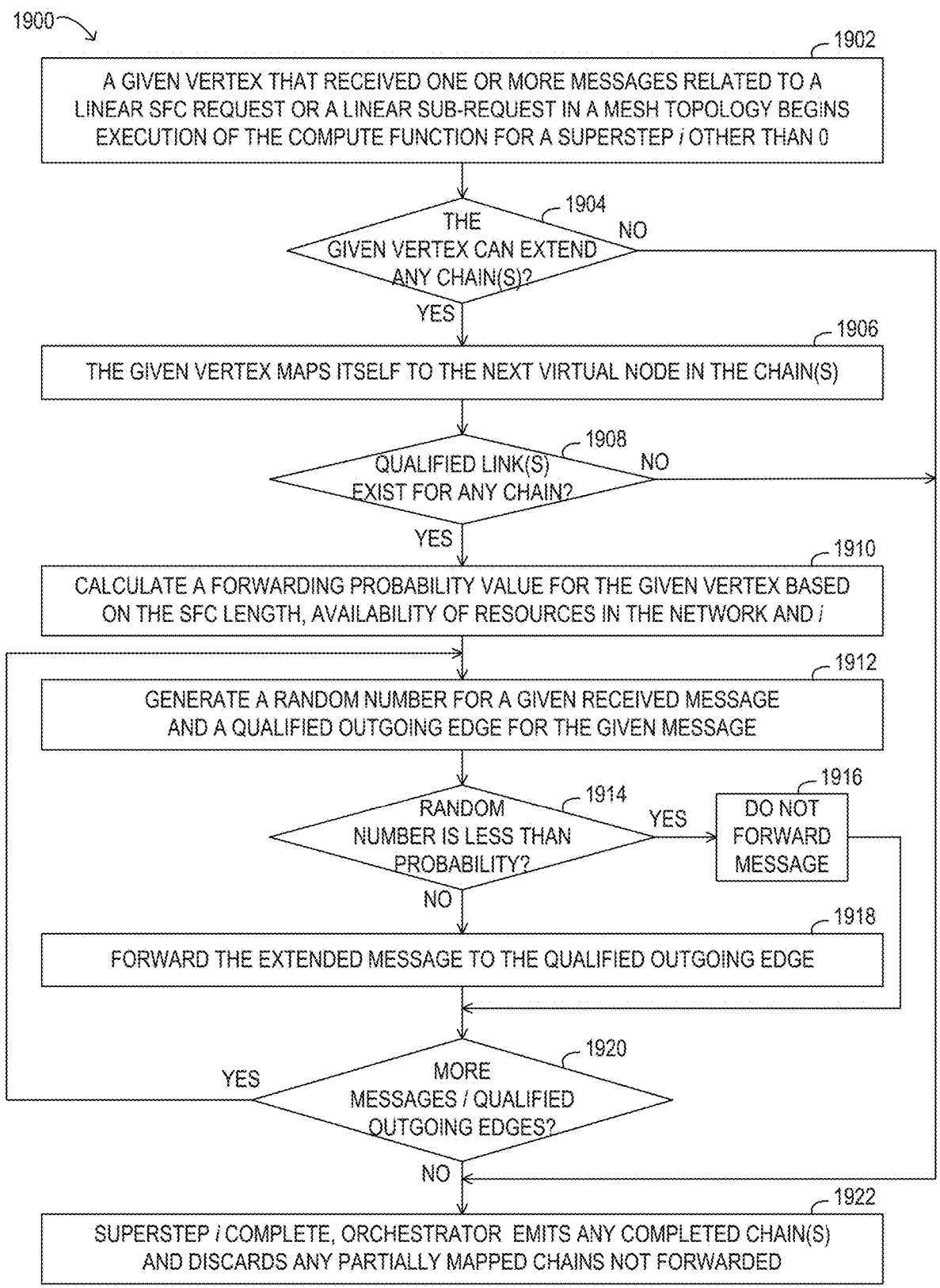
FIG. 19 is a flow diagram illustrating selected elements of a method for applying a length-based message forwarding policy at a qualified vertex, according to one embodiment.

FIG. 19 is a flow diagram illustrating selected elements of a method 1900 for applying a length-based message forwarding policy at a qualified vertex, according to one embodiment. In this example, method 1900 includes (at 1902) a given vertex that received one or more messages related to a linear SFC request or a linear sub-request in a mesh topology beginning execution of the compute function for a superstep i (a superstep other than superstep 0). If, at 1904, the given vertex cannot extend any partially mapped chains contained in the received messages, method 1900 may proceed to 1922. If, however, the given vertex can extend one or more of the partially mapped chains contained in the received messages, method 1900 may continue at 1906. At 1906, the method may include the given vertex mapping itself to the next virtual node in each such chain to extend the chain.

If, at 1908, a qualified link exists for any of the partially mapped chains extended at the given vertex, method 1900 may continue at 1910. Otherwise, method 1900 may proceed to 1922. At 1910, method 1900 may include calculating a message forwarding probability value for the given vertex based on the length of the SFC or sub-request, the availability of resources in the network and the superstep number, i. At 1912, method 1900 may include generating a random number for a given received message and a qualified outgoing edge for the given message (a message/edge pair). If, at 1914, the random number generated for the message/edge pair is less than the calculated message forwarding probability value, method 1900 may proceed to 1916. Otherwise, method 1900 may continue at 1918.

At 1916, method 1900 may proceed to 1920 without forwarding the given message to the qualified edge. Alternatively, at 1918, method 1900 may include forwarding the given message, as extended, to the qualified outgoing edge. If, at 1920, there are more messages and qualified outgoing edges to which they could be forwarded (more message/edge pairs), the operations shown as 1912-1918 may be repeated, as appropriate, for each additional message/qualified outgoing edge pair. In some embodiments, a respective random number may be generated for each additional message/edge pair (at 1912). If (or once), at 1920, there are no additional messages/edge pairs, method 1900 may proceed to 1922. At 1922, superstep i may be complete, and method 1900 may include the resource orchestrator emitting any completed chains and discarding any messages containing partially mapped chains that were not forwarded.

In some embodiments, rather than generating a random number for each qualified message/edge pair and comparing it to a message forwarding probability value calculated for a given vertex to determine whether to forward the message, the message forwarding probability value calculated for the given vertex may indicate the percentage of available qualified message/edge pairs for which the message should be forwarded to the corresponding qualified edge. The selection of the particular ones of the available qualified message/edge pairs for which the message should be forwarded to the corresponding qualified edge may be made randomly or based on any suitable criteria including, but not limited to, quality of service (QoS) metrics associated with the messages or edges.

Degree-Based Message Forwarding

In some embodiments, when generating one or more mapping solutions for a service function chain or virtual network request in a linear topology or a linear sub-request in a mesh topology, a degree-based message forwarding policy may be applied to reduce the total number of messages exchanged between vertices. According to a degree-based message forwarding policy, at each vertex and at a given superstep i, with a specified maximum number of feasible mappings (M) required, for each outgoing edge of the vertex, a set (S) of received messages that are qualified to be sent through the outgoing edge is identified. The messages of the obtained set S are sorted based on one or more QoS metrics. The number of messages forwarded to the outgoing edge is the lesser of M or the total number of messages in S. For example, if the number of messages in S is less than or equal to M, all of the messages in S are forwarded to the outgoing edge. However, if the number of messages in S is greater than M only a subset of the messages in S (the M messages with the most favorable QoS metrics) are forwarded to the outgoing edge. The application of this degree-based message forwarding policy may not affect the final results of the mapping solution.

Figure 20:
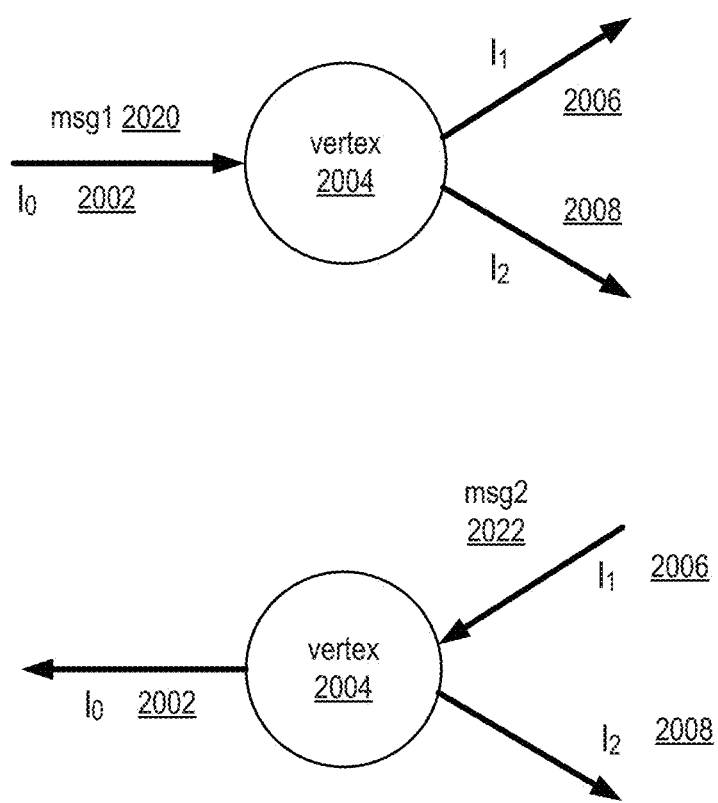
FIG. 20 illustrates the use of a degree-based message forwarding policy at a qualified vertex, according to one embodiment.

FIG. 20 illustrates the use of a degree-based message forwarding policy at a qualified vertex, according to one embodiment. In this example, at a given superstep i of a computation to generate one or more mapping solutions for a virtual network request (or sub-request thereof), vertex 2004 receives two messages over respective edges, each corresponding to a physical link. The first message, shown as msg1 (2020), is received over link $l_0$ (2002) because vertex 2004 is a qualified vertex for extending a partially mapped chain contained in msg1 (2020). The second message, shown as msg2 (2022), is received over link $l_1$ (2006) because vertex 2004 is a qualified vertex for extending a partially mapped chain contained in msg2 (2022). In this example, vertex 2004 has two qualified edges to which msg1 (2020) could potentially be forwarded after the partially mapped chain contained in msg1 is extended by the addition of vertex 2004. Those edges are link $l_1$ (2006) and link $l_2$ (2008). Vertex 2004 also has two qualified edges to which msg2 (2022) could potentially be forwarded after the partially mapped chain contained in msg1 is extended by the addition of vertex 2004. Those edges are link $l_0$ (2002) and link $l_2$ (2008).

In order to determine which, if any, of these messages should, after being extended by the addition of vertex 2004, be forwarded to any of the qualified edges of vertex 2004, a degree-based message forwarding policy may be applied. Using this approach, the number of messages to be forwarded to each qualified edge may be limited to the lesser of the number of messages in the set of available outgoing messages for that qualified edge and a maximum number of feasible mapping solutions M specified for the virtual network request (or sub-request thereof). In this example, the set of messages that are qualified to be forwarded by vertex 2004 to $l_0$ (2002) includes only one message: msg2 (2022). Similarly, the set of messages that are qualified to be forwarded by vertex 2004 to $l_1$ (2006) includes only one message: msg1 (2020). However, the set of messages that are qualified to be forwarded by vertex 2004 to $l_2$ (2008) includes two messages: msg1 (2020) and msg2 (2022).

In this example, it is assumed that the specified maximum number of feasible mapping solutions M=1. Therefore, at most one message will be forwarded to each qualified edge from the set of available outgoing messages for that qualified edge. Since only msg2 (2022) is qualified to be forwarded to $l_0$ (2002), only msg2 will be forwarded to $l_0$ (2002). Similarly, since only msg1 (2020) is qualified to be forwarded to $l_1$ (2006), only msg1 will be forwarded to $l_1$ (2006). In this example, the number of messages in the set of messages that are qualified to be forwarded by vertex 2004 to $l_2$ (2008) is greater than the specified maximum number of feasible mapping solutions M. To determine which one of the two qualified messages is to be forwarded to $l_2$ (2008), the two qualified messages may be sorted according to one or more sorting factors. In some embodiments, the messages in a set of messages that are qualified to be forwarded by a given vertex to a given edge may be sorted according to the values of a required QoS metric that are associated with each message, and the M messages with the "best" QoS values may be forwarded to the given edge. In example illustrated in FIG. 20, the messages that are qualified to be forwarded to $l_2$ (2008) may be sorted based on respective values of a delay metric associated with each message. In this example, if msg2 (2022) is associated with a shorter delay than msg1 (2020), only msg2 will be forwarded to $l_2$ (2008). On the other hand, if msg1 (2020) is associated with a shorter delay than msg2 (2022), only msg1 will be forwarded to $l_2$ (2008).

While the QoS metric used in sorting qualified messages in the example above was a delay metric, one or more other QoS metrics or other sorting criteria may be applied to determine which of the messages in a set of qualified messages are to be forwarded to a given edge, in other embodiments. For example, in various embodiments, qualified messages may be sorted according to QoS metrics for the required bandwidth of a link, the required amount of computing resources on a node, and/or the required storage resources on a node instead of, or in addition to, a delay metric. In embodiments in which the number of messages in a set of messages that are qualified to be forwarded by a given vertex to a given edge is less than the specified maximum number of feasible mapping solutions M, all of the messages in the set of messages may be forwarded by the given vertex to the given edge. For example, in a situation in which there are three qualified messages that could potentially be forwarded to a particular edge but M=2, the three qualified messages may be sorted based on a QoS metric and the two messages with the most desirable QoS metric values may be forwarded to the particular edge. On the other hand, if there are two qualified messages that could potentially be forwarded to a particular edge, and M=3, both of the qualified messages may be forwarded to the particular edge without any message pruning. In some embodiments, if, due to the application of the degree-based message forwarding policy described herein, a message received at a given vertex is not forwarded to any qualified edge, or if there are no qualified edges to which it can be forwarded, the message may be discarded.

According to the degree-based message forwarding policy, the process for pruning outgoing messages described above in reference to vertex 2004 may be applied to any or all qualified vertices in the network that receive a partially mapped chaining solution. This may reduce the overall number of messages exchanged between vertices when generating one or more mapping solutions for virtual network requests, such as service function chains in linear topologies or linear sub-requests in a mesh topology.

Figure 21:
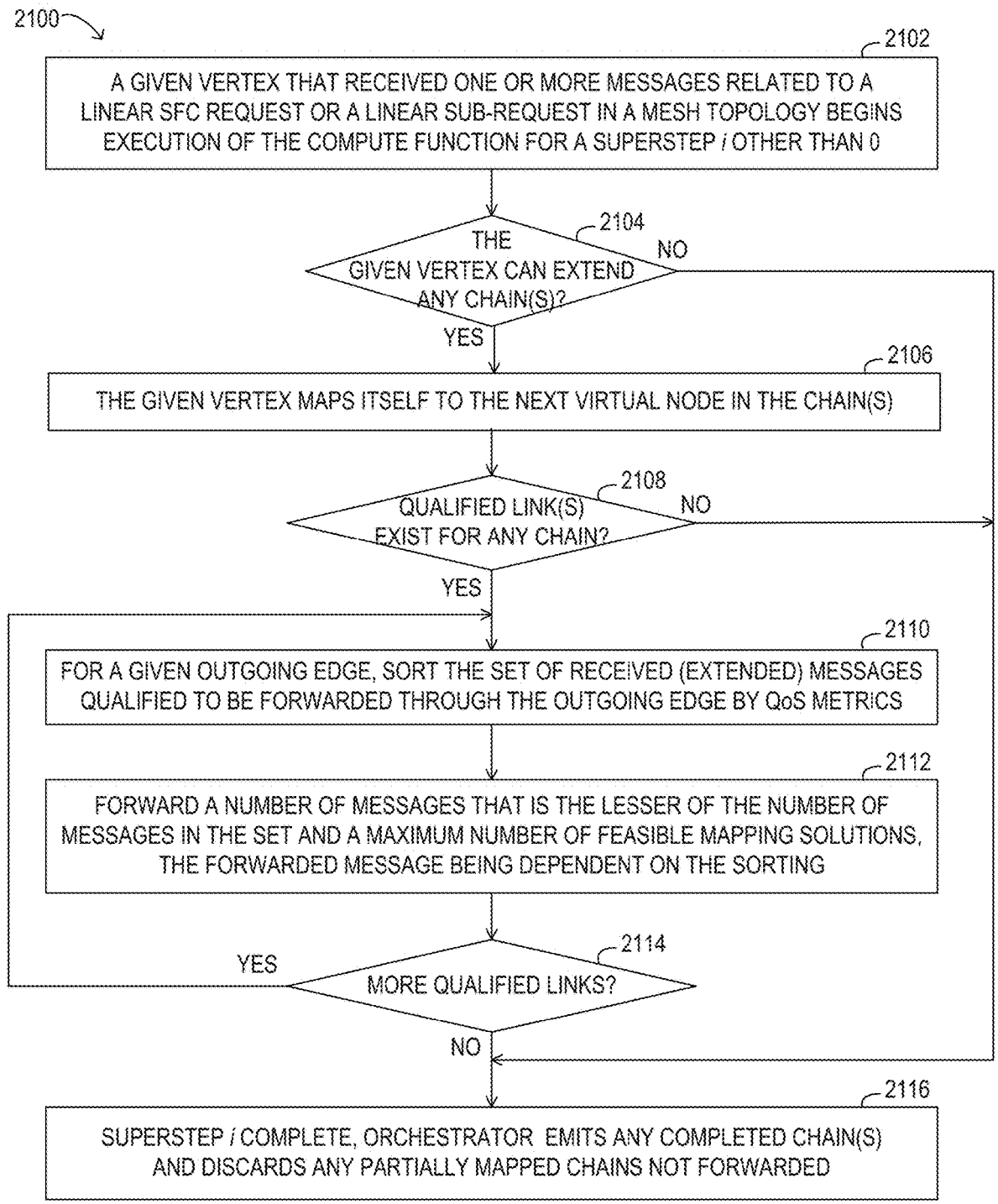
FIG. 21 is a flow diagram illustrating selected elements of a method for applying a degree-based message forwarding policy at a qualified vertex, according to one embodiment.

FIG. 21 is a flow diagram illustrating selected elements of a method 2100 for applying a degree-based message forwarding policy at a qualified vertex, according to one embodiment. In this example, method 2100 may include (at 2102) a given vertex that received one or more messages related to a linear SFC request or a linear sub-request in a mesh topology beginning execution of the compute function for a superstep i (a superstep other than superstep 0). If, at 2104, the given vertex cannot extend any partially mapped chains contained in the received messages, method 2100 may proceed to 2116. If, however, the given vertex can extend one or more of the partially mapped chains contained in the received messages, method 2100 may continue at 2106. At 2106, the method may include the given vertex mapping itself to the next virtual node in each such chain to extend the chain. If, at 2108, a qualified link exists for any of the partially mapped chains extended at the given vertex, method 2100 may continue at 2110. Otherwise, method 2100 may proceed to 2116.

At 2110, method 2100 may include, for a given outgoing edge, sorting the set of received (extended) messages that are qualified to be forwarded through the outgoing edge by one or more QoS metrics. For example, the messages may be sorted according to respective delays associated with the messages such that the messages with the shortest delays are preferred for forwarding. At 2112, method 2100 may include forwarding a number of messages that is the lesser of the number of messages in the set and a maximum number of feasible mapping solutions, with the selection of the specific messages to be forwarded being dependent on the sorting. If, at 2114, there are additional qualified links, the operations shown as 2110-2112 may be repeated, as appropriate, for each additional qualified link. At 2116, superstep i may be complete, and method 2100 may include the resource orchestrator emitting any completed chains and discarding any messages containing partially mapped chains that were not forwarded.

Step-Based Message Forwarding

The techniques described above for performing distributed virtual network embedding included partitioning a virtual network request having a mesh topology into several sub-requests having linear topologies, independently generating a mapping solution for each linear sub-request, and subsequently determining how to combine the mapping solutions to create a mapping solution for the original mesh network. When combining the mapping solutions for the sub-requests, each virtual node in the constituent linear topologies was mapped to a common physical node by finding the intersections of the linear topology solutions.

In some embodiments, when generating one or more mapping solutions for a virtual network request in a mesh topology, a step-based message forwarding policy may be applied to reduce the total number of messages exchanged between vertices. According to a step-based message forwarding policy, the mappings of the individual linear topologies into which the mesh topology was partitioned take place in parallel such that each mapping operation performs a given superstep at the same time. At each superstep, a history of the mappings made for the individual linear topologies (so far) may be recorded. The recorded histories may inform the message forwarding decisions made at the next superstep, allowing the total number of messages exchanges between vertices to be reduced.

According to an example step-based message forwarding policy, the $i^{th}$ virtual node in a linear topology for a particular sub-request j may be denoted as $L_j^i$. The vertex value at each vertex may be extended to include an additional vector, $S_{ij}$, in which a history of the mappings for the vertex (so far) is stored. More specifically, $S_{ij}$ may indicate, for superstep i and linear topology j, a set of virtual nodes that have been mapped by the vertex v. According to this example step-based message forwarding policy, at each vertex v, at a superstep i, when the vertex maps to a virtual node n, the virtual node n is added to the mappings recorded in $S_{ij}$, as shown below:

$$S_{ij}=S_{ij}\cup\{n\}$$

Subsequently, at superstep i+1, for each received message mapping to linear topology j, if the next virtual node to be mapped is n, a determination is made as to whether or not n is included at any $S_{ij}$, where $0 \le i+1$ and $L_j^i = n$. In other words, a determination is made as to whether or not this same mapping was made in any previous superstep during generation of a mapping solution for another one of the linear topologies. If not, the received message may be discarded. If so, the generation of the mapping solution may continue to check for outgoing edge. The application of this step-based message forwarding policy may not affect the final results of the mapping solution.

The step-based message forwarding policy may be further illustrated in reference to the example mapping shown in FIG. 17 and described above. In this example, a mesh topology was partitioned into two linear topologies $L_0$ (1-3-5-4-2) and $L_1$ (3-2-0-1-4), each of which has two feasible mappings:

$L_0$=1-3-5-4-2, for which the feasible mappings are {A-B-C-D-E, H-I-J-K-L}

$L_1$=3-2-0-1-4, for which the feasible mappings are {B-E-F-A-D, M-N-O-P-Q}

Virtual nodes 1, 2, 3, and 4 are included in both linear topologies. Therefore, in order to combine the mapping solutions identified for $L_0$ and $L_1$ into a mapping solution for the original mesh network, each of these virtual nodes must be mapped to a common physical node. For example, as shown above in reference to FIG. 17, physical node A is a common node that maps to virtual node 1 in respective mapping solutions for $L_0$ and $L_1$. Since there are no other common nodes that map to virtual node 1 in respective mapping solutions for $L_0$ and $L_1$, the other feasible mappings for $L_0$ and $L_1$ may be discarded. In some embodiments, by applying a step-based message forwarding policy during the generation of the mapping solutions for $L_0$ and $L_1$, rather than after the mapping solutions for $L_0$ and $L_1$ have been completed, incompatible sub-request solutions may be discarded earlier, allowing the total number of messages exchanged during the generation of the mapping solution for the mesh network to be reduced.

In this example, at the first superstep, physical nodes B and M map to virtual node 3 for $L_1$, while physical nodes A and H map to virtual node 1 for $L_0$, and these mappings are recorded in the respective vertex values for those vertices. At the second superstep, physical nodes B and I map to virtual node 3 for $L_0$. In this example, because the history recorded at the first superstep indicates that virtual node 3 was also mapped to physical node B for $L_1$, the partially mapped chain A-B-?-?-? for $L_0$ remains a valid candidate solution and a message containing this partially mapped chain may be forwarded to respective neighbors of physical node B over any existing qualified links. However, since the history recorded in the first superstep does not include a mapping a virtual node 3 to physical node I, the partially mapped chain H-I-?-?-? is no longer a valid candidate solution for $L_0$ and may be discarded, reducing the number of messages exchanged.

Figure 22:
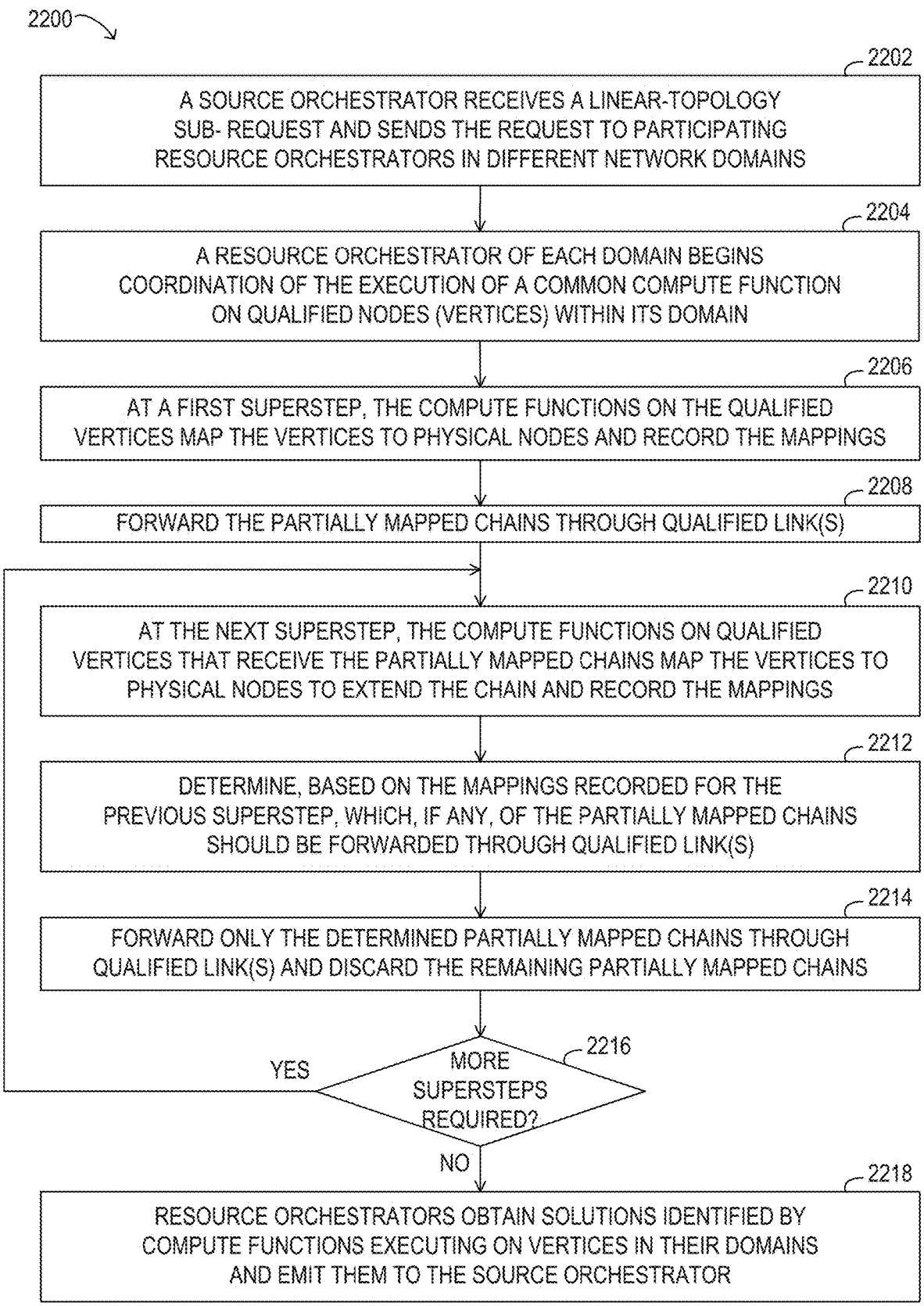
FIG. 22 is a flow diagram illustrating selected elements of a method for applying a step-based message forwarding policy when generating a mapping solution for a virtual network request in a mesh topology, according to one embodiment, according to one embodiment.

FIG. 22 is a flow diagram illustrating selected elements of a method 2200 for applying a step-based message forwarding policy when generating a mapping solution for a virtual network request in a mesh topology, according to one embodiment, according to one embodiment. In this example, method 2200 may include (at 2202) a source orchestrator receiving a linear-topology sub-request of the virtual network request and sending the request to participating resource orchestrators in different network domains. At 2204, method 2200 may include a resource orchestrator of each domain beginning coordination of the execution of a common compute function on qualified nodes (vertices) within its domain. At 2206, method 2200 may include, at a first superstep, the compute functions on the qualified vertices mapping the vertices to physical nodes and recording the mappings. For example, an indication of each physical node n mapped to a particular vertex may be written into a vector $S_{ij}$ for the vertex, as described above. The vector $S_{ij}$ for the vertex may be an element of the vertex value and may be stored in a memory that is accessible to one or more resource orchestrators. At 2208, the method may include forwarding the partially mapped chains (within respective messages) to one or more qualified vertices through respective qualified links.

At 2210, method 2200 may include, at the next superstep, the compute functions on qualified vertices that receive the partially mapped chains mapping the vertices to physical nodes to extend the chain and recording the mappings. At 2212, the method may include determining, based on the mappings recorded for the previous superstep, which, if any, of the partially mapped chains should be forwarded to other vertices through respective qualified links. For example, mappings recorded during the current superstep may be compared with mappings recorded during previous supersteps to determine whether or not vertices that are common to multiple linear-topology sub-requests are mapped to common physical nodes.

At 2214, method 2200 may include forwarding only the determined partially mapped chains (within respective messages) through qualified links and discarding any remaining messages containing partially mapped chains. For example, messages containing partially mapped chains for which a mapping added in the current superstep is consistent with the mappings recorded for a previous superstep may be forwarded through qualified links, while messages containing partially mapped chains for which a mapping added in the current superstep is inconsistent with the mappings recorded for a previous superstep may be discarded.

If, at 2216, more supersteps are required to complete the mapping solutions for the linear-topology sub-request, the operations shown as 2210-2214 may be repeated, as appropriate, for each additional superstep. If (or once) at 2216, the mapping solutions are complete, method 2200 may proceed to 2218. At 2218, the method may include the resource orchestrators obtaining solutions identified by the compute functions executing on vertices in their domains and emitting them to the source orchestrator.

In some embodiments, a hybrid message forwarding policy may be applied during generation of a mapping solution for a virtual network request that includes aspects of multiple ones of the message forwarding policies described herein. In one example, when applying a degree-based message forwarding policy, if the number of messages in a set of messages that could be potentially be forwarded to a given outgoing edge is large (e.g., greater than the maximum number of feasible solutions needed), and if a large number of the messages in set satisfy all required QoS metrics, a probability-based message forwarding policy (such as the length-based message forwarding policy described above) may be applied to select up to M messages from the set of messages for forwarding. In another example, if there is plenty of bandwidth to satisfy QoS requirements for each of ten received messages to be forwarded to a particular outgoing edge, a probability $\beta$ may be calculated for the edge and used to determine the percentage of messages to forward to a neighbor vertex. In this example, if $\beta$ is 50%, half of the ten received messages may be forwarded, with the forwarded messages being selected according to random numbers generated for each of the received messages. Other combinations of two or more message forwarding policies may be applied when generating a mapping solution for a virtual network request, in other embodiments.

Figure 23:
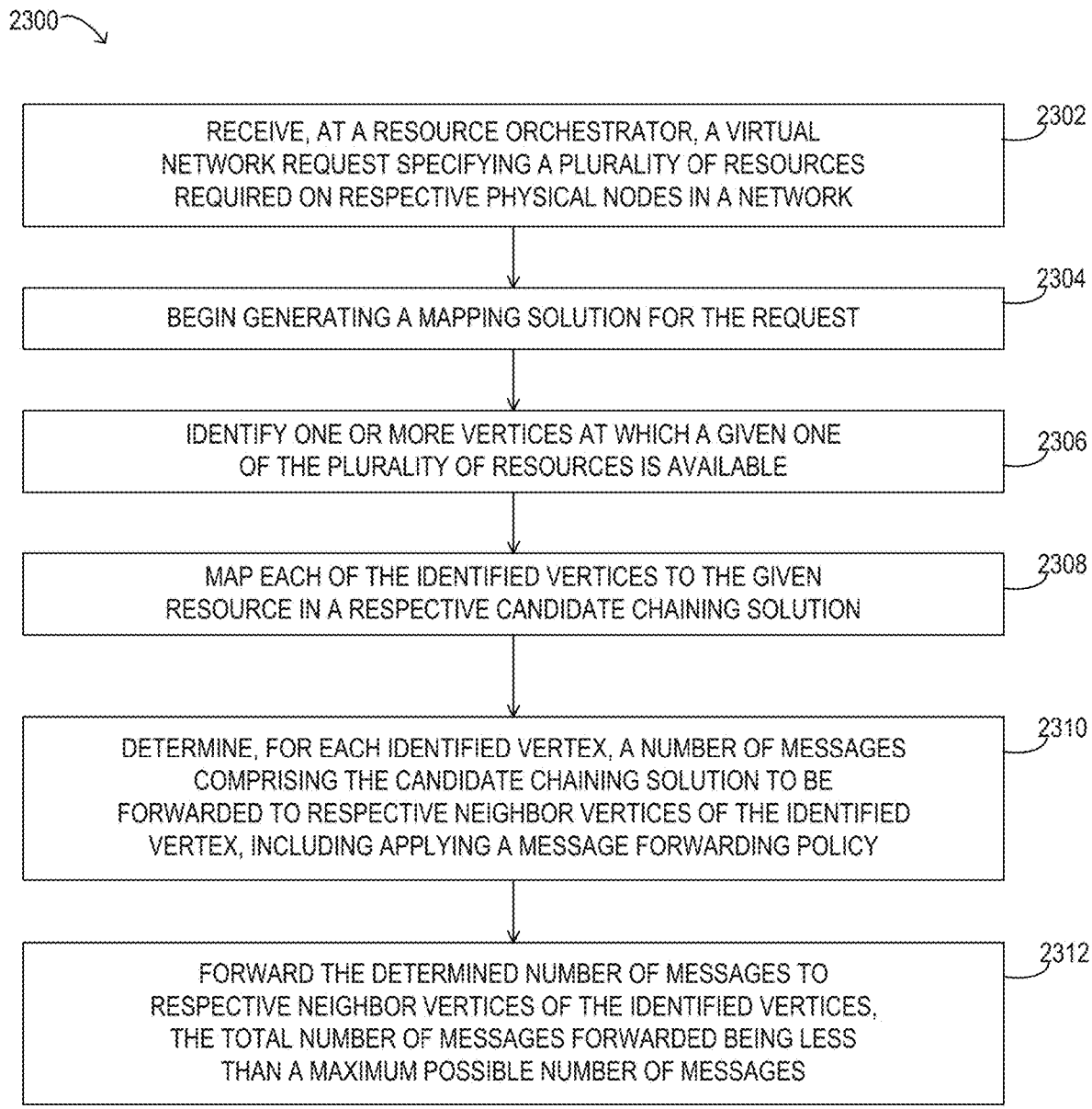
FIG. 23 is a flow diagram illustrating selected elements of a method for reducing the number of messages exchanged between vertices when generating a mapping solution to a virtual network request, according to one embodiment.

FIG. 23 is a flow diagram illustrating selected elements of a method 2300 for reducing the number of messages exchanged between vertices when generating a mapping solution to a virtual network request, according to one embodiment. In this example, method 2300 may include (at 2302) receiving, at a resource orchestrator, a virtual network request specifying a plurality of resources required on respective physical nodes in a network. Each physical node may be represented as a vertex in a resource orchestration framework. At 2304, method 2300 may include the resource orchestrator beginning generation of a mapping solution for the request. At 2306, the method may include identifying one or more vertices at which a given one of the plurality of resources is available. The given resource may be a compute resource, a storage resource, or a network or service function, such as a firewall, deep packet inspection (DPI), network address translation (NAT), load balancer, an anti-virus service function, or a parental control function. At 2308, method 2300 may include mapping each of the identified vertices to the given resource in a respective candidate chaining solution.

At 2310, the method may include determining, for each identified vertex, a number of messages comprising the candidate chaining solution to be forwarded to respective neighbor vertices of the identified vertex, which may include applying a message forwarding policy. The physical nodes represented by each of the respective neighbor vertices may be communicatively coupled to the physical node represented by the identified vertex over a physical link. The message forwarding policy applied may be selected dependent on the topology of the virtual network request. In one example, the topology may be a linear topology and the message forwarding policy may be a length-based message forwarding policy that uses a message forwarding probability calculated for the identified vertex and random numbers generated from each outgoing qualified edge to determine which, and how many, messages comprising the candidate chaining solution are to be forwarded to respective neighbor vertices. In another example, the topology may be a linear topology and the message forwarding policy may be a degree-based message forwarding policy specifying a maximum number of feasible solutions to be generated. In this example, the number of messages comprising the candidate chaining solution are to be forwarded to respective neighbor vertices may be determined based on the specified maximum number of feasible solutions to the generated. In yet another example, the topology may be a mesh topology and the message forwarding policy may be a step-based message forwarding policy in which mappings of a sub-request made during a given superstep are dependent on mappings made in a previous superstep. In this example, messages that, if forwarded, could lead to the generation of incompatible combinations of sub-request solutions may be dropped. At 2312, method 2300 may include forwarding the determined number of messages to respective neighbor vertices of the identified vertices, where the total number of messages forwarded during the mapping exercise is less than a maximum possible number of messages comprising candidate chaining solutions that could be forwarded between vertices in the resource orchestration framework over qualified edges.

In various embodiments, the application of message forwarding polices including, but not limited to, those described herein, may reduce computation complexity by reducing the number of messages exchanged during distributed computing for virtual network embedding and for generating mapping solutions for virtual network requests, some of which may include service function chains. In some embodiments, with a given maximum number of feasible mappings M needed, the number of messages exchanged between vertices in a resource orchestration framework may be reduced with minimal impact on the final results.

Figure 24:
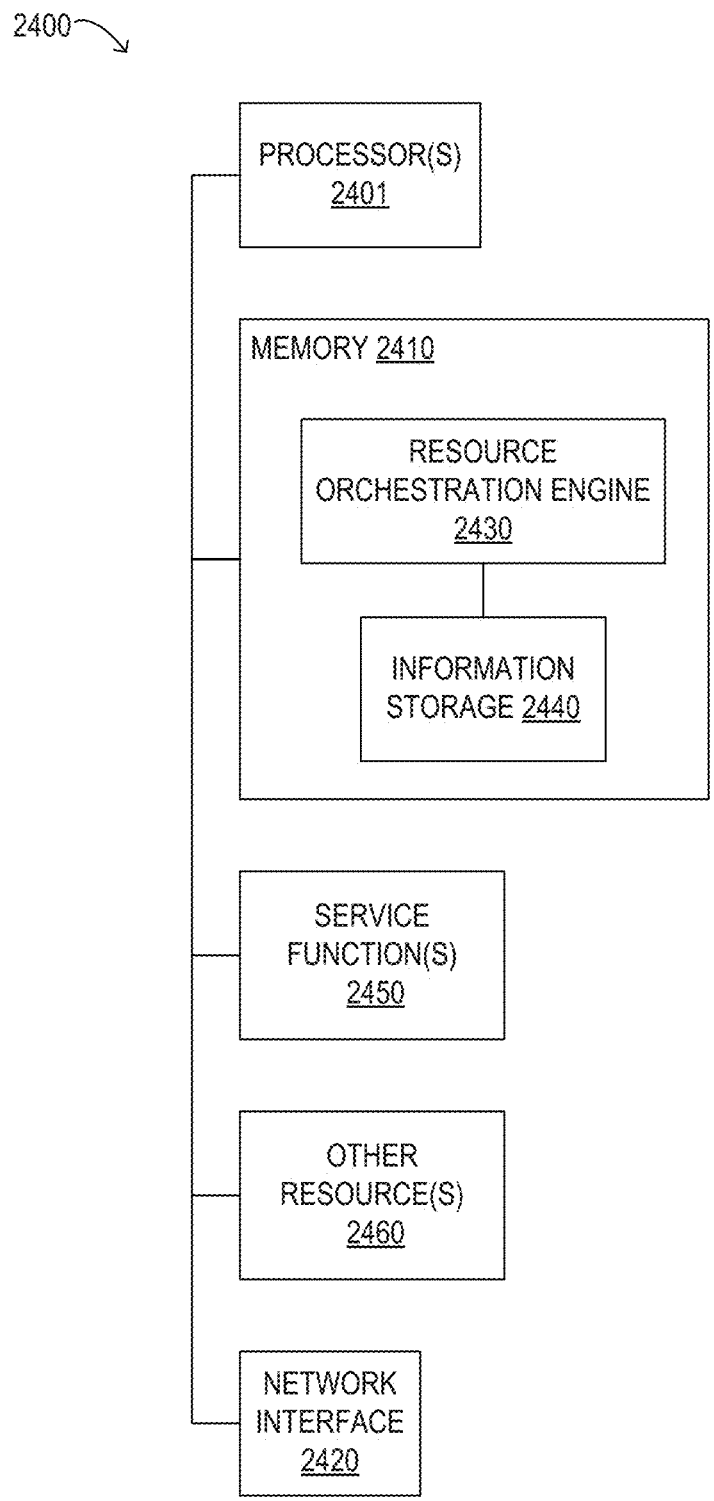
FIG. 24 is a block diagram of selected elements of an example network element, according to at least some embodiments.

Referring now to FIG. 24, a block diagram of selected elements of an example network element 2400 is illustrated, according to at least some embodiments. In FIG. 24, network element 2400 is represented as a computer system including physical and logical components for implementing any of the network elements in a multi-domain network. In various embodiments, a network element similar to network element 2400 may implement any of the network elements 172 illustrated in FIG. 1, any of the network elements illustrated in FIG. 2, any of the domain-specific resource orchestrators described herein (such as any of the resource orchestrators 108 illustrated in FIGS. 1, 3 and 4), any of the vertices (physical nodes) described herein, or a network controller (such as an SDN controller for a particular domain in a multi-domain network), as described herein. However, some of these network elements may not include all of the components illustrated in FIG. 24, in some embodiments. In other embodiments, any of the network elements described herein may include more, fewer, or different components than those included in the example embodiment illustrated in FIG. 24.

As illustrated in this example, network element 2400 may, accordingly, include one or more processors 2401, memory 2410, one or more service functions 2450 or other resources 2460 that are required for a given virtual network request, and a network interface 2420. Processor 2401 may represent one or more individual processing units and may execute program instructions, interpret data, and process data stored by memory 2410 or another component within network element 2400 to implement the functionality of any of the network elements described herein, in different embodiments. In this example embodiment, each service function 2450 may include circuitry, logic, and/or program instructions for implementing any of a variety of service functions or network functions that may be included in a virtual network request or service function chain request including, but not limited to, those described herein. Similarly, each other resource 2460 may include circuitry, logic, and/or program instructions for implementing any of a variety of other resources that may be required to satisfy a virtual network request or service function chain including, but not limited to, those described herein.

In FIG. 24, memory 2410 may be communicatively coupled to processor 2401 and may comprise a system, device, or apparatus suitable to retain program instructions and data for a period of time (e.g., non-transitory computer-readable media). Memory 2410 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 2410 may include different numbers of physical storage devices, in various embodiments.

As shown in FIG. 24, memory 2410 may include instructions to implement functionality of resource orchestration engine 2430. Resource orchestration engine 2430, in collaboration with other instances of resource orchestration engine 2430 on other instances of network element 2400, may implement distributed network embedding for identifying one or more solutions for a virtual network request, vertex-centric distributed computing for identifying all qualified solutions for an SFC request or a linear sub-request of a virtual network request in a multi-domain network, and/or efficient message forwarding to reduce the complexity of the mapping. In various embodiments, resource orchestration engine 2430, alone or in collaboration with other instances of resource orchestration engine 2430 on other instances of network element 2400, may implement any of the elements of method 700 illustrated in FIG. 7, method 800 illustrated in FIG. 8, method 900 illustrated in FIG. 9, method 1000 illustrated in FIG. 10, method 1100 illustrated in FIG. 11, method 1200 illustrated in FIG. 12, method 1300 illustrated in FIG. 13, method 1400 illustrated in FIG. 14, method 1900 illustrated in FIG. 19, method 2100 illustrated in FIG. 21, method 2200 illustrated in FIG. 22, and/or method 2300 illustrated in FIG. 23, among other functionality described in the present disclosure.

Memory 2410 may also include information storage 2440, which may store information usable by resource orchestration engine 2430 including, but not limited to, data representing a virtual network request, a linear sub-request of a virtual network request having a mesh topology, an SFC request, node information (including data indicating the available compute and/or storage resources and/or service functions), edge information (e.g., in one or more edge data structures), vertex information (e.g., in one or more vertex value data structures, some of which may store information about mappings made and recorded at each superstep), data representing one or more partially mapped service function chains or chains representing a linear sub-request of a virtual node request having a mesh topology, data representing one or more candidate solutions for a service function chain request or a linear sub-request (e.g., data representing a completed service function chain or a completed chain for a linear sub-request), data representing a mapping history for one or more supersteps, data representing user resource usage preferences and policies, data representing inputs or outputs of a service function 2450, data representing inputs or outputs for other resources 2460, or values of any default or configurable parameters (including, but not limited to, a weighting factor, a maximum number of feasible solutions needed, or an indication of a selected message forwarding policy) used to implement the functionality described herein or any other functionality of network element 2400.

While many of the example embodiments described herein are directed to the application of vertex-centric distributed computing for identifying all qualified solutions for an SFC request or a sub-request of a virtual network request in a distributed multi-domain network, in other embodiments, this approach may be applied in a centralized system. For example, in a centralized system, a single resource orchestrator may include all of the node and link information for the whole multi-domain network, and the network may not be partitioned. In this example, the single resource orchestrator may coordinate the execution of a common compute function on appropriate ones of the vertices (nodes) in a series of supersteps to build up any potential solutions for an SFC request a sub-request of a virtual network request. In other words, in a centralized system, a single resource orchestrator may implement the functionality of all of the respective resource orchestrators in the distributed systems described above. In some embodiments of such a centralized system, rather than exchanging controller messages between vertices (nodes) over control channels, messages that include partially mapped chains may be exchanged between vertices (nodes) by writing then to and reading them from memory. As in the case of the distributed systems described above, once the single resource orchestrator has identified all feasible chains for satisfying an SFC request or a sub-request of a virtual network request, the single resource orchestrator may present them to another process that decides, based on one or more policies or constraints, which one or more of the identified chains to implement.

In at least some embodiments of the systems described herein, a vertex-centric approach to computing all feasible chaining solutions in a multi-domain network may have advantages over earlier approaches. In different embodiments, the vertex-centric framework and resource orchestration approach described herein may be suitable for both centralized and distributed settings. It may avoid the issues associated with the replication of global state information in traditional architectures, and has been shown to be more efficient than earlier approaches in terms of signaling delay and the number of messages exchanged. In at least some embodiments, this approach may be highly scalable for computing all feasible mapping solutions for SFC requests or linear sub-requests for a virtual network request in a mesh topology, some of which may be implemented in multi-domain networks. In some embodiments, fewer than all feasible mapping solutions may be required and a message forwarding policy may be applied to reduce the number of messages exchanged and, thus, the complexity of generating the solution(s). The systems and methods described herein may, in some embodiments, be used to coordinate and control resources implemented on the 1Finity™ platform from Fujitsu Network Communications Inc. that cover access, metro, core, and datacenter networks.

In at least some embodiments of the present disclosure, a mapping solution for a virtual network request may be generated, using a resource orchestration framework, by partitioning the virtual network into multiple non-overlapping linear-topology sub-requests, applying a vertex-centric distributed computing approach to identify feasible mappings for each sub-request independently, and then combining one feasible mapping for each sub-request. A resource orchestrator may partition the virtual network request into a minimum set of balanced linear topologies in which there are no overlapping links. This approach may be applied to perform distributed virtual network embedding in both distributed and centralized system, in different embodiments, and is suitable for application in large-scale networks. In general, in at least some embodiments of the present disclosure, the systems and methods described herein may be used to solve large-scale, multi-domain, multi-layer network problems spanning service functions, virtual machines, data centers, switching systems, and the Internet of Things.

While the subject of this specification has been described in connection with one or more example embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for identifying a mapping solution for a virtual network request, comprising:
   receiving, at a resource orchestrator, a virtual network request specifying a plurality of resources required on respective physical nodes in a network, each physical node being represented as a vertex in a resource orchestration framework;
   generating, by the resource orchestrator, a mapping solution for the virtual network request, wherein generating the mapping solution comprises:
      identifying one or more vertices at which a first one of the plurality of resources is available;
      mapping each of the identified vertices to the first one of the plurality of resources in a respective candidate chaining solution;
      determining, for each of the identified vertices, a number of messages comprising the candidate chaining solution to be forwarded to respective neighbor vertices of the identified vertex, the physical nodes represented by each of the respective neighbor vertices being communicatively coupled to the physical node represented by the identified vertex over a physical link; and
      forwarding the determined number of messages to respective neighbor vertices of the identified vertices;
   wherein determining the number of messages to be forwarded to respective neighbor vertices comprises applying a message forwarding policy, and the total number of messages forwarded between vertices as part of generating the mapping solution is less than a maximum possible number of messages comprising candidate chaining solutions that are qualified to be forwarded between vertices in the resource orchestration framework.

2. The method of claim 1, wherein at least one of the plurality of resources required comprises a service function.

3. The method of claim 1, wherein:
   determining the number of messages to be forwarded to respective neighbor vertices further comprises determining a number of physical nodes represented by respective neighbor vertices that are coupled to the physical node represented by the identified vertex over a physical link meeting criteria specified for the virtual network request; and
   forwarding the determined number of messages to respective neighbor vertices of the identified vertices comprises forwarding the determined number of messages over physical links meeting criteria specified for the virtual network request.

4. The method of claim 1, wherein:
   the virtual network request comprises a linear topology;
   applying the message forwarding policy comprises calculating a message forwarding probability for the identified vertex, the message forwarding probability being dependent on availability of the plurality of resources in the network; and
   determining the number of messages to be forwarded to respective neighbor vertices is dependent on the calculated message forwarding probability for the identified vertex.

5. The method of claim 4, wherein:
   applying the message forwarding policy further comprises generating a random number for each pairing between a message and a corresponding physical link over which the message can be forwarded; and
   determining the number of messages to be forwarded to respective neighbor vertices comprises, for each pairing:
      comparing the random number to the calculated message forwarding probability;
      determining that the message is to be forwarded to a neighbor vertex over the corresponding physical link when the random number is greater than or equal to the calculated message forwarding probability; and
      determining that the message is not to be forwarded to a neighbor vertex over the corresponding physical link when the random number is less than the calculated message forwarding probability.

6. The method of claim 1, wherein:
   the virtual network request comprises a linear topology;
   applying the message forwarding policy comprises, for each physical link over which the identified vertex is communicatively coupled to a neighbor vertex:
      determining a set of messages received by the identified vertex that can be forwarded over the physical link; and determining whether the number of messages in the set is greater than a predetermined maximum number of mapping solutions to be generated for the virtual network request; and determining the number of messages to be forwarded to respective neighbor vertices comprises, for each physical link over which the identified vertex is communicatively coupled to a neighbor vertex:

determining that all of the messages in the set of messages received by the identified vertex that can be forwarded over the physical link are to be forwarded when the number of messages in the set is not greater than the predetermined maximum number of mapping solutions to be generated; and determining that fewer than all of the messages in the set of messages received by the identified vertex that can be forwarded over the physical link are to be forwarded when the number of messages in the set is greater than the predetermined maximum number of mapping solutions to be generated.

7. The method of claim 6, further comprising, in response to determining that fewer than all of the messages in the set of messages received by the identified vertex that can be forwarded over the physical link are to be forwarded:

sorting the messages in the set based on respective values of a Quality of Service (QoS) metric associated with message in the set; and selecting a number of messages to be forwarded that is no greater than the predetermined maximum number of mapping solutions to be generated, the selected messages being associated with values of the QoS metric that are more favorable than the values of the QoS metric associated with unselected messages in the set.

8. The method of claim 1, further comprising, for at least one neighbor vertex of the identified vertex to which a message comprising a respective candidate chaining solution was forwarded:

determining that a second one of the plurality of resources is available on the neighbor vertex;

mapping the neighbor vertex to the second one of the plurality of resources in the respective candidate chaining solution to extend the respective candidate chaining solution;

determining a number of messages comprising the extended candidate chaining solution to be forwarded to respective neighbor vertices of the neighbor vertex, the physical nodes represented by each of the respective neighbor vertices of the neighbor vertex being communicatively coupled to the physical node represented by the neighbor vertex over a physical link; and forwarding the determined number of messages to respective neighbor vertices of the neighbor vertex.

9. The method of claim 1, wherein:

the virtual network request comprises a mesh topology; and generating the mapping solution further comprises:

recording, for each candidate chaining solution, the mapping between the identified vertices and the first one of the plurality of resources; and for at least one neighbor vertex of an identified vertex to which a message comprising a respective candidate chaining solution was forwarded:

determining that a second one of the plurality of resources is available at the neighbor vertex;

mapping the neighbor vertex to the second one of the plurality of resources in the respective candidate chaining solution to extend the respective chaining solution when the second one of the plurality of resources is available at the neighbor vertex; and determining, based on the recording, whether a message comprising the extended candidate chaining solution is to be forwarded to respective neighbor vertices of the neighbor vertex.

10. The method of claim 9, wherein determining, for the at least one neighbor vertex of the identified vertex to which a message comprising a respective candidate chaining solution was forwarded, whether a message comprising the extended candidate chaining solution is to be forwarded to respective neighbor vertices of the neighbor vertex comprises:

determining that a message comprising the extended candidate chaining solution is to be forwarded to respective neighbor vertices of the neighbor vertex when the extended chaining solution is compatible with the recordings of the mappings between the identified vertices and the first one of the plurality of resources for each candidate chaining solution; and discarding the extended candidate chaining solution when the extended chaining solution is incompatible with at least one of the recordings of the mappings between the identified vertices and the first one of the plurality of resources for each candidate chaining solution.

11. A resource orchestration framework, comprising:

a plurality of vertices, each of which represents a respective one of a plurality of physical nodes in a network; and a resource orchestrator, comprising:

a processor; and a memory storing program instructions that when executed by the processor cause the processor to perform:

receiving a virtual network request specifying a plurality of resources required on respective ones of the physical nodes in the network;

generating a mapping solution for the virtual network request, wherein generating the mapping solution comprises:

identifying one or more vertices at which a first one of the plurality of resources is available;

mapping each of the identified vertices to the first one of the plurality of resources in a respective candidate chaining solution;

determining, for each of the identified vertices, a number of messages comprising the candidate chaining solution to be forwarded to respective neighbor vertices of the identified vertex, the physical nodes represented by each of the respective neighbor vertices being communicatively coupled to the physical node represented by the identified vertex over a physical link; and forwarding the determined number of messages to respective neighbor vertices of the identified vertices;

wherein determining the number of messages to be forwarded to respective neighbor vertices comprises applying a message forwarding policy, and the total number of messages forwarded between vertices as part of generating the mapping solution is less than a maximum possible number of messages comprising candidate chaining solutions that are qualified to be forwarded between vertices in the resource orchestration framework.

12. The resource orchestration framework of claim 11, wherein at least one of the plurality of resources required comprises a service function.

13. The resource orchestration framework of claim 11, wherein:
   determining the number of messages to be forwarded to respective neighbor vertices further comprises determining a number of physical nodes represented by respective neighbor vertices that are coupled to the physical node represented by the identified vertex over a physical link meeting criteria specified for the virtual network request; and
   forwarding the determined number of messages to respective neighbor vertices of the identified vertices comprises forwarding the determined number of messages over physical links meeting criteria specified for the virtual network request.

14. The resource orchestration framework of claim 11, wherein:
   the virtual network request comprises a linear topology;
   applying the message forwarding policy comprises calculating a message forwarding probability for the identified vertex, the message forwarding probability being dependent on availability of the plurality of resources in the network; and
   determining the number of messages to be forwarded to respective neighbor vertices is dependent on the calculated message forwarding probability for the identified vertex.

15. The resource orchestration framework of claim 11, wherein:
   the virtual network request comprises a linear topology;
   applying the message forwarding policy comprises, for each physical link over which the identified vertex is communicatively coupled to a neighbor vertex:
      determining a set of messages received by the identified vertex that can be forwarded over the physical link; and
      determining whether the number of messages in the set is greater than a predetermined maximum number of mapping solutions to be generated for the virtual network request; and
   determining the number of messages to be forwarded to respective neighbor vertices comprises, for each physical link over which the identified vertex is communicatively coupled to a neighbor vertex:
      determining that all of the messages in the set of messages received by the identified vertex that can be forwarded over the physical link are to be forwarded when the number of messages in the set is not greater than the predetermined maximum number of mapping solutions to be generated; and
      determining that fewer than all of the messages in the set of messages received by the identified vertex that can be forwarded over the physical link are to be forwarded when the number of messages in the set is greater than the predetermined maximum number of mapping solutions to be generated.

16. The resource orchestration framework of claim 15, wherein the program instructions, when executed by the processor, further cause the processor to perform, in response to determining that fewer than all of the messages in the set of messages received by the identified vertex that can be forwarded over the physical link are to be forwarded:
   sorting the messages in the set based on respective values of a Quality of Service (QoS) metric associated with message in the set; and
   selecting a number of messages to be forwarded that is no greater than the predetermined maximum number of mapping solutions to be generated, the selected messages being associated with values of the QoS metric that are more favorable than the values of the QoS metric associated with unselected messages in the set.

17. The resource orchestration framework of claim 11, wherein the program instructions, when executed by the processor, further cause the processor to perform, for at least one neighbor vertex of the identified vertex to which a message comprising a respective candidate chaining solution was forwarded:
   determining that a second one of the plurality of resources is available on the neighbor vertex;
   mapping the neighbor vertex to the second one of the plurality of resources in the respective candidate chaining solution to extend the respective candidate chaining solution;
   determining a number of messages comprising the extended candidate chaining solution to be forwarded to respective neighbor vertices of the neighbor vertex, the physical nodes represented by each of the respective neighbor vertices of the neighbor vertex being communicatively coupled to the physical node represented by the neighbor vertex over a physical link; and
   forwarding the determined number of messages to respective neighbor vertices of the neighbor vertex.

18. The resource orchestration framework of claim 11, wherein:
   the virtual network request comprises a mesh topology; and
   generating the mapping solution further comprises:
      recording, for each candidate chaining solution, the mapping between the identified vertices and the first one of the plurality of resources; and
      for at least one neighbor vertex of an identified vertex to which a message comprising a respective candidate chaining solution was forwarded:
         determining that a second one of the plurality of resources is available at the neighbor vertex;
         mapping the neighbor vertex to the second one of the plurality of resources in the respective candidate chaining solution to extend the respective chaining solution when the second one of the plurality of resources is available at the neighbor vertex; and
         determining, based on the recording, whether a message comprising the extended candidate chaining solution is to be forwarded to respective neighbor vertices of the neighbor vertex.

19. The resource orchestration framework of claim 18, wherein
   determining, for the at least one neighbor vertex of the identified vertex to which a message comprising a respective candidate chaining solution was forwarded, whether a message comprising the extended candidate chaining solution is to be forwarded to respective neighbor vertices of the neighbor vertex comprises:
      determining that a message comprising the extended candidate chaining solution is to be forwarded to respective neighbor vertices of the neighbor vertex when the extended chaining solution is compatible with the recordings of the mappings between the identified vertices and the first one of the plurality of resources for each candidate chaining solution; and
      discarding the extended candidate chaining solution when the extended chaining solution is incompatible with at least one of the recordings of the mappings between the identified vertices and the first one of the plurality of resources for each candidate chaining solution.

20. The resource orchestration framework of claim 11, wherein at least one neighbor vertex of a given one of the identified vertices to which a message comprising a respective candidate chaining solution is forwarded resides in a different domain of a multi-domain network than the domain in which the given identified vertex resides.

* * * * *